US012716716B2

(12) United States Patent
Preisendorf et al.

(10) Patent No.: US 12,716,716 B2
(45) Date of Patent: Aug. 25, 2026

(54) PORTABLE CALIBRATION ASSEMBLY AND METHOD

(71) Applicant: CarCal Experts, Brighton, CO (US)

(72) Inventors: Michael Preisendorf, Brighton, CO (US); Thomas Sandoval, Thornton, CO (US); Sandra Preisendorf, Brighton, CO (US); Craig Weskamp, Aurora, CO (US); Jerome Rivera, Northglenn, CO (US)

(73) Assignee: CARCAL EXPERTS, Brighton, CO (US)

( * ) Notice: Subject to any disclaimer, the term of this patent is extended or adjusted under 35 U.S.C. 154(b) by 401 days.

(21) Appl. No.: 18/367,026

(22) Filed: Sep. 12, 2023

(65) Prior Publication Data

US 2024/0085173 A1 Mar. 14, 2024

Related U.S. Application Data

(60) Provisional application No. 63/375,487, filed on Sep. 13, 2022.

(51) Int. Cl.
*G01B 11/26* (2006.01)
*G01B 11/275* (2006.01)

(52) U.S. Cl.
CPC .................................... *G01B 11/26* (2013.01)

(58) Field of Classification Search
CPC ....... G01B 11/26; G01B 11/27; G01B 11/275; G01B 2210/283
USPC .......... 33/288; 701/29.1, 33.1; 73/1.01, 1.75
See application file for complete search history.

(56) References Cited

U.S. PATENT DOCUMENTS

| | | | | |
|---|---|---|---|---|
| 10,921,426 | B2 * | 2/2021 | Tang | G01S 7/4017 |
| 11,079,060 | B2 * | 8/2021 | Innes | F16M 11/42 |
| 2012/0086941 | A1 * | 4/2012 | Hayes | G01M 11/061 356/399 |
| 2013/0110314 | A1 * | 5/2013 | Stieff | G01B 11/275 701/1 |
| 2017/0097230 | A1 * | 4/2017 | Rogers | G01B 11/2755 |
| 2019/0187249 | A1 * | 6/2019 | Harmer | G01S 7/40 |
| 2021/0080253 | A1 * | 3/2021 | Newkirk | G01B 11/275 |
| 2024/0085173 | A1 * | 3/2024 | Preisendorf | G01B 11/26 |

* cited by examiner

*Primary Examiner* — Peter J Macchiarolo
*Assistant Examiner* — Anna Josephine Saunders
(74) *Attorney, Agent, or Firm* — Duft & Bornsen, PC

(57) ABSTRACT

A portable calibration assembly and associated method. In an embodiment, a portable calibration assembly comprises a calibration fixture configured to hold one or more calibration targets for a vehicle. The calibration fixture comprises a main frame comprising a base member configured to rest on a supporting surface, and a pillar member having a first end portion pivotally coupled to the base member. The calibration fixture further comprises a plurality of arms, where each of the arms has a free end, and a connected end pivotally coupled to a second end portion of the pillar member.

20 Claims, 46 Drawing Sheets

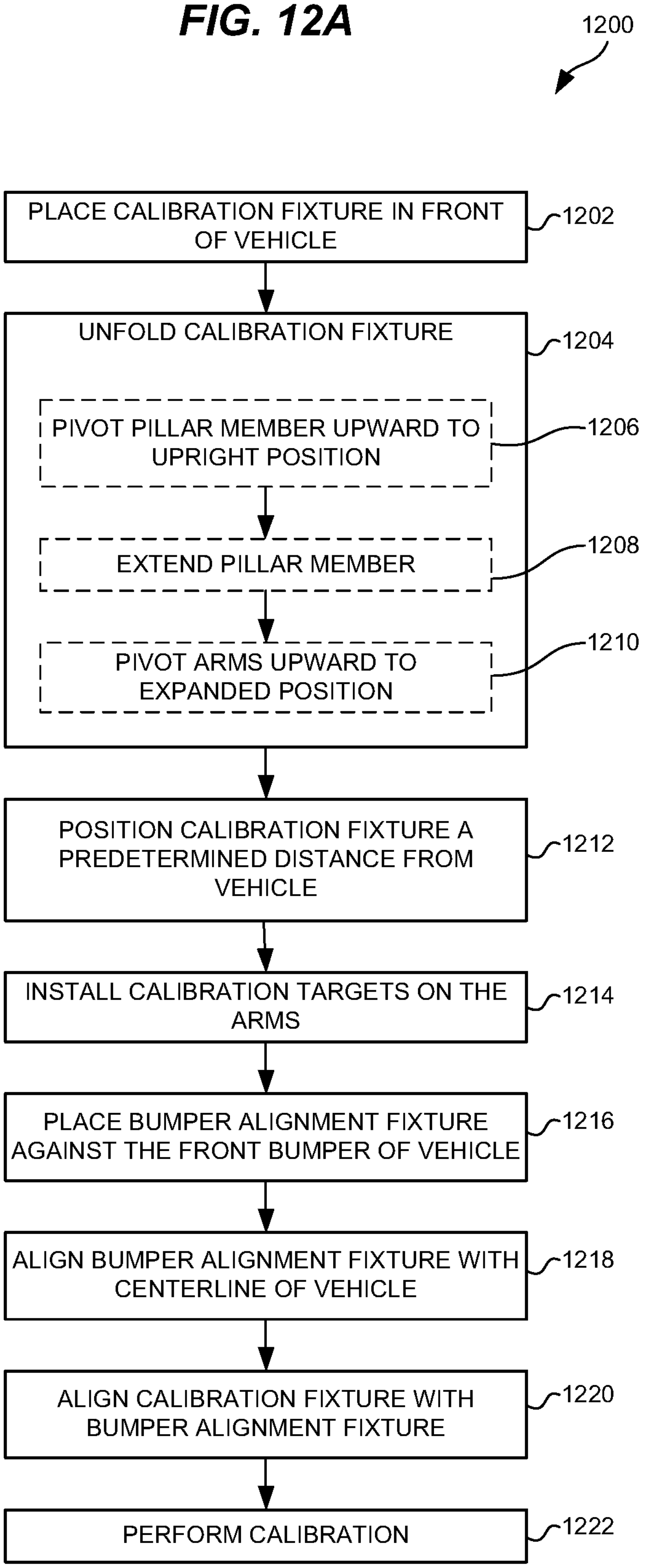

FIG. 12A
1200
PLACE CALIBRATION FIXTURE IN FRONT OF VEHICLE
1202
UNFOLD CALIBRATION FIXTURE
1204
PIVOT PILLAR MEMBER UPWARD TO UPRIGHT POSITION
1206
EXTEND PILLAR MEMBER
1208
PIVOT ARMS UPWARD TO EXPANDED POSITION
1210
POSITION CALIBRATION FIXTURE A PREDETERMINED DISTANCE FROM VEHICLE
1212
INSTALL CALIBRATION TARGETS ON THE ARMS
1214
PLACE BUMPER ALIGNMENT FIXTURE AGAINST THE FRONT BUMPER OF VEHICLE
1216
ALIGN BUMPER ALIGNMENT FIXTURE WITH CENTERLINE OF VEHICLE
1218
ALIGN CALIBRATION FIXTURE WITH BUMPER ALIGNMENT FIXTURE
1220
PERFORM CALIBRATION
1222

1410
1414
2750
2752
2754
2748
2754
2740
2722
2746
2742
2720
1466
2712
2710
2782
2704
2706
2716
2718
2712
2710
2720
2702
2724
2784
2742
2712
2718
2716
2710

PORTABLE CALIBRATION ASSEMBLY AND METHOD

RELATED APPLICATIONS

This non-provisional patent application claims priority to U.S. Provisional Patent Application No. 63/375,487 filed on Sep. 13, 2022, which is incorporated by reference as if fully provided herein.

TECHNICAL FIELD

The following disclosure relates to the field of calibration equipment, and more particularly, to calibration equipment for vehicles.

BACKGROUND

An Advanced Driver-Assistance System (ADAS) is an advanced safety system in a vehicle that assists a driver in driving and/or parking functions, such as forward collision warning (FCW), lane departure warning (LDW), lane keeping assist (LKA), automatic emergency braking (AEB), etc. ADAS uses a group of electronics (referred to generally herein as ADAS sensors), such as sensors, cameras, and/or other components, to gather information about vehicle surroundings and respond accordingly, such as safety warnings, temporary control over vehicle braking or steering, etc. In order to maintain accuracy of ADAS, the ADAS sensors need to be calibrated. New vehicles are typically calibrated at the factory. Over time, the ADAS sensors may come out of alignment due to collisions, wear and tear, repairs or parts replacement, etc. For example, vehicles with a windshield-mounted forward-facing ADAS camera require calibration after windshield replacement. Thus, the ADAS sensors may need to be recalibrated.

ADAS calibration equipment, such as for a static calibration with the vehicle stationary, includes a diagnostic tool that connects to the vehicle and initiates electronic scan and calibration procedures. ADAS calibration equipment also includes a calibration fixture that holds one or more calibration targets a precise distance from the vehicle. One problem is calibration fixtures can be relatively large and heavy, which typically requires that the vehicle be brought to the location of the calibration fixture (i.e., to a calibration center). This can be burdensome to the vehicle owner. Another problem is calibration fixtures are expensive, which reduces the number of locations that offer calibration services. Yet another problem is some ADAS calibration equipment uses a complex process to align the calibration fixture and/or calibration targets, which is time consuming and burdensome.

SUMMARY

Embodiments described herein include a portable calibration assembly and associated method of using the portable calibration assembly. In general, the portable calibration assembly includes a calibration fixture and one or more bumper alignment fixtures (e.g., a front bumper alignment fixture and a rear bumper alignment fixture). The calibration fixture is collapsible into a compact form that is mobile. One technical benefit is the portable calibration assembly can be transported to the location of a vehicle for calibration. Another technical benefit is the combination of a calibration fixture and a bumper alignment fixture makes alignment of the calibration fixture less complex.

In an embodiment, a portable calibration assembly comprises a calibration fixture configured to hold one or more calibration targets for a vehicle. The calibration fixture comprises a main frame comprising a base member configured to rest on a supporting surface, and a pillar member having a first end portion pivotally coupled to the base member. The calibration fixture further comprises a plurality of arms, where each of the arms has a free end, and a connected end pivotally coupled to a second end portion of the pillar member.

In an embodiment, a portable calibration assembly comprises a calibration fixture configured to hold one or more calibration targets for a vehicle. The calibration fixture comprises a main frame comprising a base member configured to rest on a supporting surface, and a pillar member having a first end portion and a second end portion, where the first end portion is pivotally coupled to the base member via a first pivotal coupling. The calibration fixture further comprises a first arm having a first free end, and a first connected end pivotally coupled to the second end portion of the pillar member via a second pivotal coupling, and a second arm having a second free end, and a second connected end pivotally coupled to the second end portion of the pillar member via a third pivotal coupling. The pillar member is configured to pivot in relation to the base member about a first horizontal axis via the first pivotal coupling between an upright position where the pillar member is substantially vertical and a folded position where the pillar member is substantially horizontal. The first arm is configured to pivot in relation to the pillar member about a second horizontal axis via the second pivotal coupling between an expanded position where the first arm is substantially perpendicular to the pillar member and a collapsed position where the first arm is substantially parallel to the pillar member. The second arm is configured to pivot in relation to the pillar member about a third horizontal axis via the third pivotal coupling between an expanded position where the second arm is substantially perpendicular to the pillar member and a collapsed position where the second arm is substantially parallel to the pillar member.

In an embodiment, a method comprises placing a calibration fixture of a portable calibration assembly in front of a vehicle, where the calibration fixture comprises a base member, a pillar member having a first end portion pivotally coupled to the base member, and a plurality of arms pivotally coupled to a second end portion of the pillar member. The placing comprises placing the calibration fixture with the base member resting on a supporting surface and the pillar member disposed substantially horizontal to the supporting surface, unfolding the calibration fixture by pivoting the pillar member upward in relation to the base member to an upright position, extending a length of the pillar member to a predetermined length based on a type of the vehicle, and pivoting the arms in relation to the pillar member to an expanded position where the arms extend substantially horizontal from the pillar member. The method comprises positioning the calibration fixture a predetermined distance from the vehicle, installing one or more calibration targets on the arms, placing a bumper alignment fixture of the portable calibration assembly against a front bumper of the vehicle, aligning the bumper alignment fixture with a centerline of the vehicle via a laser line projecting in a first direction from the bumper alignment fixture, and aligning the calibration fixture with the vehicle by aligning one or more laser indicators on the calibration fixture with the laser line projecting in a second direction from the bumper alignment fixture opposite the first direction.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIGS. 12A-12B are flow charts illustrating a method of using a portable calibration assembly in an illustrative embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
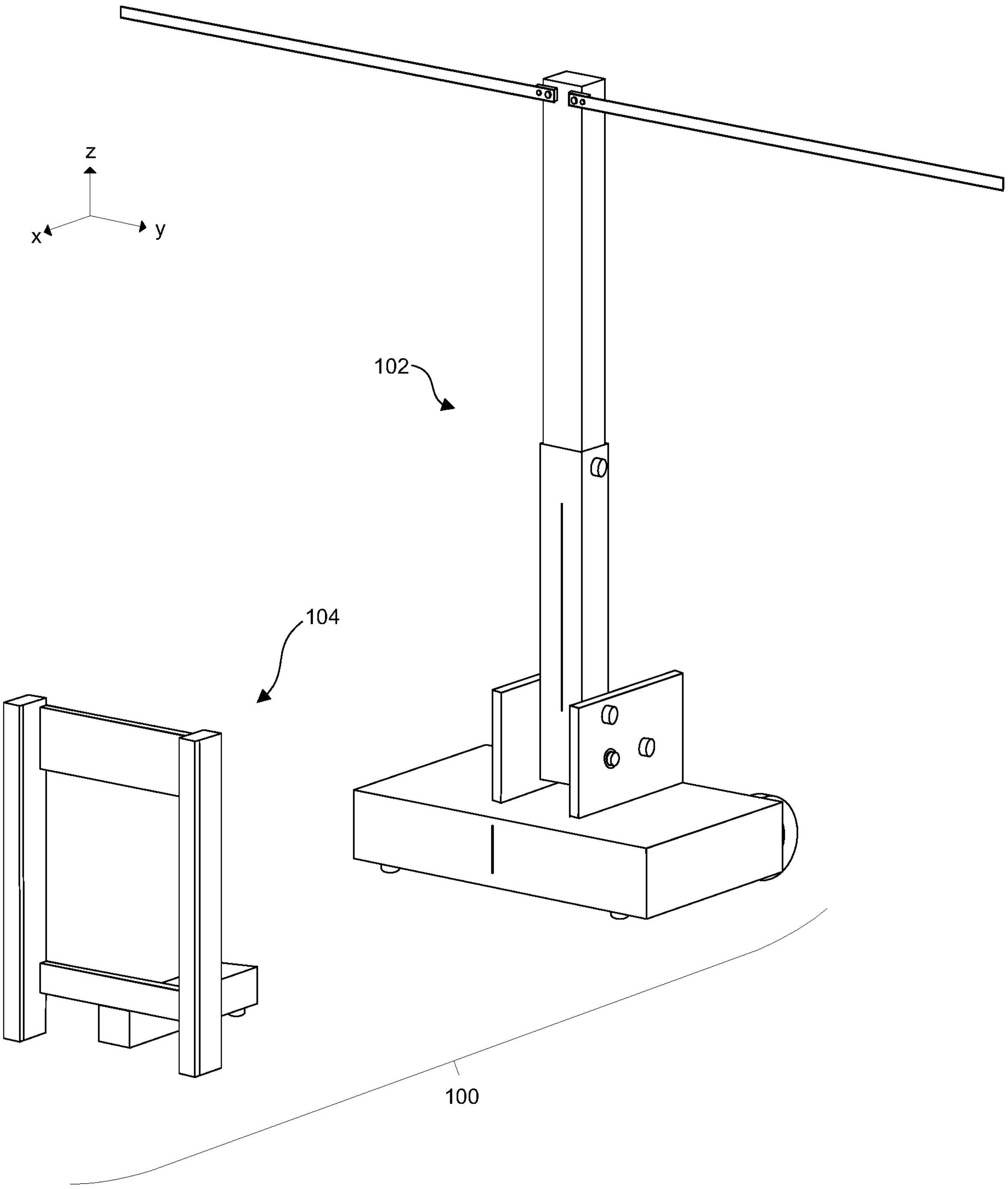
FIG. 1 is a perspective view of a portable calibration assembly in an illustrative embodiment.

FIG. 1 is a perspective view of a portable calibration assembly 100 in an illustrative embodiment. FIG. 1 is not drawn to scale. Portable calibration assembly 100 comprises calibration equipment (e.g., ADAS calibration equipment) used for static calibration of one or more sensors (e.g., ADAS sensors) of a vehicle. In this embodiment, portable calibration assembly 100 includes a calibration fixture 102 (also referred to as a collapsible calibration fixture) and a bumper alignment fixture 104 (also referred to as a front bumper alignment fixture or a first bumper alignment fixture). Calibration fixture 102 is a structure configured to hold or support one or more calibration targets in front of a vehicle. Bumper alignment fixture 104 is a structure configured to align the calibration fixture 102 with the vehicle. For example, bumper alignment fixture 104 is placed against the front bumper of the vehicle, and projects a laser line toward the vehicle. The position of the bumper alignment fixture 104 is adjusted until the laser line is aligned with the centerline of the vehicle. Bumper alignment fixture 104 also projects a laser line away from the vehicle in the opposite direction. This laser line is used to align the calibration fixture 102 with the vehicle. Portable calibration assembly 100 may include additional components not shown in FIG. 1, such as a rear bumper alignment fixture configured to assist in further aligning the bumper alignment fixture 104 with the centerline of the vehicle.

Figure 2:
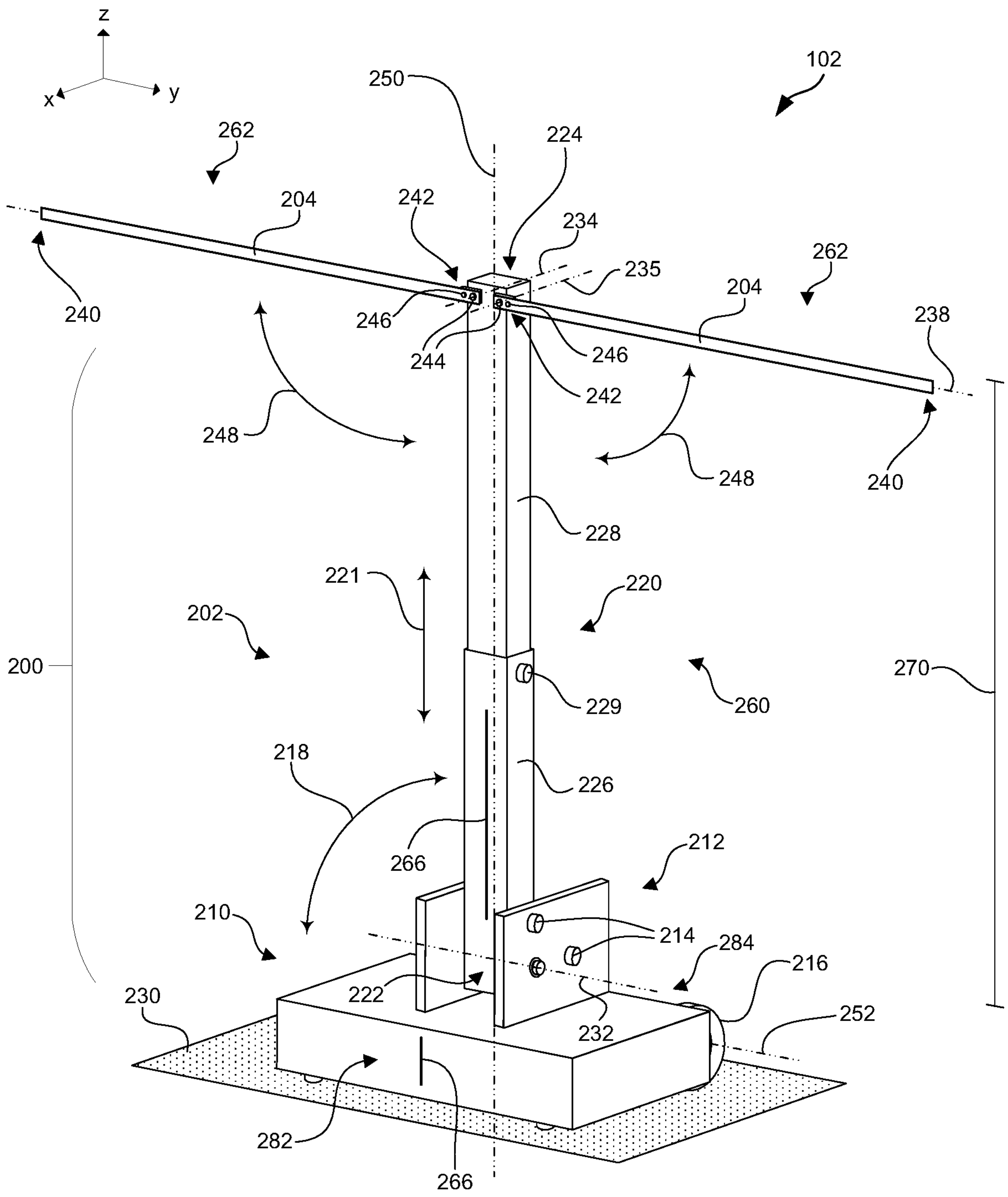
FIG. 2 is a perspective view of a calibration fixture in an illustrative embodiment.

FIG. 2 is a perspective view of the calibration fixture 102 in an illustrative embodiment. FIG. 2 is not drawn to scale. As described in more detail below, calibration fixture 102 is configured to transition between a folded configuration, and an unfolded configuration 200 as shown in FIG. 2. In an embodiment, calibration fixture 102 comprises a main frame 202 and a pair of arms 204. Main frame 202 represents the structure that supports the arms 204, and comprises a base member 210 and a pillar member 220. Base member 210 is configured to rest on a supporting surface 230. A supporting surface 230 refers to any surface upon which a vehicle is parked for calibration. For a typical calibration, the vehicle is parked on a flat, level surface or a surface of limited slope. Thus, supporting surface 230 may comprise the surface of a floor of a building (e.g., concrete floor), the surface of the ground, etc. Supporting surface 230 defines a horizontal plane along the x-y axis.

Pillar member 220 is an elongated member that is coupled or connected to base member 210. Pillar member 220 comprises a bottom end portion 222 (or first end portion) coupled to base member 210 via a pivotal coupling 212. A pivotal coupling 212 is a type of coupling that joins to two members while allowing for rotation of the members in relation to one another about an axis. Through pivotal coupling 212, pillar member 220 is configured to pivot or rotate about a horizontal axis 232 in relation to base member 210 (as illustrated by arrow 218) between an upright position 260 where pillar member 220 is substantially vertical and a folded position where pillar member 220 is substantially horizontal. When in the unfolded configuration 200, pillar member 220 is disposed in the upright position 260 in relation to base member 210/supporting surface 230. In an embodiment, pillar member 220 may be perpendicular or substantially perpendicular to the horizontal plane of supporting surface 230 when in the upright position 260. Thus, pillar member 220 may also be referred to as an upright support member, a vertical support member, a mast member, etc. Main frame 202 may further include a lock mechanism 214 configured to lock or secure pillar member 220 in the upright position 260.

Pillar member 220 further comprises a top end portion 224 (or second end portion) opposite the bottom end portion 222. Arms 204 are coupled to pillar member 220 at or adjacent to top end portion 224. Because calibration fixture 102 is collapsible and it is desirable for calibration fixture 102 to fold into a smaller form for transport, it may be desirable for arms 204 to be coupled to pillar member 220 in close proximity to top end portion 224. However, arms 204 may be coupled to pillar member 220 at other positions between top end portion 224 and bottom end portion 222. An arm 204 is an elongated member having a free end 240 and a connected end 242. The connected end 242 of an arm 204 is coupled or connected to pillar member 220 via a pivotal coupling 244. Through pivotal coupling 244, the arm 204 is configured to pivot or rotate about a horizontal axis 234/235 in relation to pillar member 220 (as illustrated by arrows 248) between an expanded position 262 where the arm 204 is substantially horizontal and a collapsed position where the arm 204 is substantially vertical. In an embodiment, horizontal axes 234/235 are substantially parallel to one another, and substantially perpendicular to the horizontal axis 232 upon which pillar member 220 rotates.

When in the unfolded configuration 200 of calibration fixture 102, an arm 204 is disposed in expanded position 262 in relation to pillar member 220. For example, the left arm 204 (also referred to as a first arm) in FIG. 2 is configured to pivot or rotate about horizontal axis 234 in relation to pillar member 220 via a pivotal coupling 244 so that the free end 240 rotates upward. Similarly, the right arm 204 (also referred to as the second arm) is configured to pivot about a horizontal axis 235 in relation to pillar member 220 via a pivotal coupling 244 so that the free end 240 rotates upward. When expanded, each arm 204 projects from pillar member 220 substantially perpendicular from a longitudinal centerline 250 of pillar member 220, and/or substantially perpendicular to the horizontal plane of supporting surface 230. In other words, the horizontal axes 234-235 on which the arms 204 pivot, are substantially parallel along a horizontal plane (i.e., an x-y plane). Thus, the arms 204 may be collinear when in the expanded position 262 as shown in FIG. 2, and aligned along a horizontal axis 238. Each arm 204 may further include a lock mechanism 246 configured to lock or secure the arm 204 in the expanded position 262.

In an embodiment, the length 270 of pillar member 220 is adjustable. For example, pillar member 220 may comprise a telescoping member, which provides for an adjustable length 270 as indicated by arrow 221. Pillar member 220 may comprise a mast tube 226, and a slide tube 228 telescopically slidable within a hollow portion of the mast tube 226 to vary or adjust the length 270 of pillar member 220. Pillar member 220 may further include a lock mechanism 229 configured to lock or secure slide tube 228 to mast tube 226 to fix the length 270 of pillar member 220 at a desired length.

In an embodiment, base member 210 has a front side 282 and a rear side 284. Pillar member 220 is configured to fold toward the front side 282 of base member 210. Base member 210 comprises one or more wheels 216 disposed toward the rear side 284. In an embodiment, wheels 216 are configured to rotate about a horizontal axis 252. Horizontal axis 252 may be substantially parallel to the horizontal axis 232 upon which pillar member 220 rotates. When pillar member 220 is folded toward the front side 282 of base member 210, the wheels 216 on the rear side 284 of base member 210 may be used to move calibration fixture 102.

Figure 3:
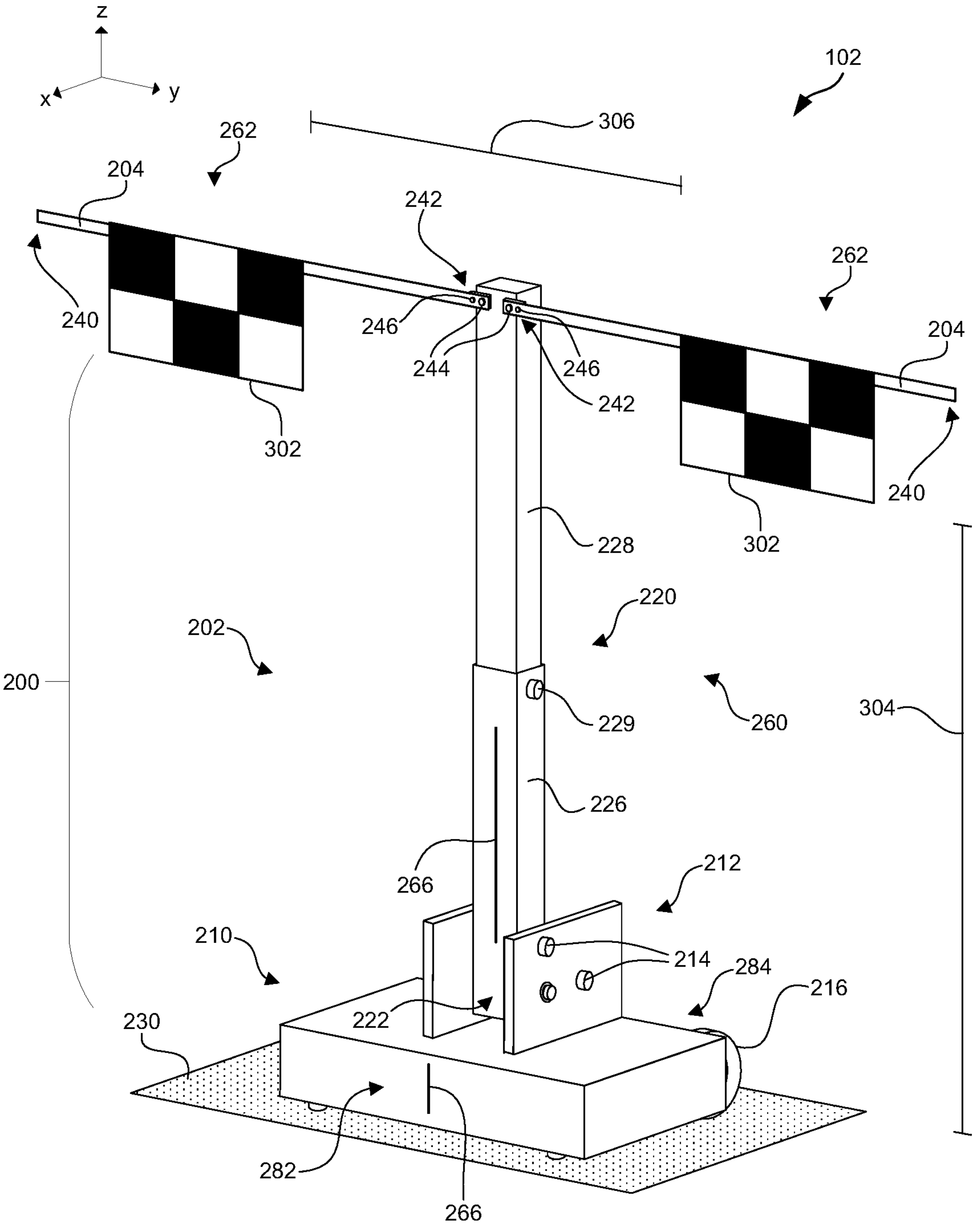
FIG. 3 is a perspective view of a calibration fixture holding calibration targets in an illustrative embodiment.

FIG. 3 is a perspective view of the calibration fixture 102 holding calibration targets 302 in an illustrative embodiment. FIG. 3 is not drawn to scale. A calibration target 302 has a pattern used to calibrate a vehicle, such as enlarged black and white patterns as illustrated in FIG. 3. The pattern of the calibration targets 302 may depend on the type of vehicle being calibrated, as one example is shown. The calibration targets 302 are mounted on the arms 204 of the calibration fixture 102. Calibration fixture 102 is configured to hold the calibration targets 302 at a fixed height 304 from the supporting surface 230, and a fixed distance 306 apart.

Figure 4:
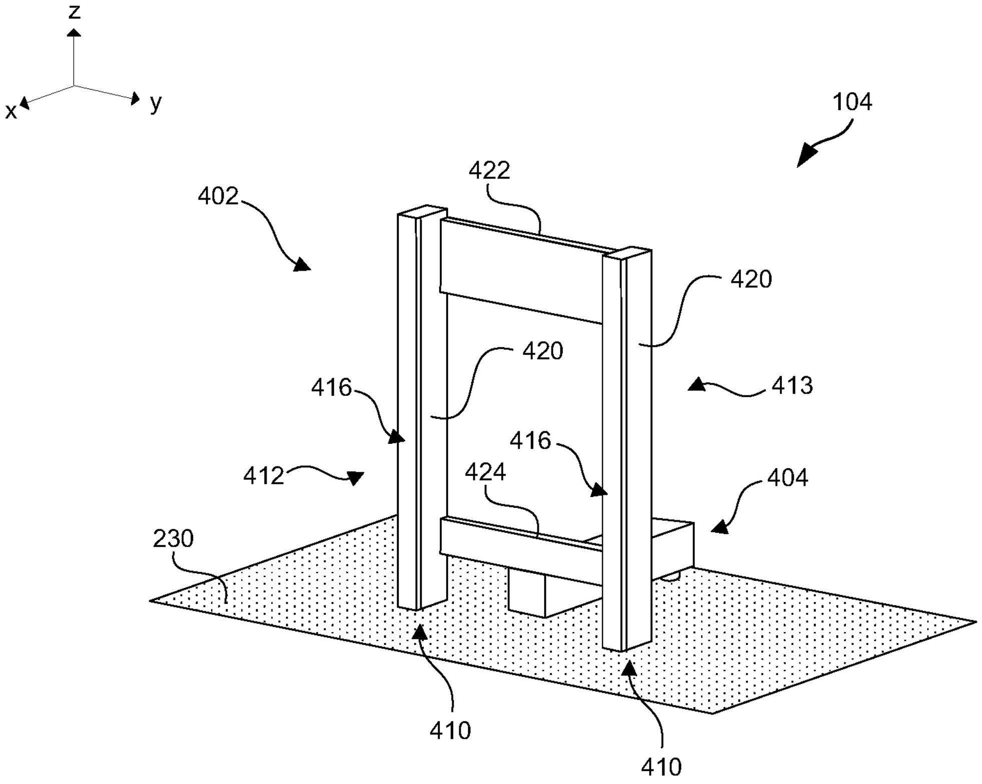
FIG. 4 is a perspective view of a (front) bumper alignment fixture in an illustrative embodiment.

FIG. 4 is a perspective view of (front) bumper alignment fixture 104 in an illustrative embodiment. FIG. 4 is not drawn to scale. Bumper alignment fixture 104 includes a main body 402 that supports a laser assembly 404. Main body 402 has a bottom end 410 and opposing sides 412-413. The bottom end 410 of main body 402 is configured to rest on the supporting surface 230 (i.e., the same supporting surface as the vehicle and the calibration fixture 102). One side 412 (referred to as the vehicle side) faces toward the vehicle in operation, and includes one or more contact surfaces 416 configured to contact the front bumper of the vehicle. The other side 413 (referred to as the calibration fixture side) faces toward the calibration fixture 102 in operation. In an embodiment, the main body 402 comprises side posts 420 disposed substantially vertical and aligned in parallel, and a connecting member 422 disposed between the side posts 420. Main body 402 also includes a hanger bracket 424 that connects to the laser assembly 404.

Figure 5:
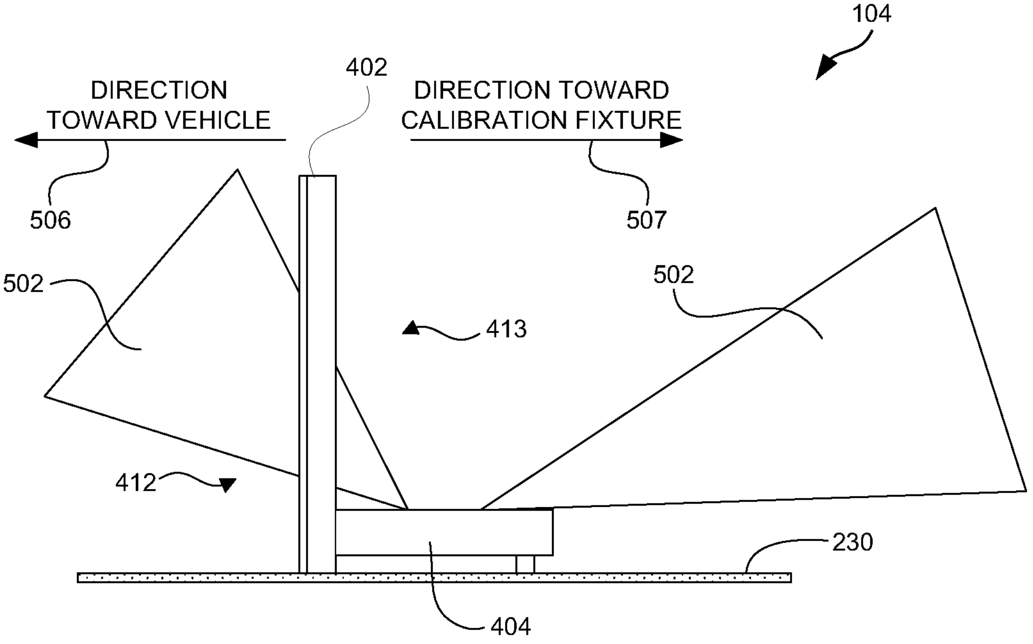
FIG. 5 is a side view of a (front) bumper alignment fixture in an illustrative embodiment.

Laser assembly 404 includes one or more lasers, one or more mirrors, and/or other components configured to emit or project one or more laser lines. FIG. 5 is a side view of bumper alignment fixture 104 in an illustrative embodiment. FIG. 5 is not drawn to scale. Laser assembly 404 is configured to project a laser line 502 from the vehicle side 412 of bumper alignment fixture 104, which is in a direction 506 toward the vehicle in operation. Laser assembly 404 is also configured to project a laser line 502 from the calibration fixture side 413 of bumper alignment fixture 104, which is in a direction 507 toward the calibration fixture 102 in operation. A laser line is a projection of a laser beam as a line rather than a point.

As described above, bumper alignment fixture 104 is used to align the calibration fixture 102 with a vehicle. To do so, the laser lines 502 are oriented substantially vertical or perpendicular in relation to the supporting surface 230. The laser lines 502 are projected in opposite directions 506-507, and are coplanar. The laser line 502 projected from the vehicle side 412 of bumper alignment fixture 104 is used to align the bumper alignment fixture 104 with the centerline of the vehicle, while the laser line 502 projected from the calibration fixture side 413 of bumper alignment fixture 104 is used to align the calibration fixture 102 with the bumper alignment fixture 104. In an embodiment, calibration fixture 102 may include one or more laser indicators 266 as shown in FIG. 2. A laser indicator 266 comprises an elongated cut, groove, or other vertical feature upon which a laser line is visible. The laser indicators 266 are used to align calibration fixture 102 according to the laser line 502 projected from the calibration fixture side 413 of bumper alignment fixture 104.

Figure 6:
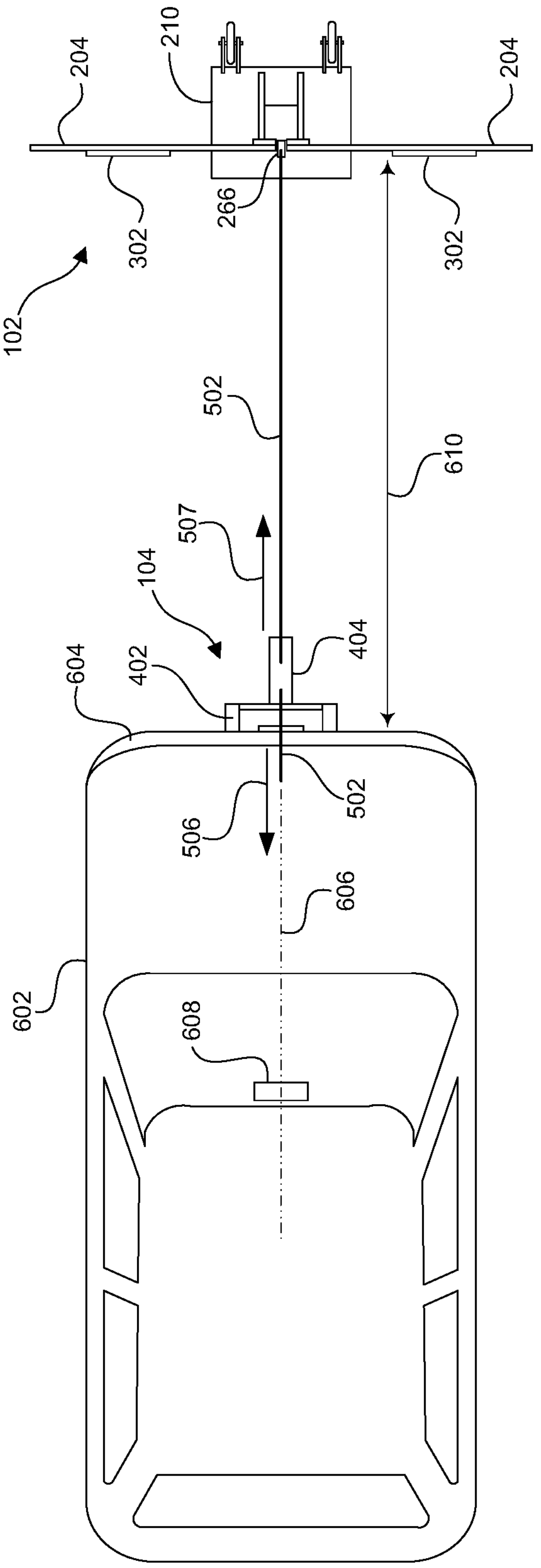
FIG. 6 is a plan view of a (front) bumper alignment fixture and calibration fixture in an illustrative embodiment.

FIG. 6 is a plan view of bumper alignment fixture 104 and calibration fixture 102 in an illustrative embodiment. FIG. 6 is not drawn to scale. In this embodiment, a static calibration procedure is being performed on a vehicle 602 using the portable calibration assembly 100, such as to calibrate of one or more sensors 608 (e.g., ADAS sensors) of the vehicle 602. For the calibration procedure, bumper alignment fixture 104 is placed against the front bumper 604 of the vehicle 602 (i.e., the contact surfaces 416 contact the front bumper 604). The laser assembly 404 projects a laser line 502 from the vehicle side 412 of bumper alignment fixture 104 in the direction 506 toward the vehicle 602. The laser line 502 projected on the vehicle 602 is used to align the bumper alignment fixture 104 with a centerline 606 of the vehicle 602. Calibration fixture 102 (in the unfolded configuration 200) is placed a predetermined distance 610 from the front bumper 604 of the vehicle 602. Concurrently, the laser assembly 404 projects a laser line 502 from the calibration fixture side 413 of bumper alignment fixture 104 in the direction 507 toward the calibration fixture 102. Calibration fixture 102 is aligned with the vehicle 602 by aligning the laser line 502 with the laser indicators 266 of calibration fixture 102. After bumper alignment fixture 104 and calibration fixture 102 are properly aligned with vehicle 602, the calibration may begin based on the calibration targets 302 held by the arms 204 of the calibration fixture 102.

Figure 7:
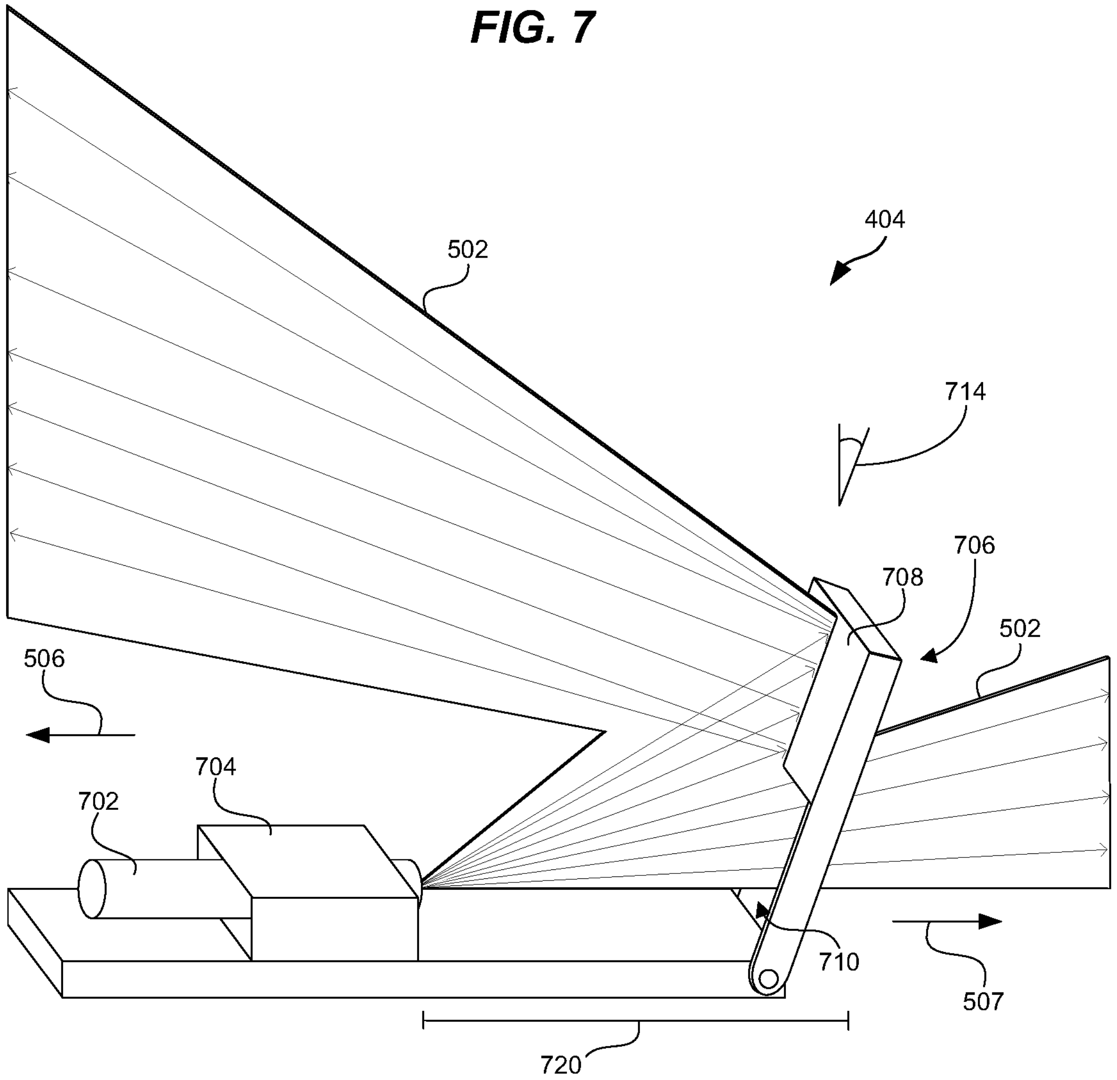
FIG. 7 illustrates a laser assembly in an illustrative embodiment.

Laser assembly 404 may have a variety of configurations. FIG. 7 illustrates a laser assembly 404 in an illustrative embodiment. FIG. 7 is not drawn to scale. In an embodiment, laser assembly 404 includes a line laser device 702, a laser mount bracket 704, and a reflector 706. Laser mount bracket 704 secures line laser device 702 to point toward reflector 706. Line laser device 702 and reflector 706 are spaced apart by a distance 720. Line laser device 702 (also referred to as a line laser module, a line laser projector, a fan laser device, etc.) is configured to project a laser line 502 in a direction 507 toward the reflector 706 (i.e., toward the calibration fixture 102 in operation). The fan angle (i.e., the angular spread of a laser beam) of line laser device 702 may be configurable. Laser mount bracket 704 secures line laser device 702 so that the laser line 502 is oriented generally vertical. Reflector 706 includes one or more mirrors 708 facing line laser device 702. Mirror 708 is configured to reflect a portion of the laser line 502 back in the opposite direction 506 (i.e., toward the vehicle 602 in operation). In an embodiment, reflector 706 also includes an opening, hole, slot, or aperture 710 disposed below the mirror 708. A portion of the laser line 502 is reflected by the mirror 708, while a portion of the laser line 502 passes through the aperture 710 and continues in direction 507. Mirror 708 may be mounted at an angle 714 in relation to vertical to reflect the laser line 502 at an upward angle in direction 506. One technical benefit is a single line laser device 702 may be implemented to project a laser line 502 in opposing directions 506-507 from bumper alignment fixture 104.

Figure 8:
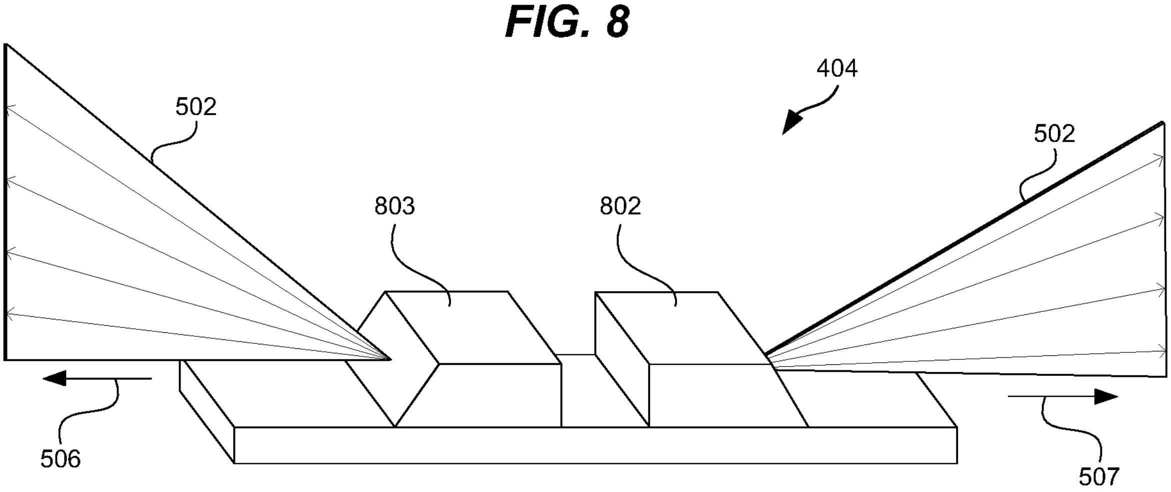
FIG. 8 illustrates a laser assembly in another illustrative embodiment.

FIG. 8 illustrates a laser assembly 404 in another illustrative embodiment. In this embodiment, laser assembly 404 includes a pair of line laser devices 802-803 mounted facing opposite directions 506-507. Thus, line laser device 802 is configured to project a laser line 502 in one direction 507 (i.e., toward the calibration fixture 102 in operation), while line laser device 803 is configured to project a laser line 502 in the opposite direction 506 (i.e., toward the vehicle 602 in operation). One technical benefit is laser lines 502 may be projected in opposing directions 506-507 from bumper alignment fixture 104.

Figure 9:
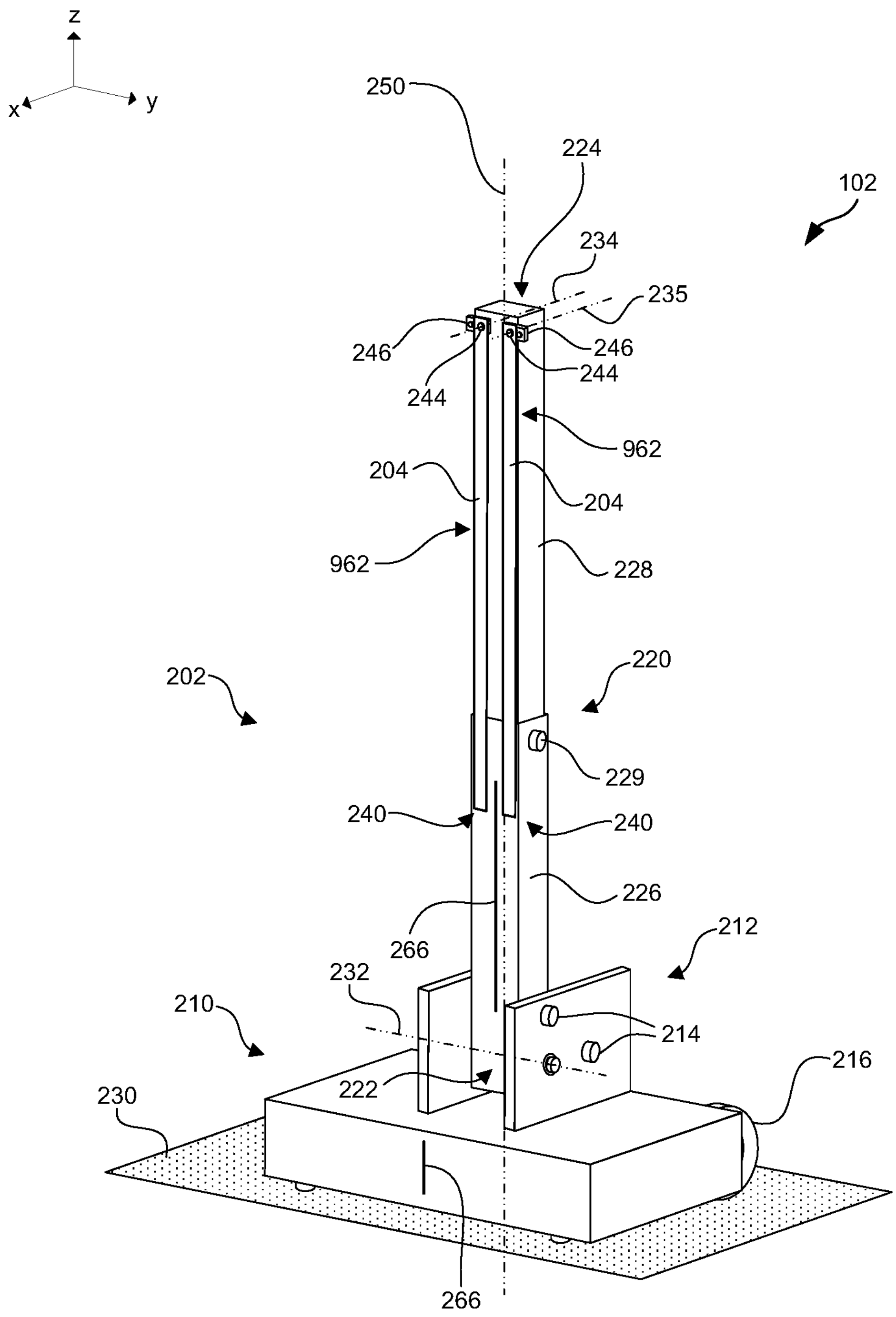
FIG. 9 is a perspective view of a calibration fixture with arms in a collapsed position in an illustrative embodiment.

The structure and design of calibration fixture 102 allow for it to be collapsible. For example, arms 204 are configured to transition between an expanded position 262 as in FIG. 2 where the arms 204 are collinear, and a collapsed position where the arms 204 are parallel to one another. FIG. 9 is a perspective view of calibration fixture 102 with arms 204 in a collapsed position 962 in an illustrative embodiment. In FIG. 9, arms 204 are folded inward toward the pillar member 220. The left arm 204 in FIG. 9 is configured to pivot or rotate about horizontal axis 234 in relation to pillar member 220 via pivotal coupling 244 so that the free end 240 rotates downward. Similarly, the right arm 204 is configured to pivot about horizontal axis 235 in relation to pillar member 220 via pivotal coupling 244 so that the free end 240 rotates downward. In the collapsed position 962, arms 204 may hang substantially parallel to one another as shown in FIG. 9. Lock mechanism 246 may lock or secure the arms 204 in the collapsed position 962.

Figure 10:
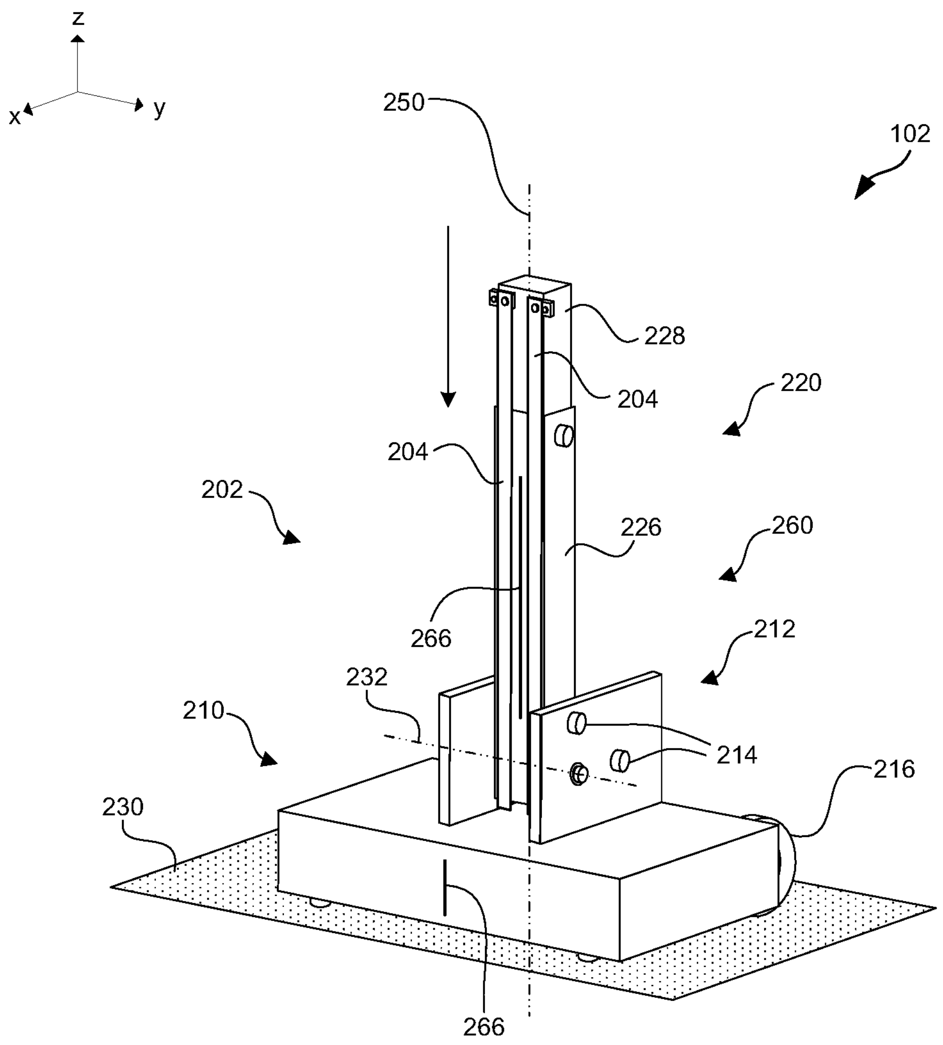
FIG. 10 is a perspective view of a calibration fixture with pillar member contracted in an illustrative embodiment.

Further, the length of pillar member 220 is able to be adjusted or varied. As described above, pillar member 220 may comprise a telescoping member, and slide tube 228 may be slid into mast tube 226 to reduce the length 270 of pillar member 220. FIG. 10 is a perspective view of calibration fixture 102 with pillar member 220 contracted in an illustrative embodiment. With slide tube 228 slid into mast tube 226 as in FIG. 10, the length 270 of pillar member 220 is reduced.

Figure 11:
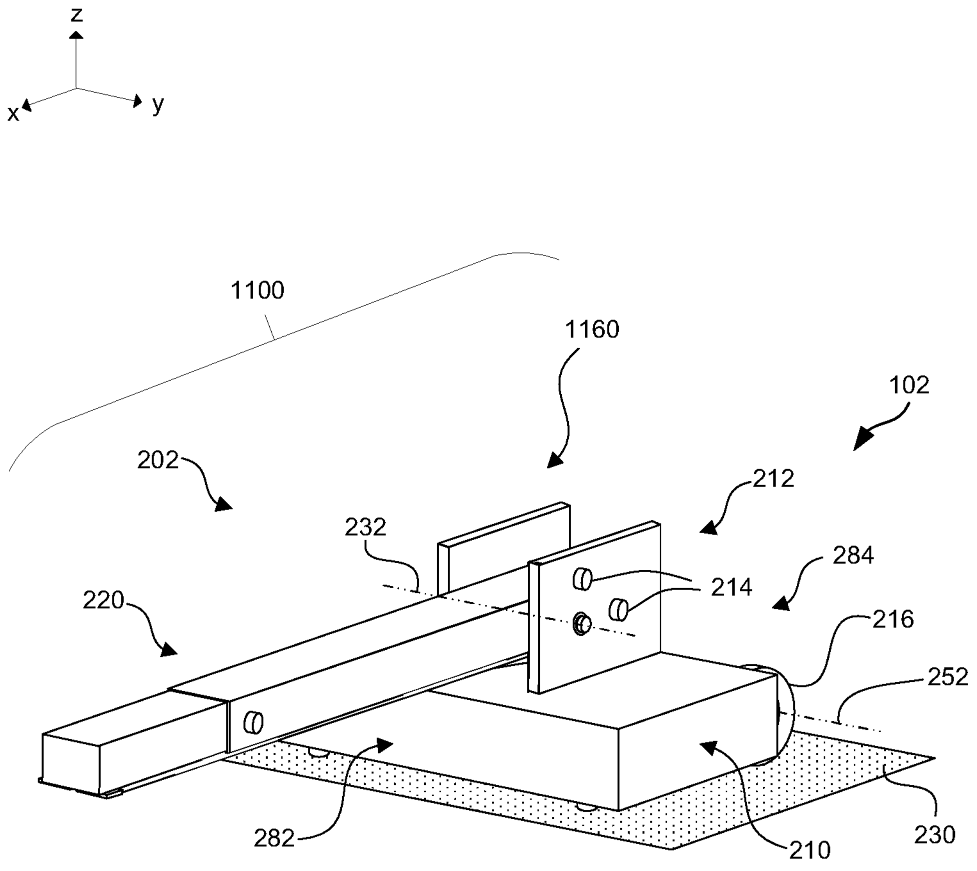
FIG. 11 is a perspective view of a calibration fixture with pillar member in a folded position in an illustrative embodiment.

Further, pillar member 220 may fold in relation to base member 210. FIG. 11 is a perspective view of calibration fixture 102 with pillar member 220 in a folded position 1160 in an illustrative embodiment. As described above, pillar member 220 is configured to fold toward the front side 282 of base member 210. When in the folded position 1160, pillar member 220 is disposed substantially horizontal instead of vertical, with base member 210 resting on supporting surface 230. Lock mechanism 214 may lock or secure pillar member 220 in the folded position 1160. When pillar member 220 is folded toward the front side 282 of base member 210 as in FIG. 11, the wheels 216 on the rear side 284 of base member 210 may be used to move calibration fixture 102. FIG. 11 also illustrates the folded configuration 1100 of calibration fixture 102, with the arms 204 in the collapsed position 962, the pillar member 220 contracted, and the pillar member 220 in the folded position 1160. One technical benefit is calibration fixture 102 has a more compact form in the folded configuration 1100, which makes transport of the calibration fixture 102 easier.

Figure 12B:
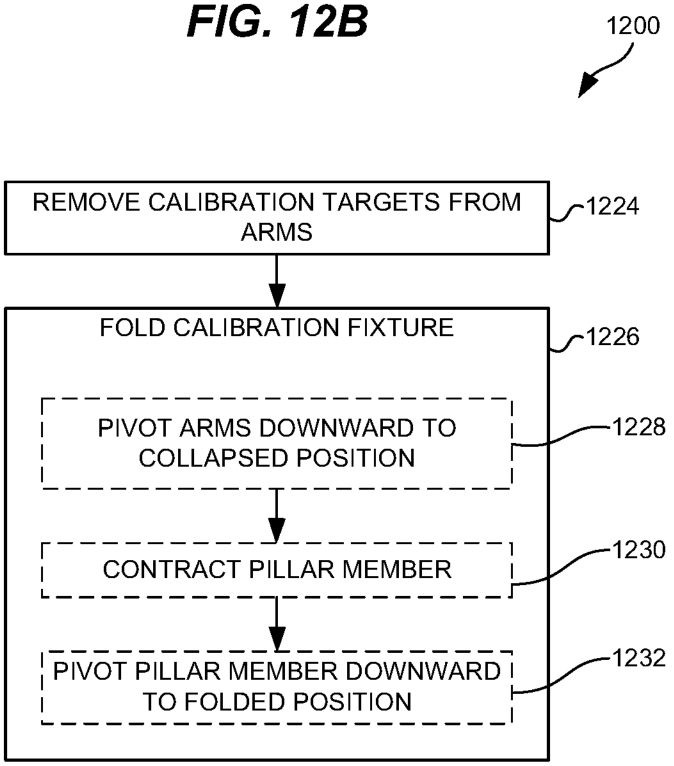

FIGS. 12A-12B are flow charts illustrating a method 1200 of using a portable calibration assembly 100 in an illustrative embodiment. The steps of the flow charts described herein are not all inclusive and may include other steps not shown, and the steps may be performed in an alternative order. In FIG. 12A, it is assumed that a portable calibration assembly 100 as described above is obtained, and is transported to the location of the vehicle 602 (or the vehicle 602 is brought to the location of the portable calibration assembly 100). The calibration fixture 102 is placed in front of the vehicle 602 (step 1202), with base member 210 resting on the supporting surface 230. Initially, calibration fixture 102 is in the folded configuration 1100, such as for transport. Calibration fixture 102 may then be unfolded (step 1204). In other words, the calibration fixture 102 is converted from the folded configuration 1100 to the unfolded configuration 200. When calibration fixture 102 is folded and base member 210 is placed on the supporting surface 230, pillar member 220 is disposed substantially horizontal to the supporting surface 230 (see FIG. 11). To unfold calibration fixture 102, pillar member 220 is swung or pivoted upward in relation to base member 210 to an upright position 260 (step 1206). For example, lock mechanism 214 is released or disengaged, and pillar member 220 pivots about horizontal axis 232 in relation to base member 210 to the upright position 260, as shown in FIG. 10. With pillar member 220 in the upright position 260, lock mechanism 214 may engage to secure pillar member 220. The length of pillar member 220 is extended (step 1208). For example, lock mechanism 229 is released or disengaged, and slide tube 228 is slid outward from mast tube 226 to extend the length 270 of pillar member 220, as shown in FIG. 9. The length 270 of pillar member 220 may be extended to a predetermined length based on a type of the vehicle 602 being calibrated. With pillar member 220 extended, lock mechanism 229 may engage to secure slide tube 228 to mast tube 226. Arms 204 of calibration fixture 102 are swung or pivoted upward in relation to pillar member 220 to the expanded position 262 (step 1210), such as shown in FIG. 2. For example, the left arm 204 pivots about horizontal axis 234 in relation to pillar member 220 to the expanded position 262. With the left arm 204 in the expanded position 262, lock mechanism 246 may engage to secure the left arm 204 extending substantially horizontal from pillar member 220. Likewise, the right arm 204 pivots about horizontal axis 235 in relation to pillar member 220 to the expanded position 262. With the right arm 204 in the expanded position 262, lock mechanism 246 may engage to secure the right arm 204 extending substantially horizontal from pillar member 220.

With calibration fixture 102 unfolded, calibration fixture 102 is positioned a predetermined distance 610 from the vehicle 602 (step 1212). For example, a tape measure, a laser measure, a range finder, etc., may be used to position the calibration fixture 102 at the predetermined distance 610. Calibration targets 302 are installed on the arms 204 (step 1214). At this point, any other adjustments or fine tuning may be made to the calibration fixture 102 and/or the position of the calibration targets 302 based on the specifications for the vehicle 602, such as the height 304 of the calibration targets 302, the distance 306 between the calibration targets 302, etc.

Bumper alignment fixture 104 is placed against the front bumper 604 of the vehicle 602 (step 1216), and is aligned with the centerline 606 of the vehicle 602 via a laser line 502 projecting in the vehicle direction 506 from the bumper alignment fixture 104 (step 1218), as shown in FIG. 6. With the bumper alignment fixture 104 aligned with the centerline 606 of the vehicle 602, calibration fixture 102 is aligned with the vehicle 602 (step 1220). For example, calibration fixture 102 may be aligned with the vehicle 602 by aligning the laser indicator(s) 266 of calibration fixture 102 with the laser line 502 projecting in the calibration fixture direction 507 from the bumper alignment fixture 104. With calibration fixture 102 aligned with the vehicle 602, calibration of one or more sensors 608 of the vehicle 602 may be performed (step 1222). One technical benefit is calibration fixture 102 is quickly and easily transformed from a folded configuration 1100 to an unfolded configuration 200 for a calibration, such as at a location of the vehicle 602.

In FIG. 12B, with calibration of the sensors 608 completed, calibration targets 302 are removed from the arms 204 (step 1224). Calibration fixture 102 may then be folded (step 1226), such as for transport to another location. In other words, the calibration fixture 102 is converted from the unfolded configuration 200 to the folded configuration 1100. To fold calibration fixture 102, arms 204 of calibration fixture 102 are swung or pivoted downward in relation to pillar member 220 to the collapsed position 962 (step 1228), such as shown in FIG. 9. For example, the left arm 204 pivots about horizontal axis 234 in relation to pillar member 220 to the collapsed position 962. With the left arm 204 in the collapsed position 962, lock mechanism 246 may engage to secure the left arm 204 substantially parallel to pillar member 220. Likewise, the right arm 204 pivots about horizontal axis 235 in relation to pillar member 220 to the collapsed position 962. With the right arm 204 in the collapsed position 962, lock mechanism 246 may engage to secure the right arm 204 substantially parallel to pillar member 220. Thus, the arms 204 are disposed substantially parallel to one another and to pillar member 220. With the arms 204 collapsed, pillar member 220 is contracted (step 1230). For example, lock mechanism 229 is released or disengaged, and slide tube 228 is slid inward into mast tube 226 to reduce the length 270 of pillar member 220, as shown in FIG. 10. With pillar member 220 contracted, lock mechanism 229 may engage to secure slide tube 228 to mast tube 226. Pillar member 220 is swung or pivoted downward in relation to base member 210 to folded position 1160 (step 1232). For example, lock mechanism 214 is released or disengaged, and pillar member 220 pivots about horizontal axis 232 in relation to base member 210 to the folded position 1160, as shown in FIG. 11. With pillar member 220 in the folded position 1160, lock mechanism 214 may engage to secure pillar member 220. Calibration fixture 102 is therefore in the folded configuration 1100 as shown in FIG. 11. Calibration fixture 102 may then be moved, such as on wheels 216 of base member 210. One technical benefit is calibration fixture 102 is transformed into a smaller, folded configuration 1100, such as for transport to another location.

EXAMPLE

The following describes a portable calibration assembly in an illustrative embodiment, which is an example of a portable calibration assembly 100 described above. One or more of the features described below for a portable calibration assembly may be implemented in the portable calibration assembly 100 described above, and vice-versa.

Figure 13:
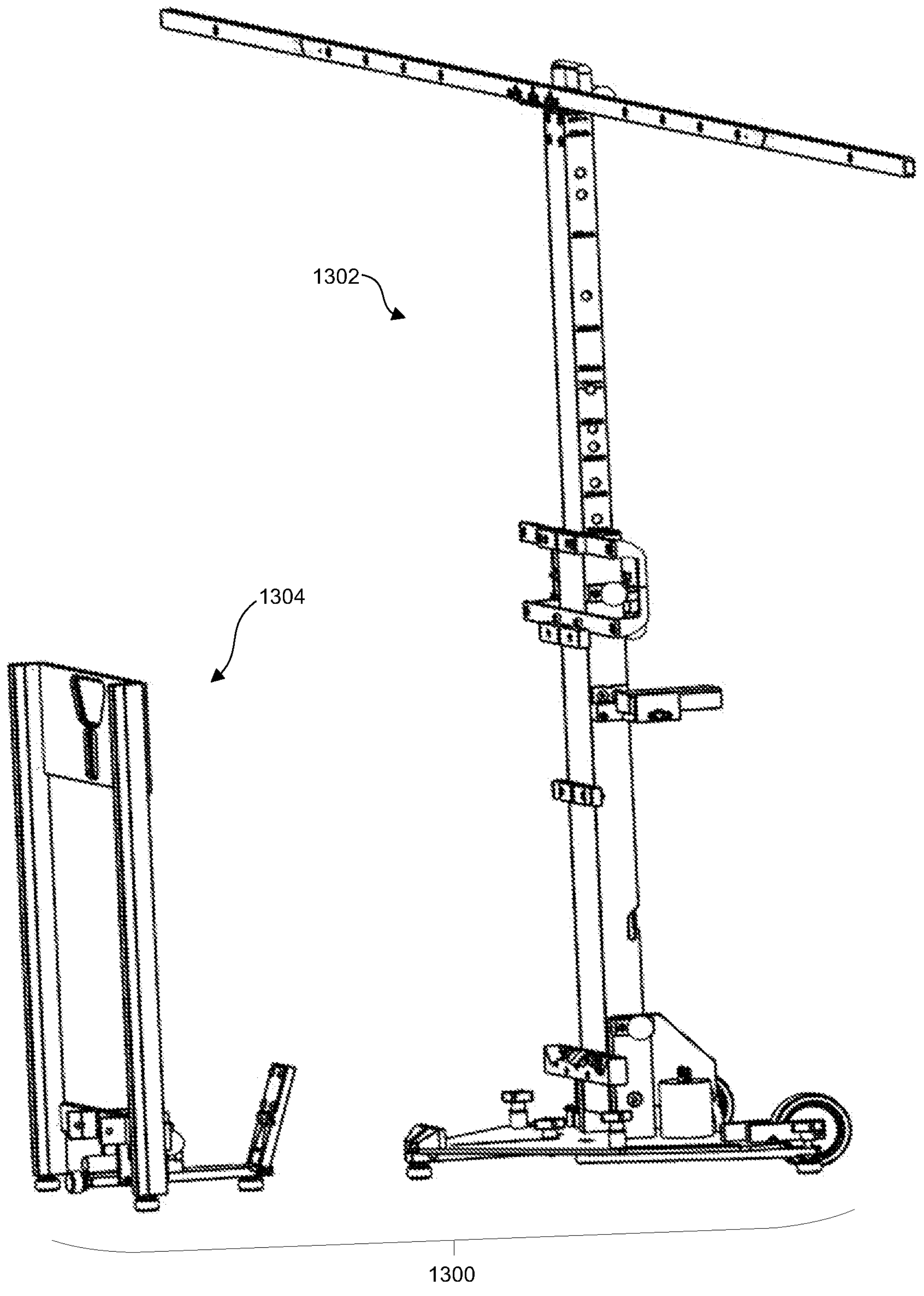
FIG. 13 is a perspective view of a portable calibration assembly in an illustrative embodiment.

FIG. 13 is a perspective view of a portable calibration assembly 1300 in an illustrative embodiment. Portable calibration assembly 1300 comprises ADAS calibration equipment used for static calibration of one or more sensors 608 (e.g., ADAS sensors) of a vehicle 602. In this embodiment, portable calibration assembly 1300 includes a calibration fixture 1302 and a (front) bumper alignment fixture 1304.

Figure 14:
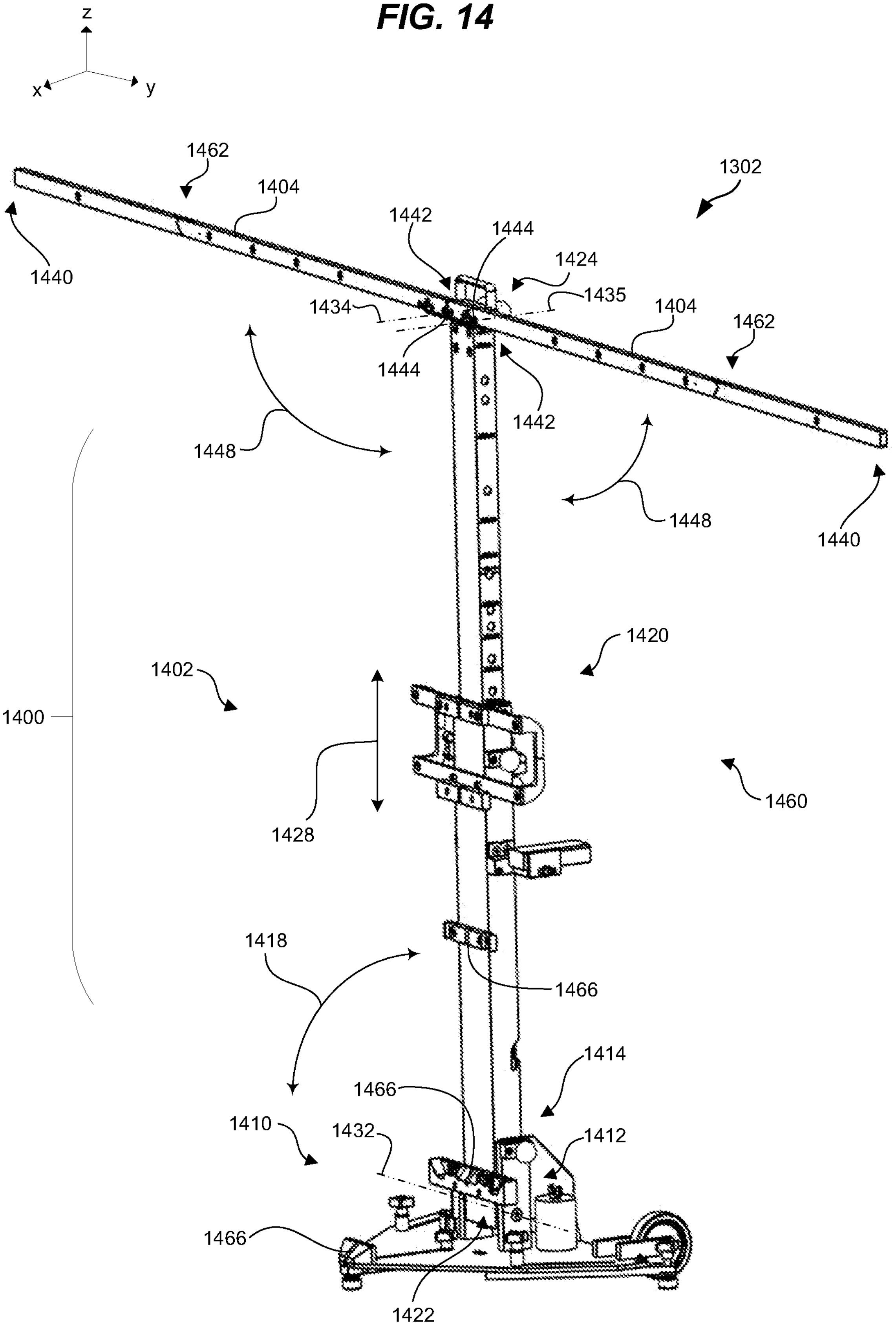
FIG. 14 is a perspective view of a calibration fixture in an illustrative embodiment.

FIG. 14 is a perspective view of the calibration fixture 1302 in an illustrative embodiment. Calibration fixture 1302 is configured to transition between a folded configuration, and an unfolded configuration 1400 as shown in FIG. 14. In an embodiment, calibration fixture 1302 comprises a main frame 1402 and a pair of arms 1404. Main frame 1402 represents the structure that supports the arms 1404, and comprises a base member 1410 configured to rest on a supporting surface 230 (as described above), and a pillar member 1420. In general, the transition between a folded configuration and an unfolded configuration 1400 comprises pillar member 1420 pivoting in relation to the base member 1410 (as illustrated by arrow 1418), pillar member 1420 extending or retracting in length (as illustrated by arrow 1428), and arms 1404 pivoting in relation to the pillar member 1420 (as illustrated by arrows 1448). These structural relations provide for a collapsible calibration fixture 1302.

Pillar member 1420 is an elongated member that is coupled or connected to base member 1410. Pillar member 1420 has a bottom end portion 1422 (or first end portion) coupled to base member 1410 via a pivotal coupling 1412. Through pivotal coupling 1412, pillar member 1420 is configured to pivot or rotate about a horizontal axis 1432 in relation to base member 1410. When in the unfolded configuration 1400, pillar member 1420 is disposed in an upright position 1460 in relation to base member 1410/supporting surface 230. In an embodiment, pillar member 1420 may be perpendicular or substantially perpendicular to the horizontal plane of supporting surface 230 when in the upright position 1460. Thus, pillar member 1420 may also be referred to as an upright support member, a vertical support member, etc. Main frame 1402 may further include a lock mechanism 1414 configured to lock or secure pillar member 1420 in the upright position 1460, or in a folded position.

Pillar member 1420 has a top end portion 1424 (or second end portion) opposite the bottom end portion 1422, and arms 1404 are coupled to pillar member 1420 at the top end portion 1424. Each arm 1404 has a free end 1440 and a connected end 1442. The connected end 1442 of an arm 1404 is coupled or connected to pillar member 1420 via a pivotal coupling 1444. Through pivotal coupling 1444, the arm 1404 is configured to pivot or rotate about a horizontal axis 1434/1435 in relation to pillar member 1420. In an embodiment, horizontal axis 1434/1435 are perpendicular to the horizontal axis 1432 upon which pillar member 1420 rotates.

When in the unfolded configuration 1400 of calibration fixture 1302, an arm 1404 is disposed in an expanded position 1462 in relation to pillar member 1420. For example, the left arm 1404 (also referred to as a first arm) in FIG. 14 is configured to pivot or rotate about horizontal axis 1434 in relation to pillar member 1420 via a pivotal coupling 1444 so that the free end 1440 rotates upward. Similarly, the right arm 1404 (also referred to as a second arm) is configured to pivot about a horizontal axis 1435 in relation to pillar member 1420 via a pivotal coupling 1444 so that the free end 1440 rotates upward. When expanded, each arm 1404 projects from pillar member 1420 substantially perpendicular to pillar member 1420, and/or substantially parallel to the horizontal plane of supporting surface 230.

As described in more detail below, calibration fixture 1302 includes one or more laser indicators 1466 disposed on base member 1410 and/or pillar member 1420.

Figure 15:
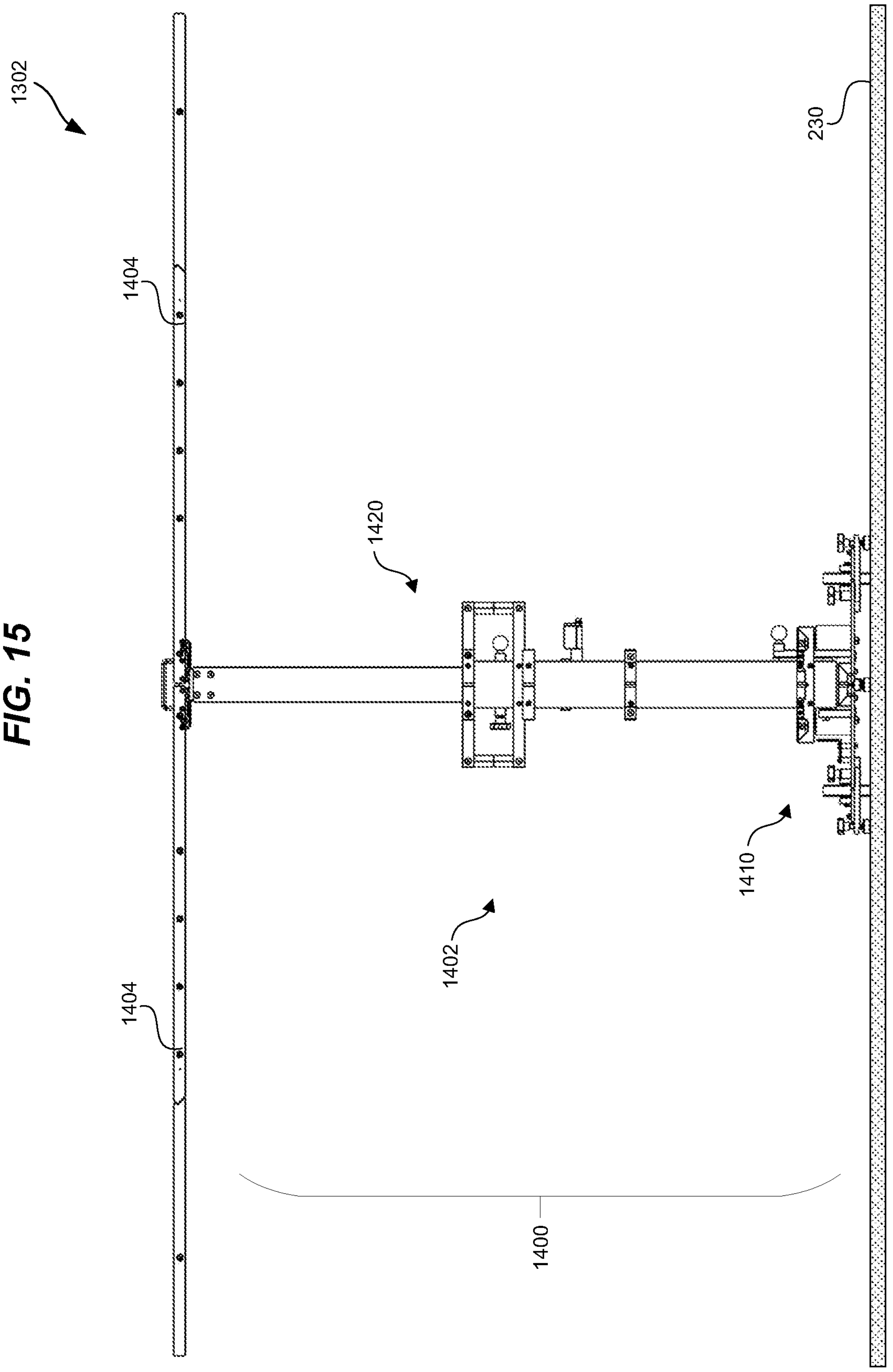
FIG. 15 is a front view of a calibration fixture in an illustrative embodiment.
Figure 16:
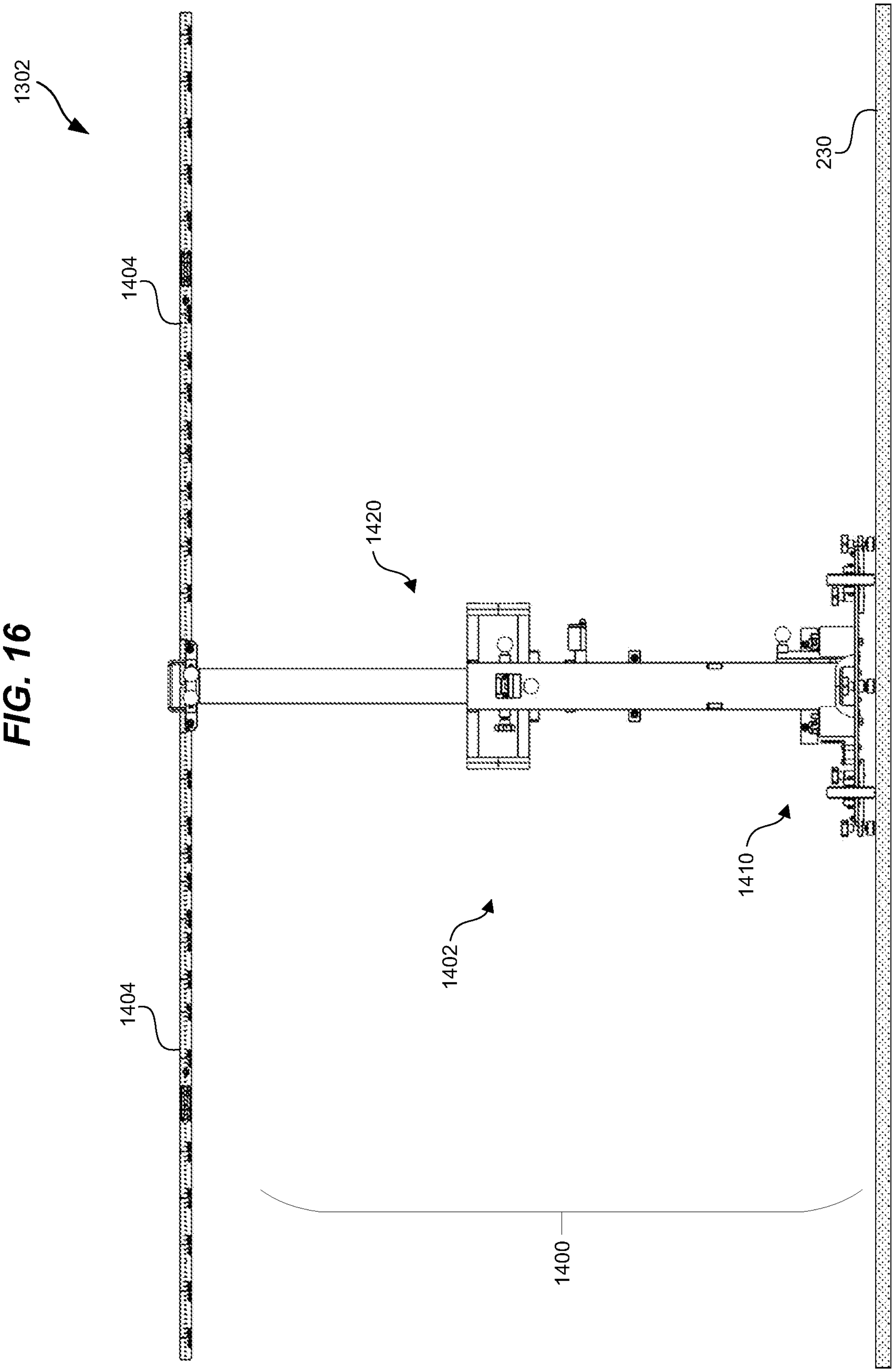
FIG. 16 is a rear view of a calibration fixture in an illustrative embodiment.

FIG. 15 is a front view of the calibration fixture 1302 and FIG. 16 is a rear view of the calibration fixture 1302 in an illustrative embodiment. Calibration fixture 1302 is in the unfolded configuration 1400 in FIGS. 15-16. Base member 1410 is configured to rest on supporting surface 230. With calibration fixture 1302 in the unfolded configuration 1400, pillar member 1420 is disposed substantially vertical or upright, which is substantially perpendicular to the supporting surface 230. Arms 1404 are disposed substantially horizontal, which is substantially parallel to supporting surface 230 and substantially perpendicular to pillar member 1420.

Figure 17:
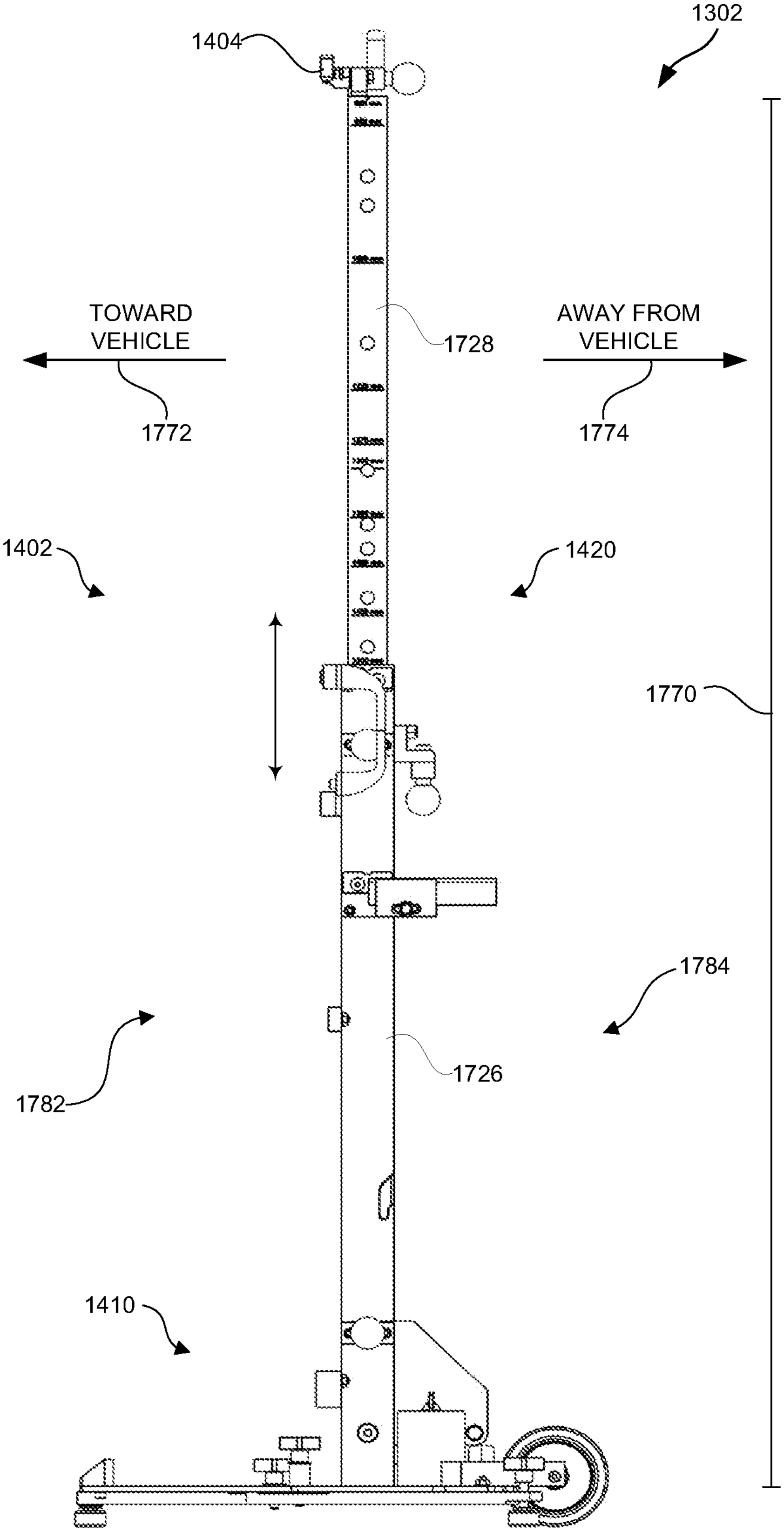
FIGS. 17-18 are side views of a calibration fixture in an illustrative embodiment.
Figure 18:
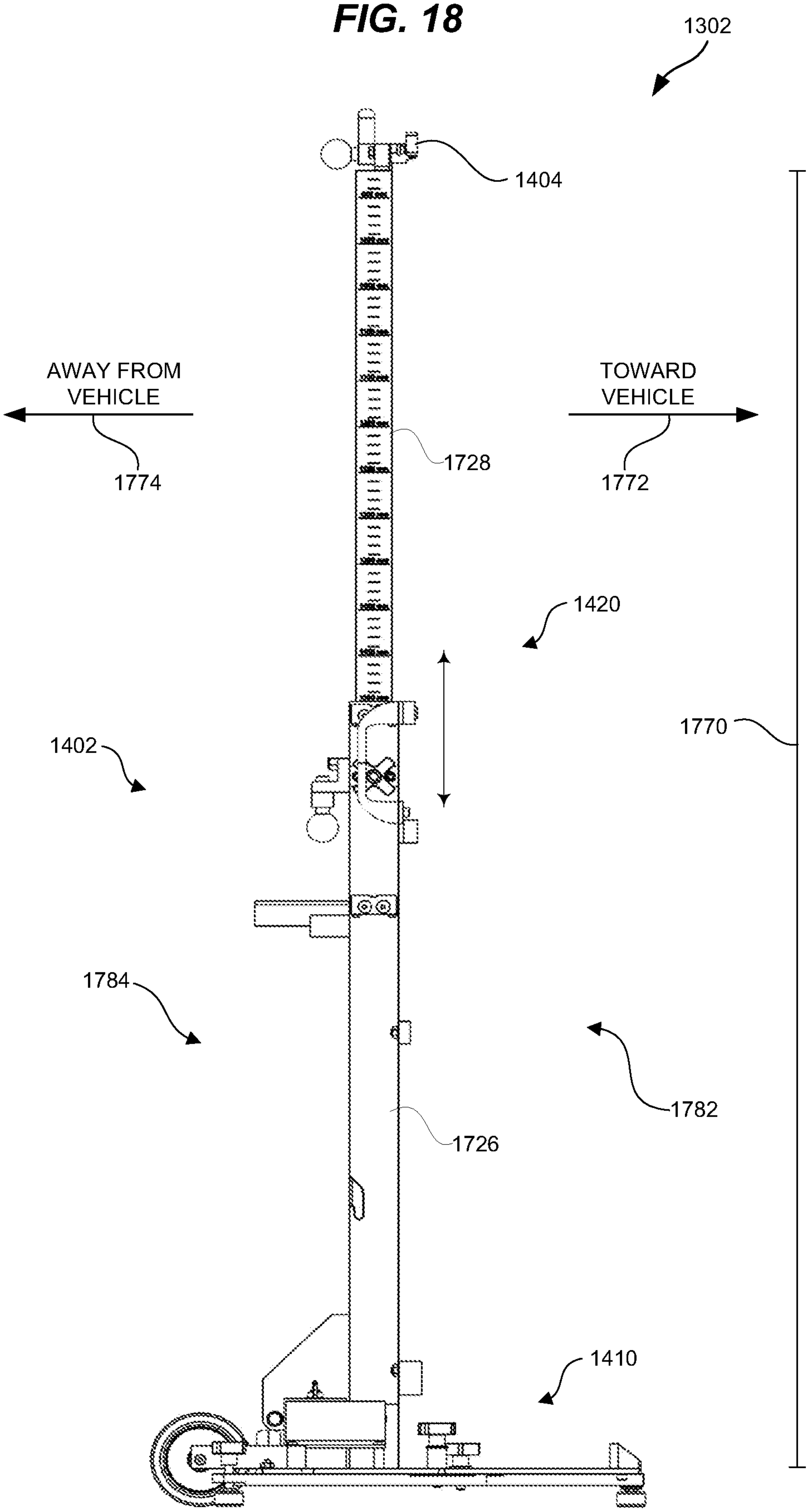
Figure 19:
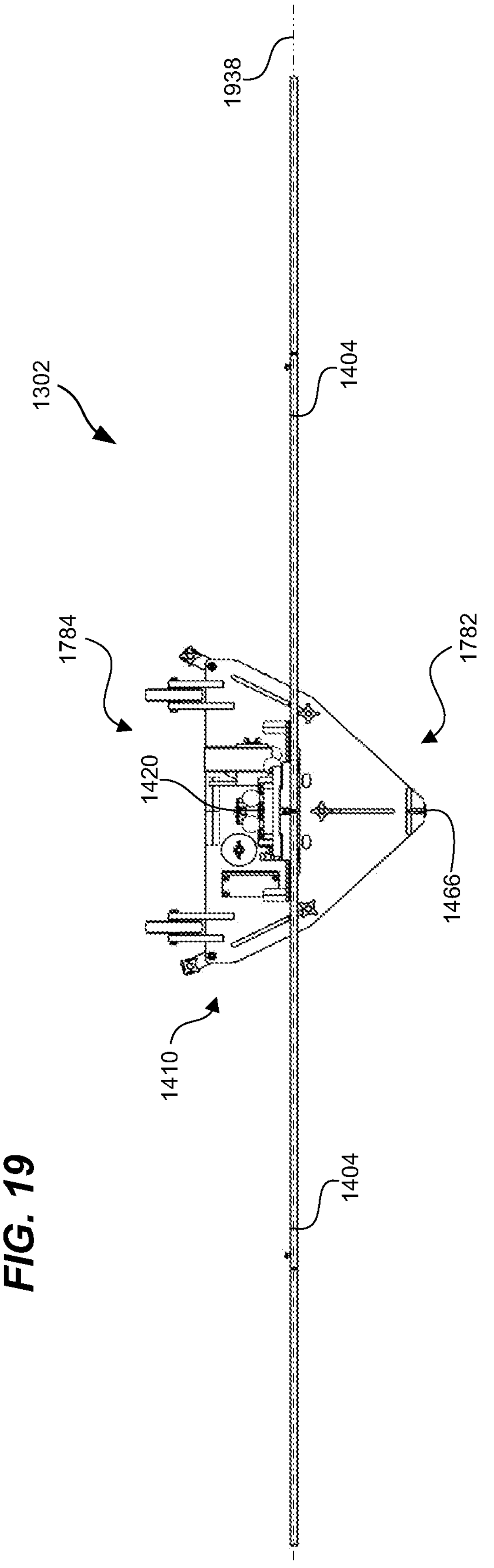
FIG. 19 is a plan view of a calibration fixture in an illustrative embodiment.
Figure 20:
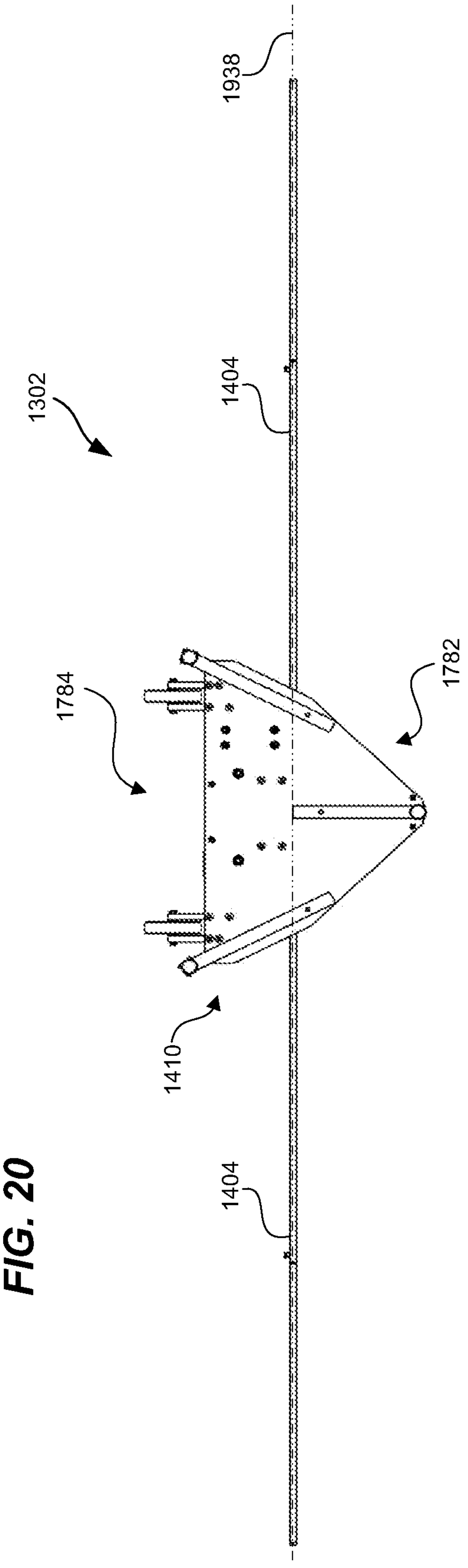
FIG. 20 is a bottom view of a calibration fixture in an illustrative embodiment.

FIGS. 17-18 are side views of the calibration fixture 1302 in an illustrative embodiment. FIG. 19 is a plan view of the calibration fixture 1302, and FIG. 20 is a bottom view of the calibration fixture 1302 in an illustrative embodiment. Calibration fixture 1302 is in the unfolded configuration 1400 in FIGS. 17-20. In FIGS. 19 and 20, for example, arms 1404 project substantially perpendicular from pillar member 1420. The arms 1404 are collinear and aligned along a horizontal axis 1938.

In FIGS. 17-18, calibration fixture 1302 has a front side 1782 and a rear side 1784. The front side of calibration fixture 1302 is configured to face in a direction 1772 (also referred to as the vehicle direction) toward a vehicle 602 for a calibration, and the rear side 1784 is configured to face in a direction 1774 away from the vehicle 602. In an embodiment, the length 1770 of pillar member 1420 is adjustable. For example, pillar member 1420 may comprise a telescoping member, which provides for an adjustable length 1770. Pillar member 1420 comprises a mast tube 1726, and a slide tube 1728 telescopically slidable within a hollow portion of the mast tube 1726 to vary or adjust the length 1770 of pillar member 1420.

Figure 21:
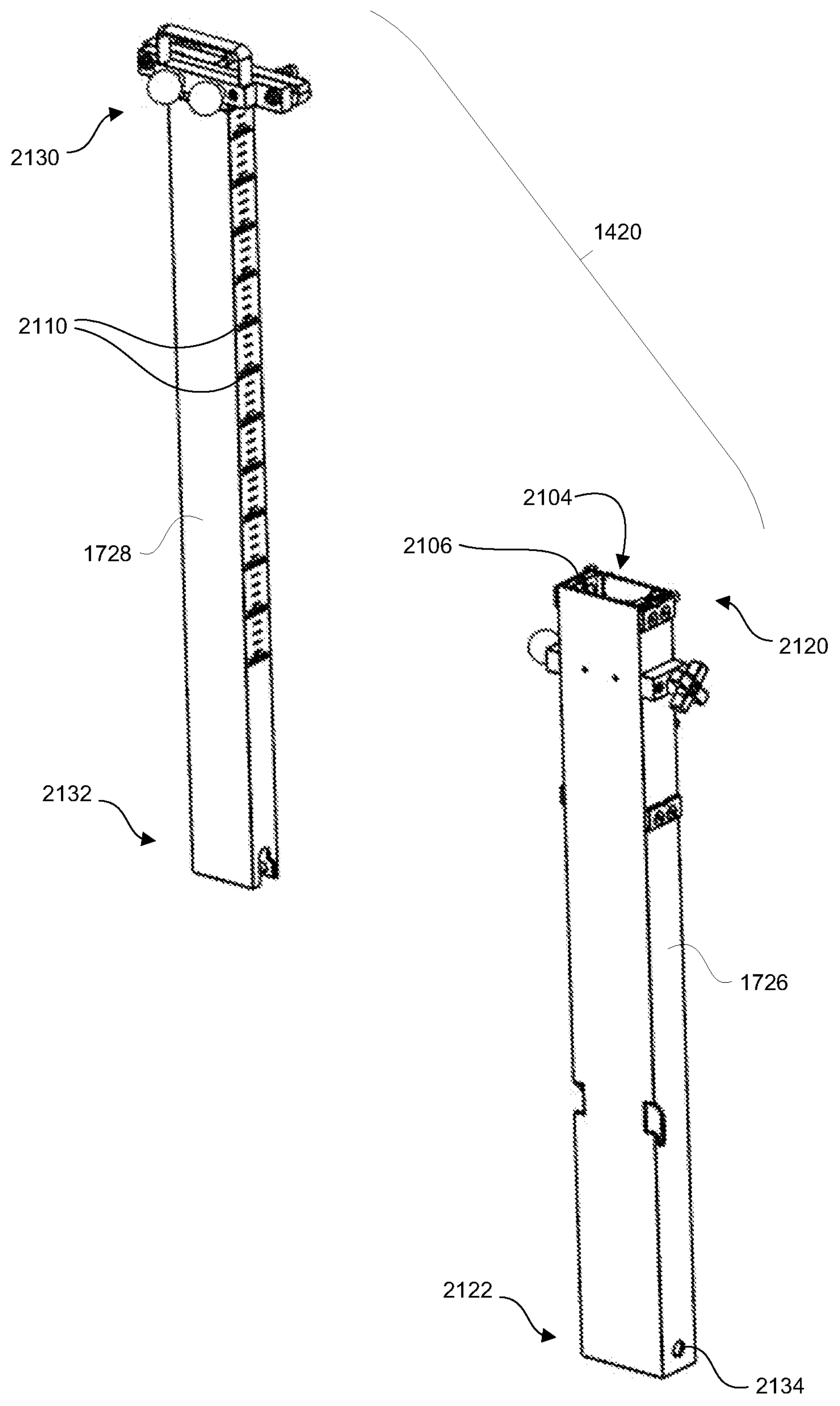
FIG. 21 is an exploded view of a pillar member in an illustrative embodiment.

FIG. 21 is an exploded view of pillar member 1420 in an illustrative embodiment. In this embodiment, mast tube 1726 is an elongated member comprising a top end 2120 and bottom end 2122. Mast tube 1726 is made from a rigid material (e.g., metal, plastic, etc.), and has a rectangular cross-section. Slide tube 1728 is an elongated member comprising a top end 2130 and bottom end 2132. Slide tube 1728 is made from a rigid material (e.g., metal, plastic, etc.), and has a rectangular cross-section. The rectangular cross-section of slide tube 1728 is smaller than the cross-section of mast tube 1726 so that the slide tube 1728 is able to slide within a hollow portion 2104 of mast tube 1726. Although rectangular cross-sections are shown for slide tube 1728 and mast tube 1726, other cross-sections are considered herein, such as square or circular. Mast tube 1726 may further include a slide bushing 2106 that lines at least part of the hollow portion 2104. Slide tube 1728 may include one or more length indicator marks 2110 that indicate a configurable height of the calibration fixture 102. Also shown in FIG. 21 is a hinge hole 2134 in mast tube 1726, which pivotally couples pillar member 1420 to base member 1410.

Figure 22:
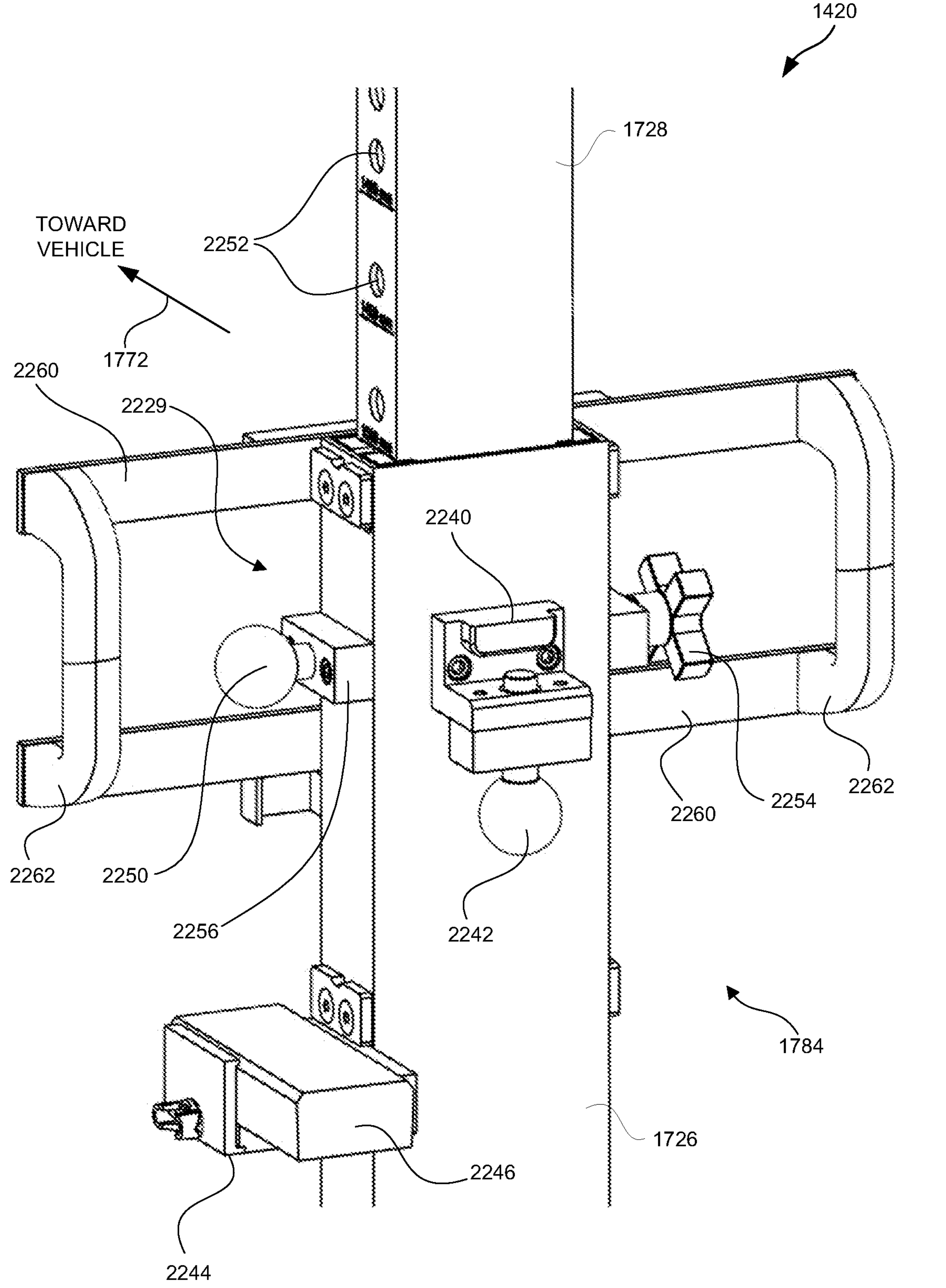
FIG. 22 is a magnified perspective view of a pillar member in an illustrative embodiment.

FIG. 22 is a magnified perspective view of pillar member 1420 in an illustrative embodiment. Pillar member 1420 may further include a lock mechanism 2229 configured to lock or secure slide tube 1728 to mast tube 1726 to fix the length 1770 of pillar member 1420 at a desired length. In an embodiment, lock mechanism 2229 may include a pop-pin 2250. A pop-pin includes a knob that is attached to a pin, and a spring configured to bias the pin. A pop-pin base 2256 is attached to mast tube 1726. Slide tube 1728 comprises a plurality of index holes 2252 disposed along a length. In an embodiment, the index holes 2252 are set at predetermined target heights for different types of vehicles 602. The pop-pin 2250 is configured to engage with one of the index holes 2252 in the slide tube 1728 to lock the slide tube 1728 to the mast tube 1726. Lock mechanism 2229 may further include a lock screw 2254 configured to further secure slide tube 1728 to mast tube 1726 when tightened. Although one configuration of a lock mechanism 2229 is shown in FIG. 22, other configurations are considered herein.

In an embodiment, pillar member 1420 may further include a mast handle bracket 2260 and mast handles 2262. Mast handle bracket 2260 is attached to mast tube 1726, and one or more handles 2262 are attached to mast handle bracket 2260. Handles 2262 are configured to be grasped by a hand to lift or move calibration fixture 1302.

In an embodiment, pillar member 1420 may further include a range finder bracket 2244 and a range finder 2246. Range finder bracket 2244 is configured to hold the range finder 2246 to point in the vehicle direction 1772, and range finder 2246 is configured to indicate a distance from the calibration fixture 1302 to an object, such as the vehicle 602.

In an embodiment, pillar member 1420 may further include a bumper alignment fixture mount bracket 2240 attached to the mast tube 1726. Bumper alignment fixture mount bracket 2240 is configured to engage a portion of the bumper alignment fixture 1304, and to secure the bumper alignment fixture 1304 to calibration fixture 1302, such as for transport. Pillar member 1420 may further include a pop-pin 2242 configured to secure the bumper alignment fixture 1304 to the bumper alignment fixture mount bracket 2240.

Figure 23:
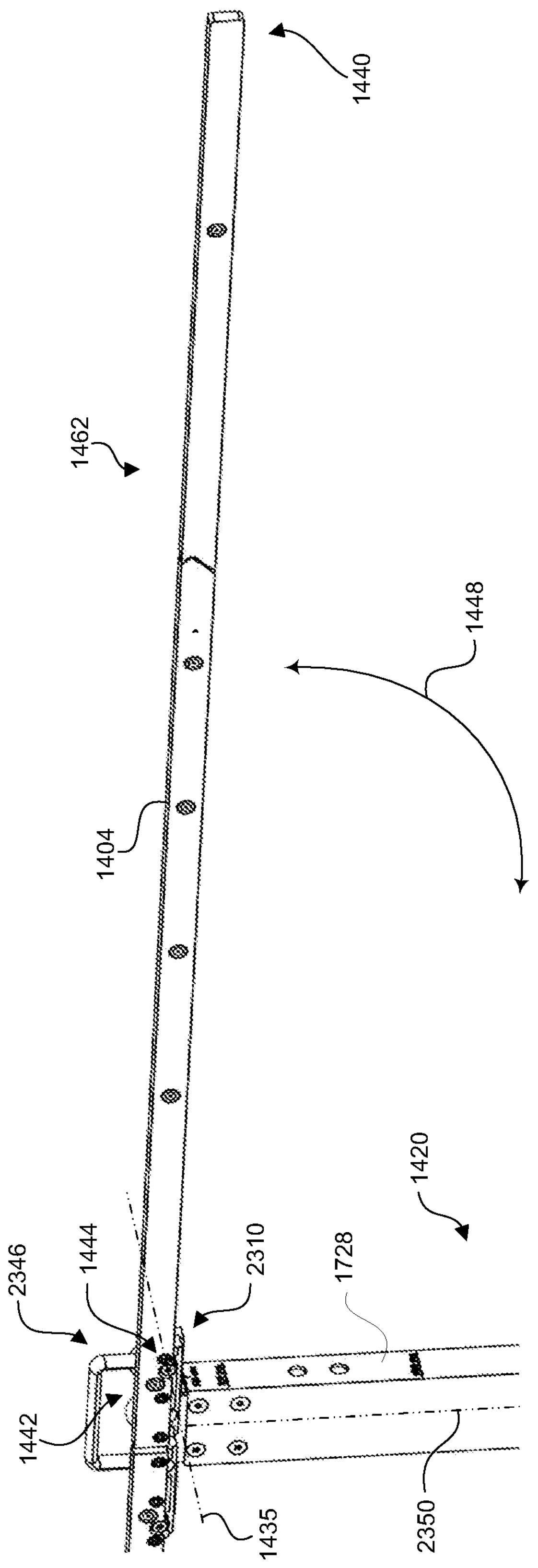
FIG. 23 illustrates an arm mounted to a pillar member in an illustrative embodiment.

As described above, arms 1404 are configured to pivot in relation to pillar member 1420. FIG. 23 illustrates an arm 1404 mounted to pillar member 1420 in an illustrative embodiment. In general, arm 1404 is connected to pillar member 1420 via an arm mount assembly 2310. An arm 1404 is an elongated member having a free end 1440 and a connected end 1442. An arm 1404 is made from a rigid material (e.g., metal, plastic, etc.). The connected end 1442 of an arm 1404 is coupled or connected to pillar member 1420 (i.e., to slide tube 1728) via a pivotal coupling 1444 of arm mount assembly 2310. Through pivotal coupling 1444, the arm 1404 is configured to pivot or rotate about a horizontal axis 1435 in relation to pillar member 1420, as illustrated by arrow 1448. When in the unfolded configuration 1400 of calibration fixture 1302, the arm 1404 is disposed in an expanded position 1462 in relation to pillar member 1420. Thus, the arm 1404 is configured to pivot or rotate about horizontal axis 1435 in relation to pillar member 1420 via pivotal coupling 1444 so that the free end 1440 rotates upward. When expanded, arm 1404 projects from pillar member 1420 substantially perpendicular from a longitudinal centerline 2350 of pillar member 1420. Arm mount assembly 2310 further includes a lock mechanism 2346 configured to lock or secure the arm 1404 in the expanded position 1462.

Figure 24:
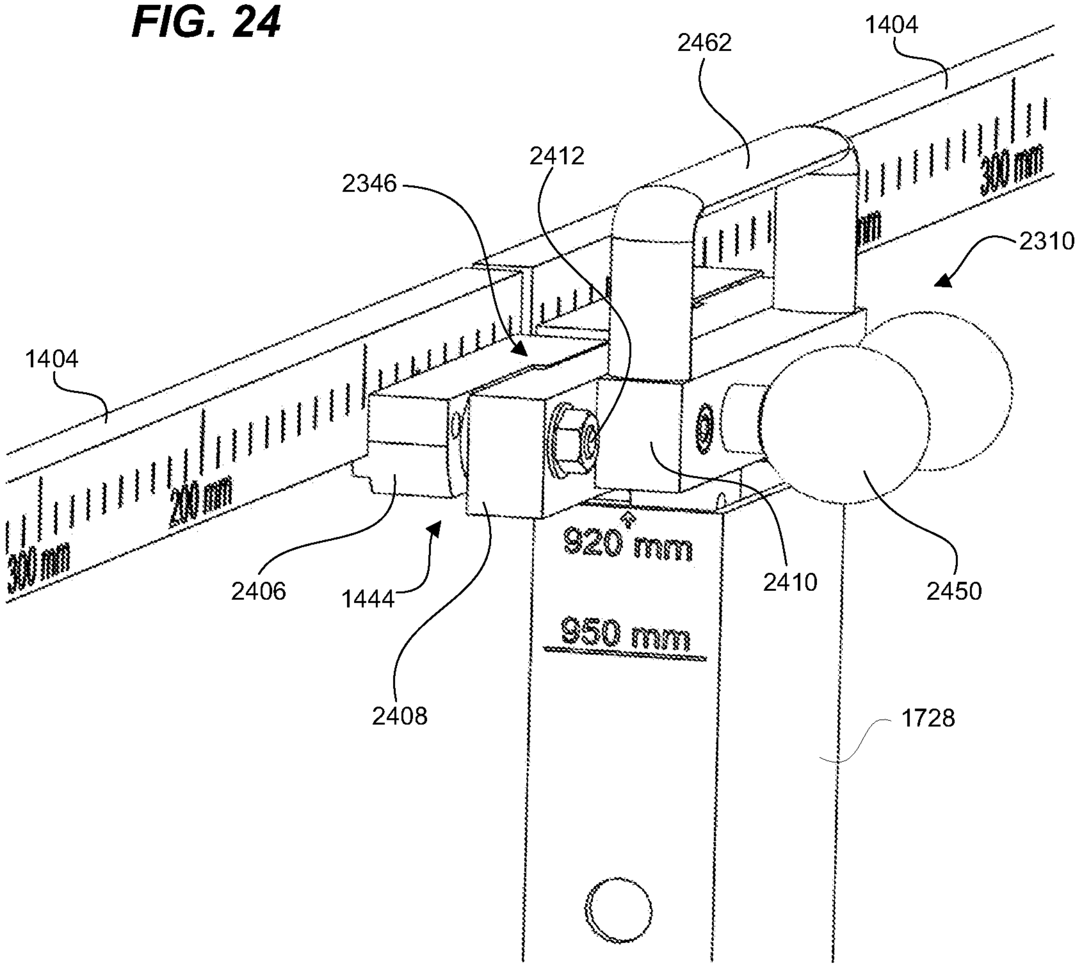
FIG. 24 is a perspective view of an arm mount assembly in an illustrative embodiment.

FIG. 24 is a perspective view of the arm mount assembly 2310 in an illustrative embodiment. In an embodiment, arm mount assembly 2310 includes an arm spacer 2406, a top hinge plate 2408, and a pop-pin base 2410. Top hinge plate 2408 is affixed to slide tube 1728, such as with one or more fasteners (e.g., bolts). An arm 1404 is affixed to arm spacer 2406, such as with one or more fasteners (e.g., bolts). The pivotal coupling 1444 for an arm 1404 is provided via a hinge pin 2412 that pivotally couples arm spacer 2406 to top hinge plate 2408. Arm mount assembly 2310 further provides the lock mechanism 2346 configured to lock or secure the arm 1404 in the expanded position 1462. In an embodiment, lock mechanism 2346 comprises a pop-pin 2450. Pop-pin base 2410 is attached to top hinge plate 2408, and the pop-pin 2450 is configured to engage with a lock hole (not visible) in arm spacer 2406 to lock the arm 1404 in the expanded position 1462. Although one configuration of a lock mechanism 2346 is shown in FIG. 24, other configurations are considered herein.

In an embodiment, arm mount assembly 2310 may further include a top handle 2462 attached to pop-pin base 2410. Top handle 2462 is configured to be grasped by a hand to lift or move calibration fixture 1302.

Figure 25:
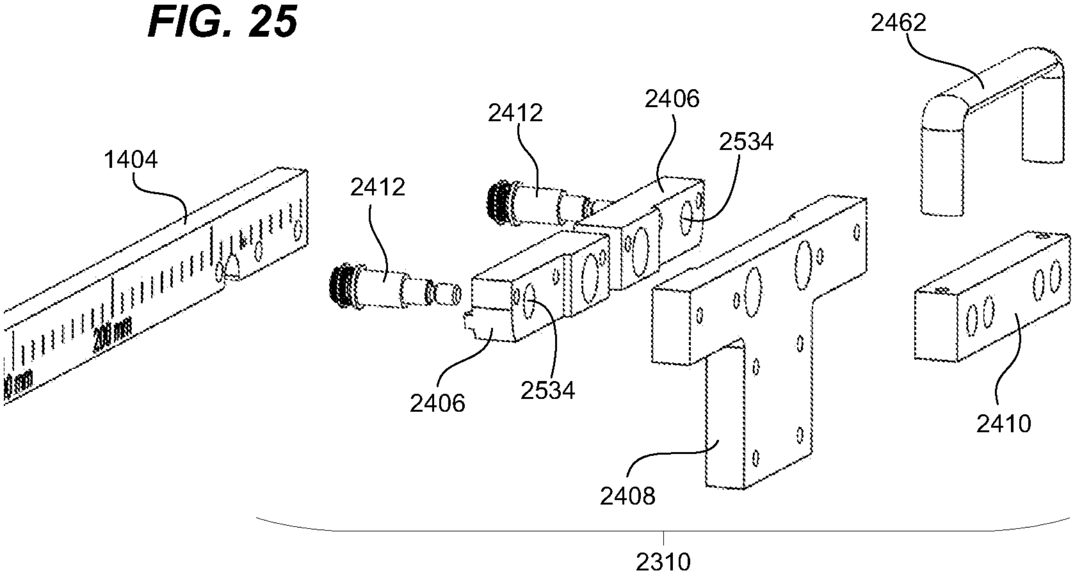
FIG. 25 is an exploded view of an arm mount assembly in an illustrative embodiment.

FIG. 25 is an exploded view of the arm mount assembly 2310 in an illustrative embodiment. The pivotal coupling 1444 of an arm 1404 is provided via a hinge pin 2412 that pivotally couples arm spacer 2406 to top hinge plate 2408. Hinge pin 2412 is disposed through a hinge hole 2534 in arm spacer 2406, and arm spacer 2406 (to which arm 1404 is affixed) is able to pivot in relation to top hinge plate 2408 via hinge pin 2412.

Figure 26:
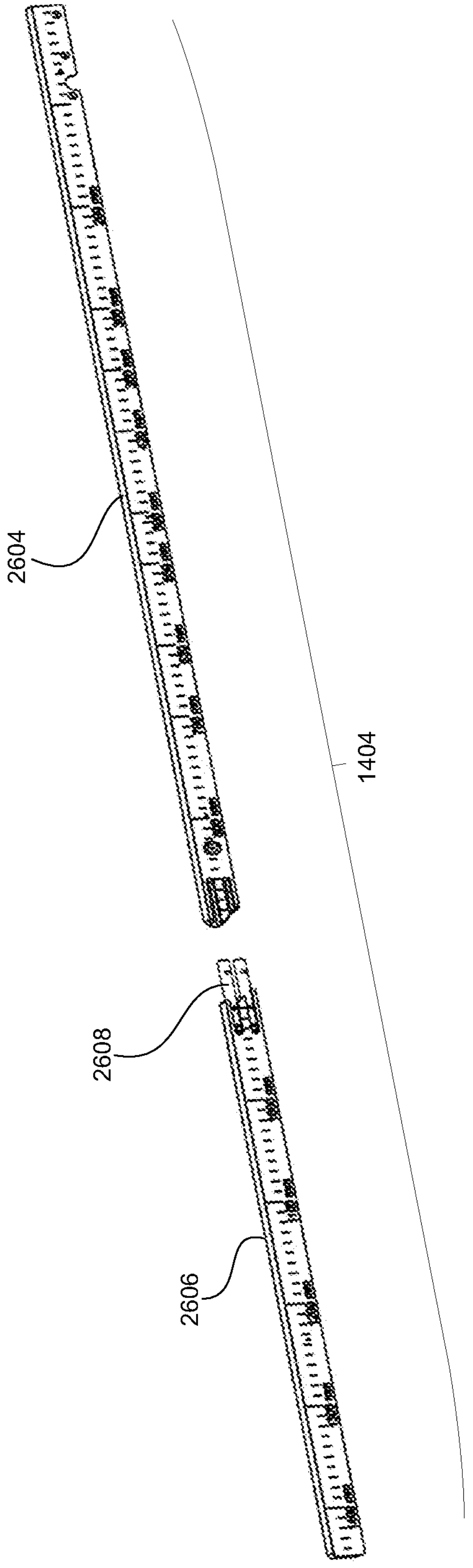
FIG. 26 illustrates an arm in an illustrative embodiment.

FIG. 26 illustrates an arm 1404 in an illustrative embodiment. In this embodiment, arm 1404 comprises a main arm 2604 and an arm extension 2606. Main arm 2604 is affixed to an arm spacer 2406 as described above. Arm extension 2606 is removably coupled to main arm 2604 via an arm coupler 2608. When attached, arm extension 2606 is collinear with main arm 2604.

Figure 27:
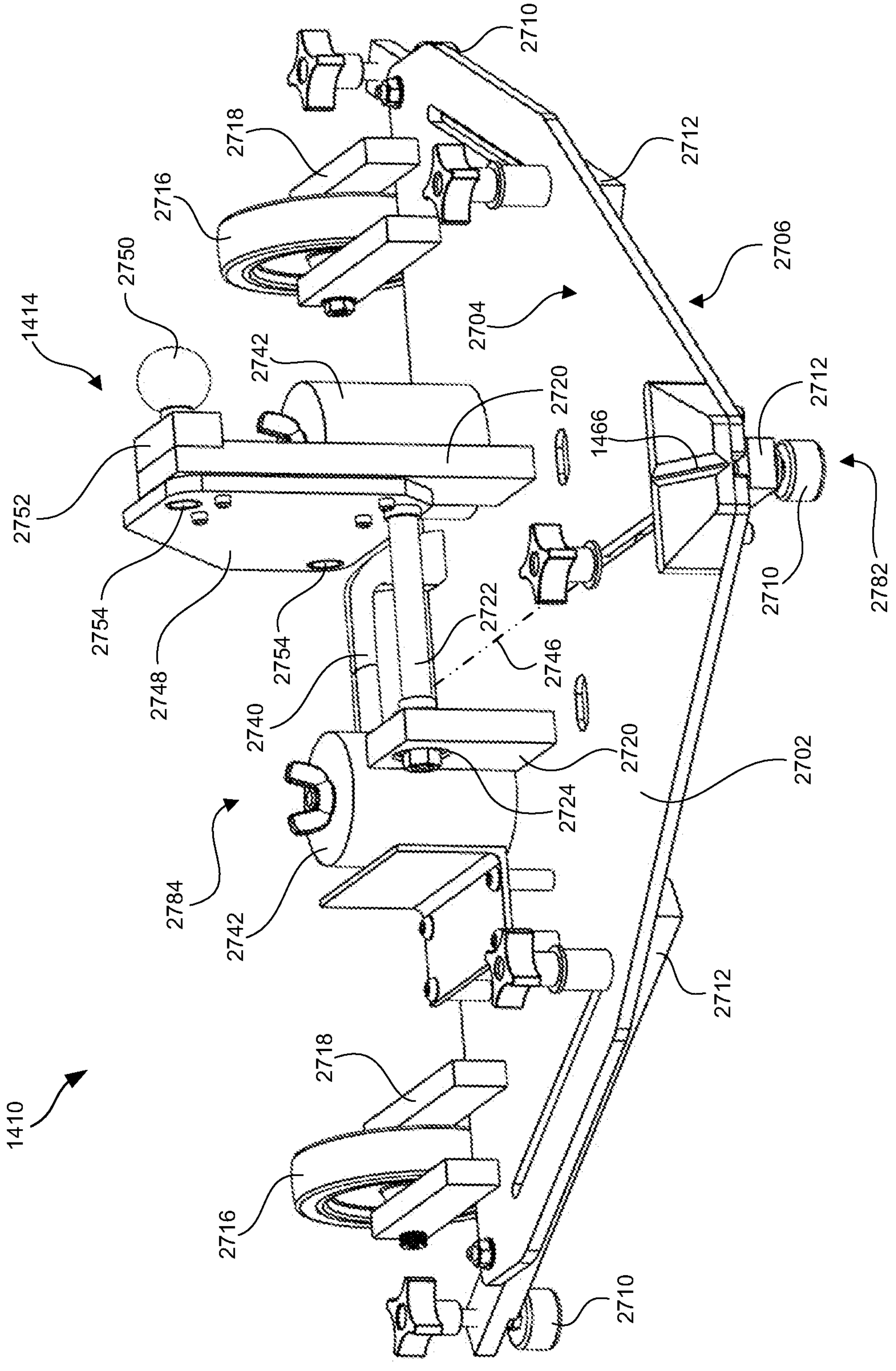
FIGS. 27-29 are perspective views of a base member in an illustrative embodiment.
Figure 28:
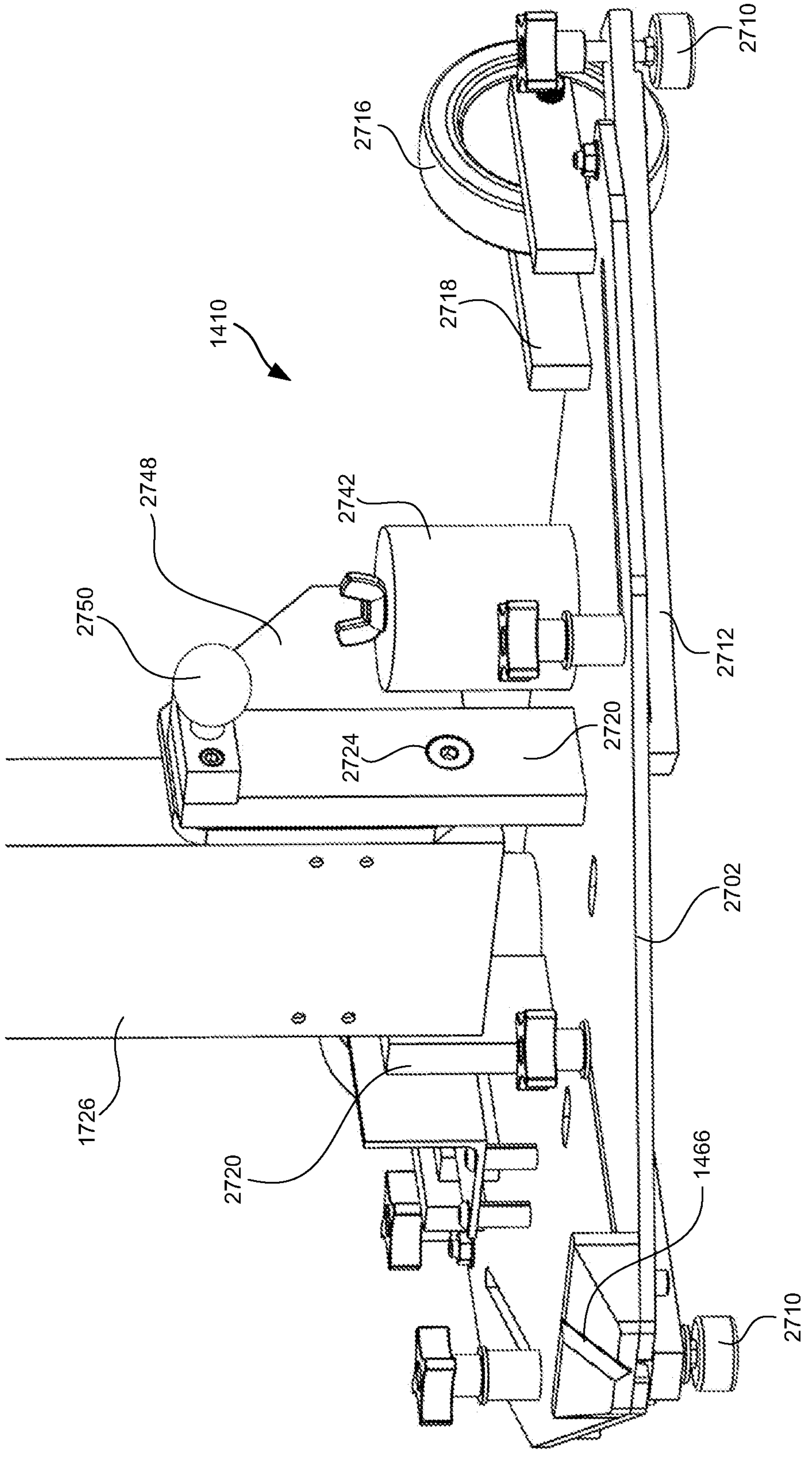
Figure 29:
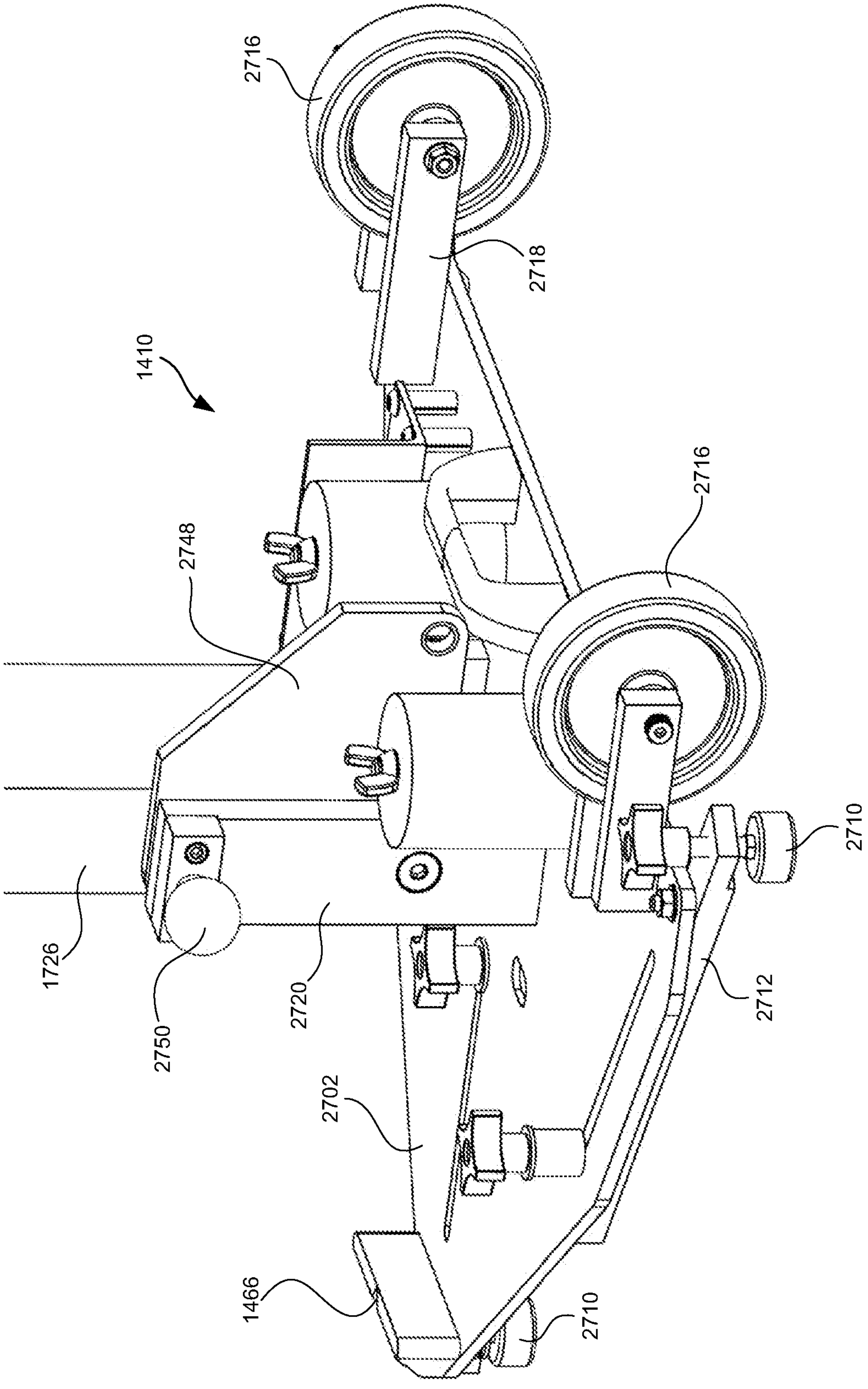

FIGS. 27-29 are perspective views of base member 1410 in an illustrative embodiment. In an embodiment, base member 1410 comprises a base plate 2702, which comprises a rigid sheet of material (e.g., metal, plastic, etc.) having a top surface 2704 and a bottom surface 2706. Base member 1410 further includes leveling feet 2710 mounted on the bottom surface 2706 of base plate 2702, which are configured to level base plate 2702. In an embodiment, leveling feet 2710 may be mounted via outriggers 2712 configured to adjust the position of the leveling feet 2710 in relation to base plate 2702.

Base member 1410 further includes a mast hinge bracket 2720 affixed to the top surface 2704 of base plate 2702, and substantially centered about a centerline 2746 of the base plate 2702. Mast hinge bracket 2720 provides the pivotal coupling 1412 for pillar member 1420 (see also, FIG. 14).

For example, base member 1410 includes a hinge pin 2722 that pivotally couples mast tube 1726 to mast hinge bracket 2720. The hinge pin 2722 is disposed through coaxial hinge holes 2724 in mast hinge bracket 2720, and the hinge hole 2134 in mast tube 1726 (see FIG. 21). This pivotal coupling 1412 allows pillar member 1420 to pivot in relation to base plate 2702. Base member 1410 further provides a lock mechanism 1414 configured to lock pillar member 1420 in the upright position 1460 or in a folded position. In an embodiment, the lock mechanism 1414 comprises a mast lock plate 2748 and a pop-pin 2750. A pop-pin base 2752 is attached to mast hinge bracket 2720, and the pop-pin 2750 is configured to engage with a lock hole 2754 in mast lock plate 2748 to lock the pillar member 1420 in the upright position 1460 or a folded position. Although one configuration of a lock mechanism 1414 is shown in FIG. 27, other configurations are considered herein.

Base member 1410 has a front side 2782 and a rear side 2784. Pillar member 1420 is configured to fold toward the front side 2782 of base member 1410. In an embodiment, base member 1410 comprises one or more wheels 2716 disposed toward the rear side 2784, and attached to base plate 2702 via wheel brackets 2718. When pillar member 1420 is folded toward the front side 2782 of base member 1410, the wheels 2716 on the rear side 2784 of base member 1410 may be used to move calibration fixture 1302. In an embodiment, base member 1410 further comprises a handle 2740 attached to the top surface 2704 of base plate 2702 toward the rear side 2784. Handle 2740 is configured to be grasped by a hand to lift or move calibration fixture 1302. In an embodiment, base member 1410 may further include one or more removable weights 2742 mounted to the top surface 2704 of base plate 2702 to stabilize base member 1410.

In an embodiment, base member 1410 includes one or more laser indicators 1466. Laser indicator 1466 is mounted on the top surface 2704 of base plate 2702 toward the front side 1482, and is substantially aligned with the centerline 2746 of the base plate 2702.

Figure 30:
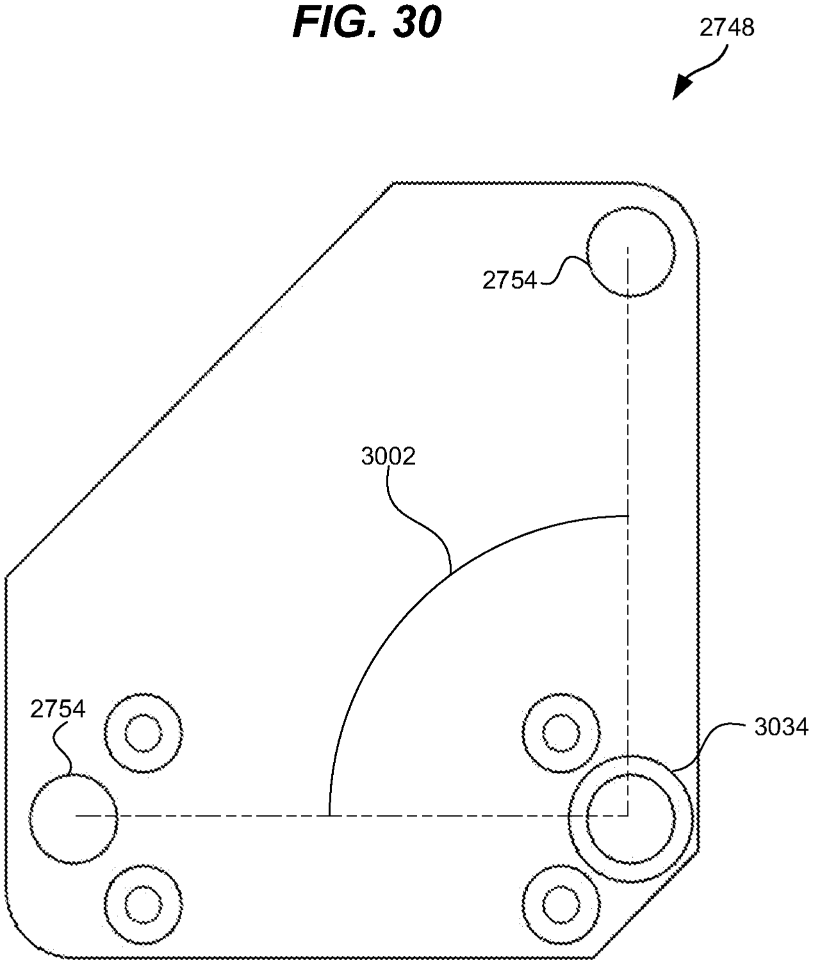
FIG. 30 illustrates a mast lock plate in an illustrative embodiment.

FIG. 30 illustrates mast lock plate 2748 in an illustrative embodiment. Mast lock plate 2748 includes a hinge hole 3034 coaxial with hinge holes 2724 of mast hinge bracket 2720, and through which hinge pin 2722 is disposed. In other words, hinge hole 3034 represents the horizontal axis 1432 around which pillar member 1420 pivots. Mast lock plate 2748 further includes lock holes 2754 that engage with pop-pin 2750. The top-most lock hole 2754 represents the position where pillar member 1420 is in the upright position 1460, and the left-most lock hole 2754 represents the position where pillar member 1420 is in the folded position. In an embodiment, lock holes 2754 and hinge hole 3034 form an angle 3002, with hinge hole 3034 as the vertex. The angle 3002 may be substantially a right angle (i.e., 90°), may be in the range of about 80°-100°, or another desired angle or range.

Figure 31:
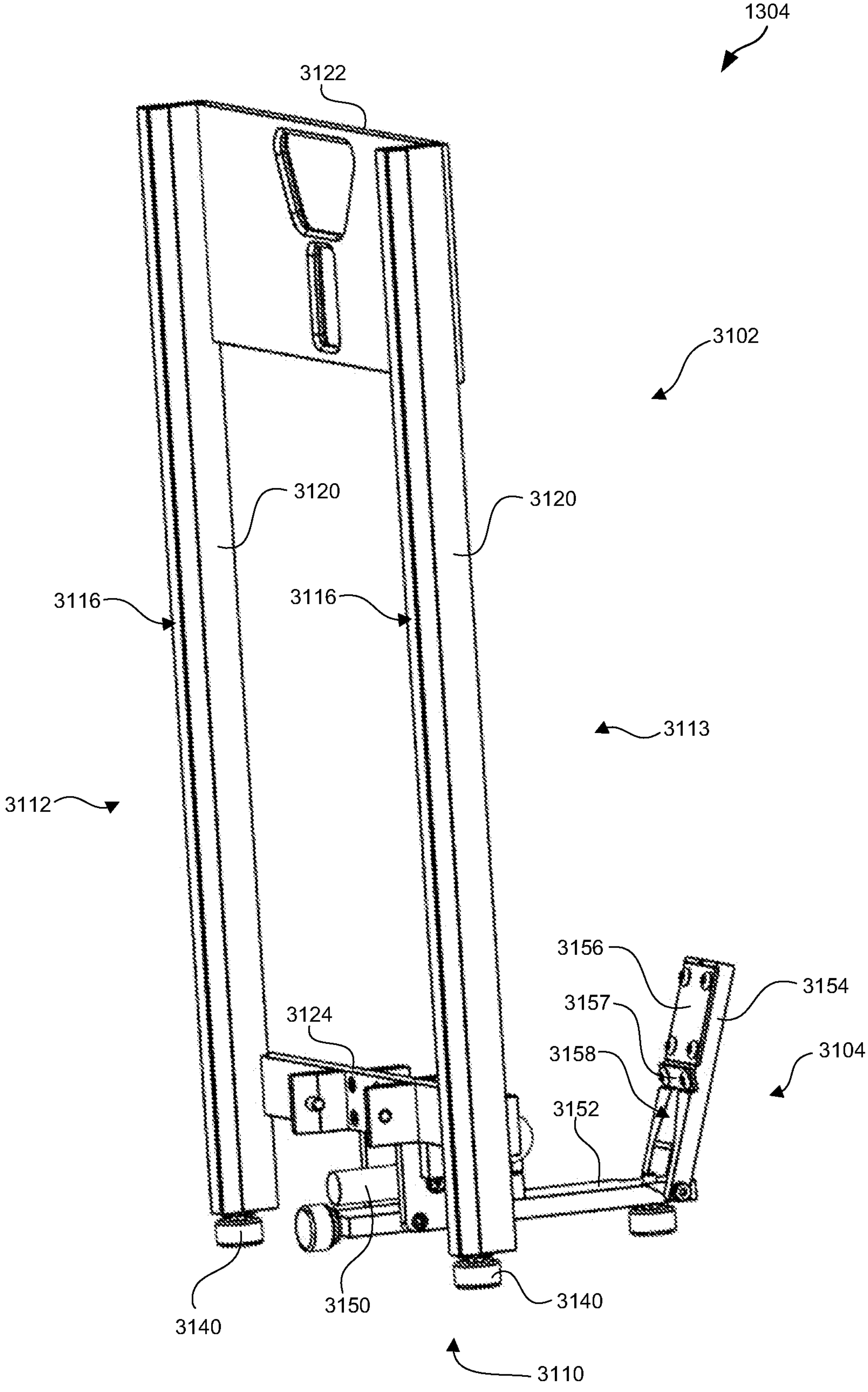
FIGS. 31-32 are perspective views of a (front) bumper alignment fixture in an illustrative embodiment.
Figure 32:
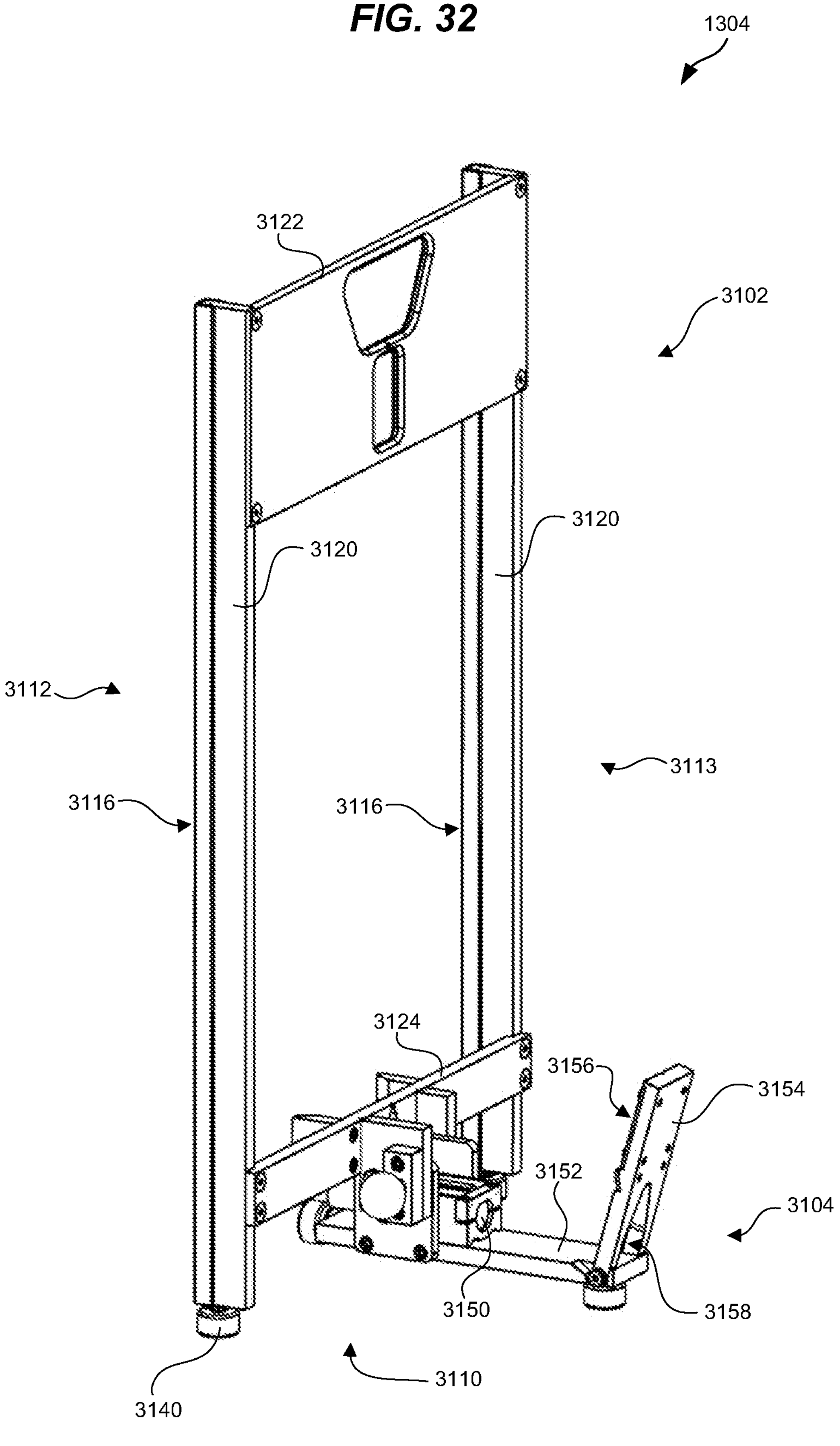

FIGS. 31-32 are perspective views of (front) bumper alignment fixture 1304 in an illustrative embodiment. Bumper alignment fixture 1304 includes a main body 3102 that supports a laser assembly 3104. Main body 3102 has a bottom end 3110 and opposing sides 3112-3113. The bottom end 3110 of main body 3102 includes one or more leveling feet 3140 configured to rest on the supporting surface 230 (i.e., the same supporting surface as the vehicle 602 and the calibration fixture 1302). One side 3112 (referred to as the vehicle side) faces toward the vehicle 602 in operation, and includes one or more contact surfaces 3116 configured to contact the front bumper 604 of the vehicle 602. The other side 3113 (referred to as the calibration fixture side) faces toward the calibration fixture 1302 in operation. In an embodiment, the main body 3102 comprises side posts 3120 disposed vertically and generally aligned in parallel, and a connecting member 3122 disposed between the side posts 3120. Main body 3102 also includes a hanger bracket 3124 that connects the laser assembly 3104 to the main body 3102.

Laser assembly 3104 comprises a line laser device 3150, a laser mount bracket 3152, and a reflector 3154. Laser mount bracket 3152 secures line laser device 3150 to point toward reflector 3154. Line laser device 3150 and reflector 3154 are spaced apart by a distance, and line laser device 3150 is configured to project a laser line 502 (not shown) in a direction toward the reflector 3154 (i.e., toward the calibration fixture 1302 in operation). Laser mount bracket 3152 secures line laser device 3150 so that the laser line 502 is oriented substantially vertical. Reflector 3154 includes one or more mirrors 3156-3157 facing line laser device 3150. A mirror 3156-3157 is configured to reflect a portion of the laser line 502 back in the opposite direction (i.e., toward the vehicle 602 in operation). In an embodiment, mirror 3156 is configured to reflect a portion of the laser line 502 back in the opposite direction and at an angle generally upward to project onto the vehicle 602, which assists in aligning the bumper alignment fixture 1304 with the vehicle 602. In an embodiment, mirror 3157 is configured to reflect a portion of the laser line 502 back in the opposite direction and generally under the vehicle 602, which assists in aligning the (front) bumper alignment fixture 1304 with a rear bumper alignment fixture, if implemented. Reflector 3154 also includes an opening, hole, slot, or aperture 3158 disposed below the mirrors 3156-3157. A portion of the laser line 502 is reflected by a mirror 3156-3157, while a portion of the laser line 502 passes through the aperture 3158.

Figure 33:
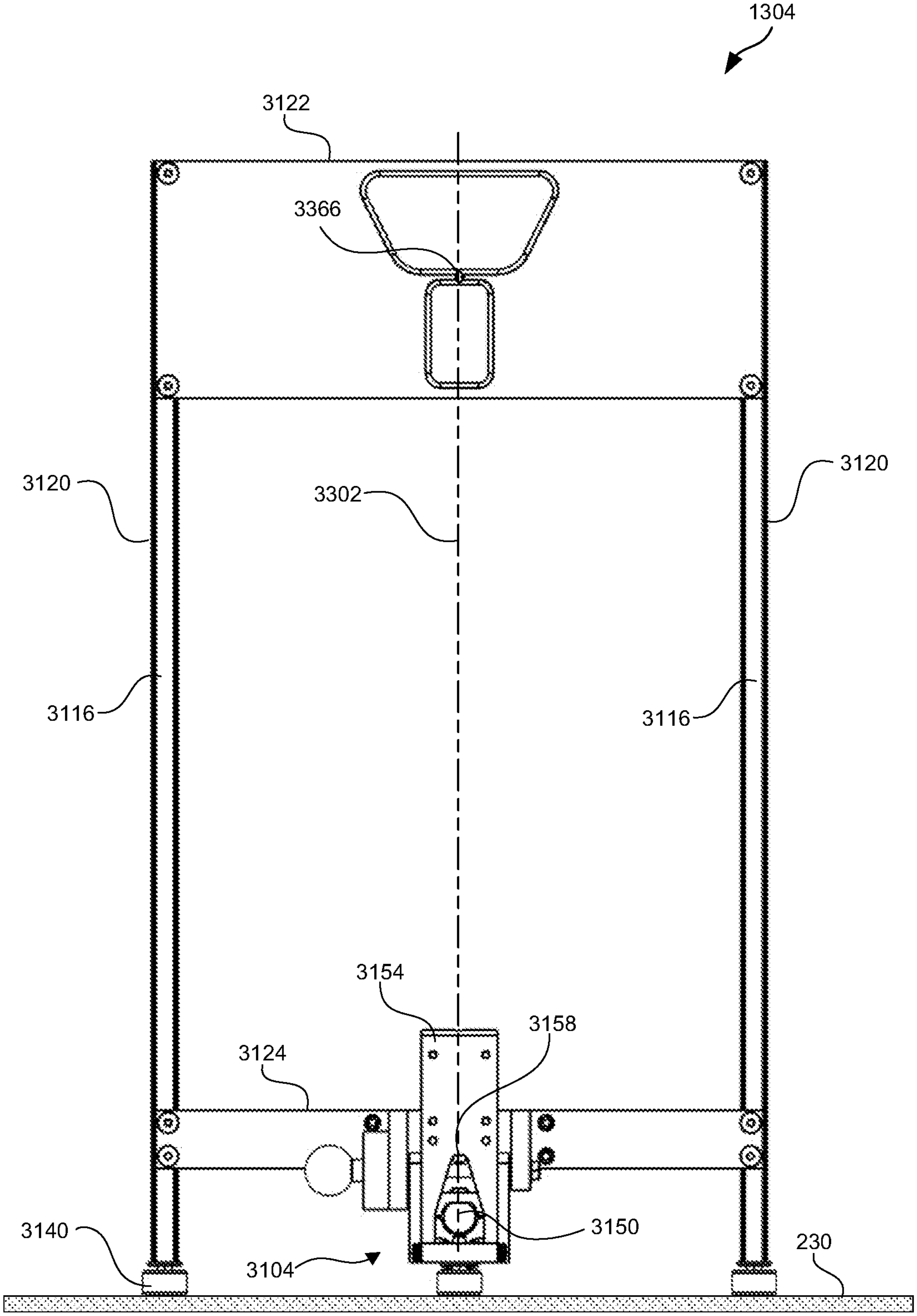
FIG. 33 is a front view of a (front) bumper alignment fixture in an illustrative embodiment.
Figure 34:
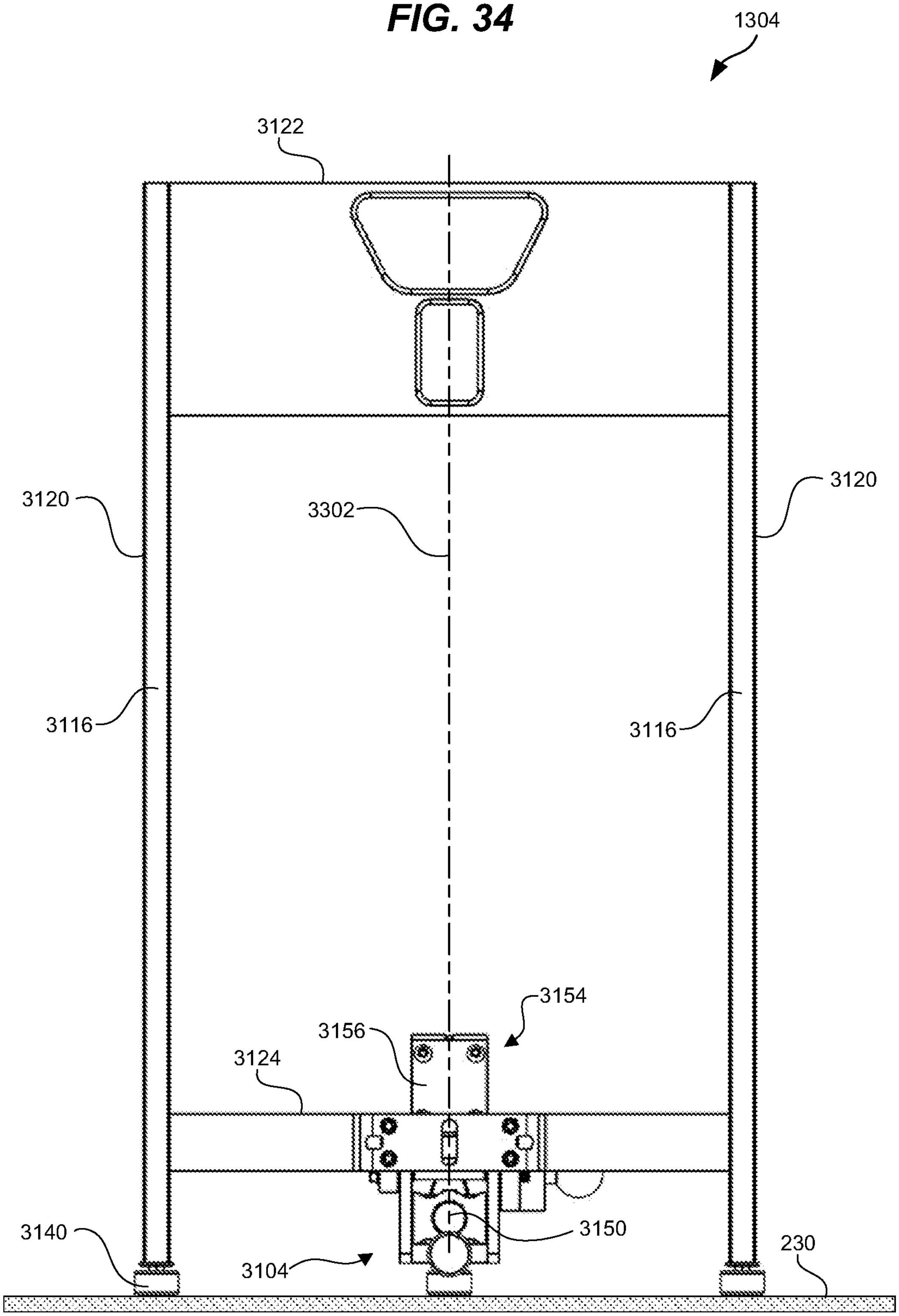
FIG. 34 is a rear view of a (front) bumper alignment fixture in an illustrative embodiment.

FIG. 33 is a front view of the bumper alignment fixture 1304 and FIG. 34 is a rear view of the bumper alignment fixture 1304 in an illustrative embodiment. Main body 3102 is configured to rest on supporting surface 230. Side posts 3120 are disposed substantially vertical or upright, which is substantially perpendicular to the supporting surface 230. Between side posts 3120, a vertical centerline 3302 is defined for bumper alignment fixture 1304. Line laser device 3150 and reflector 3154 are substantially aligned with the vertical centerline 3302 of bumper alignment fixture 1304. In an embodiment, bumper alignment fixture 1304 includes one or more laser indicators 3366 disposed along vertical centerline 3302 of bumper alignment fixture 1304, such as on connecting member 3122. Laser indicator 3366 is configured to align reflector 3154 and/or mirror 3156 with bumper alignment fixture 1304. For example, as mirror 3156 reflects a portion of the laser line 502, the laser line 502 projects partially onto an area proximate to laser indicator 3366. Mirror 3156 is adjustably connected to reflector 3154, and may be adjusted until the laser line 502 is aligned with laser indicator 3366, and consequently, the vertical centerline 3302 of bumper alignment fixture 1304. It is noted that line laser device 3150 is also adjustable on laser mount bracket 3152, and may be adjusted in the same or different calibration process as mirror 3156.

Figure 35:
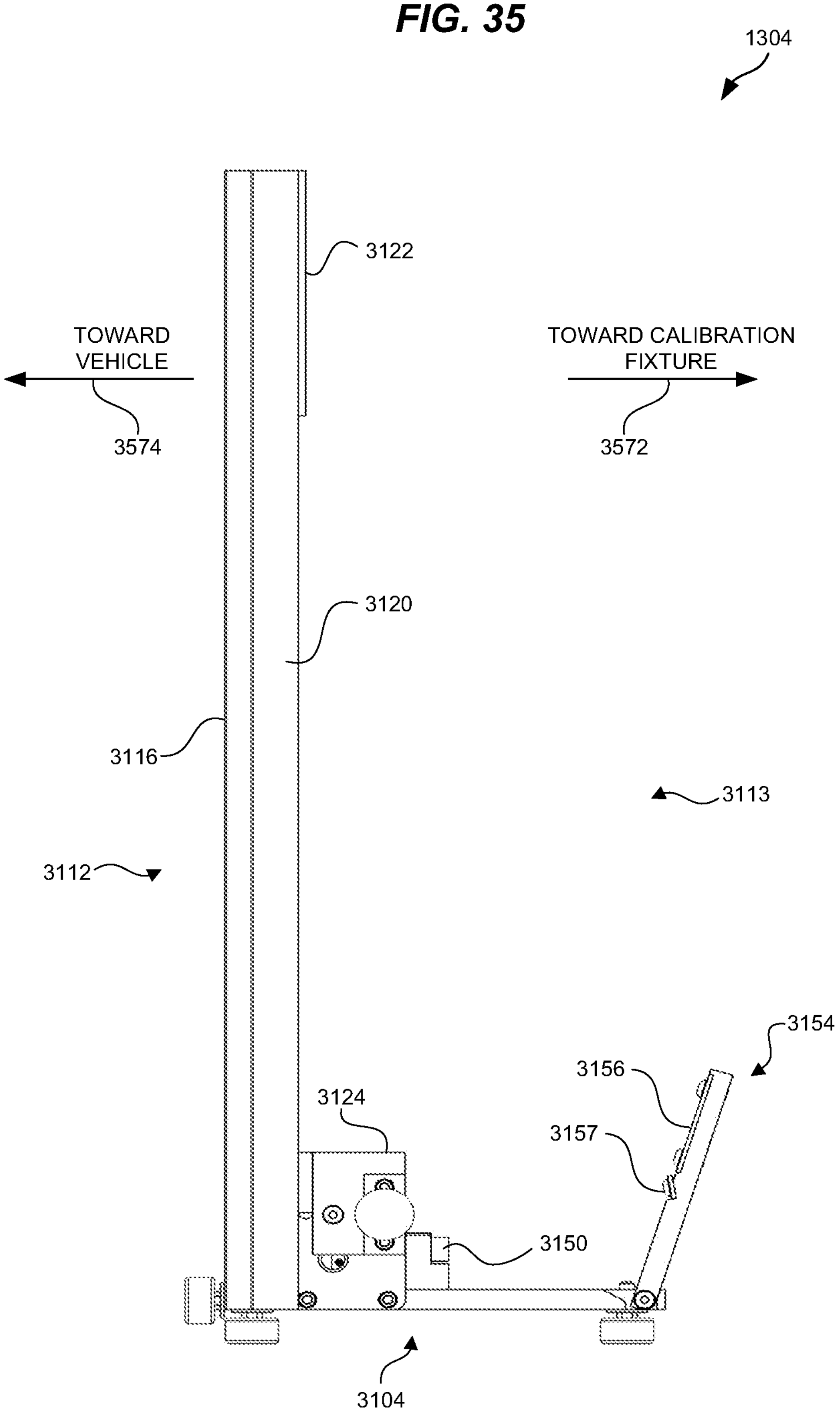
FIGS. 35-36 are side views of a (front) bumper alignment fixture in an illustrative embodiment.
Figure 36:
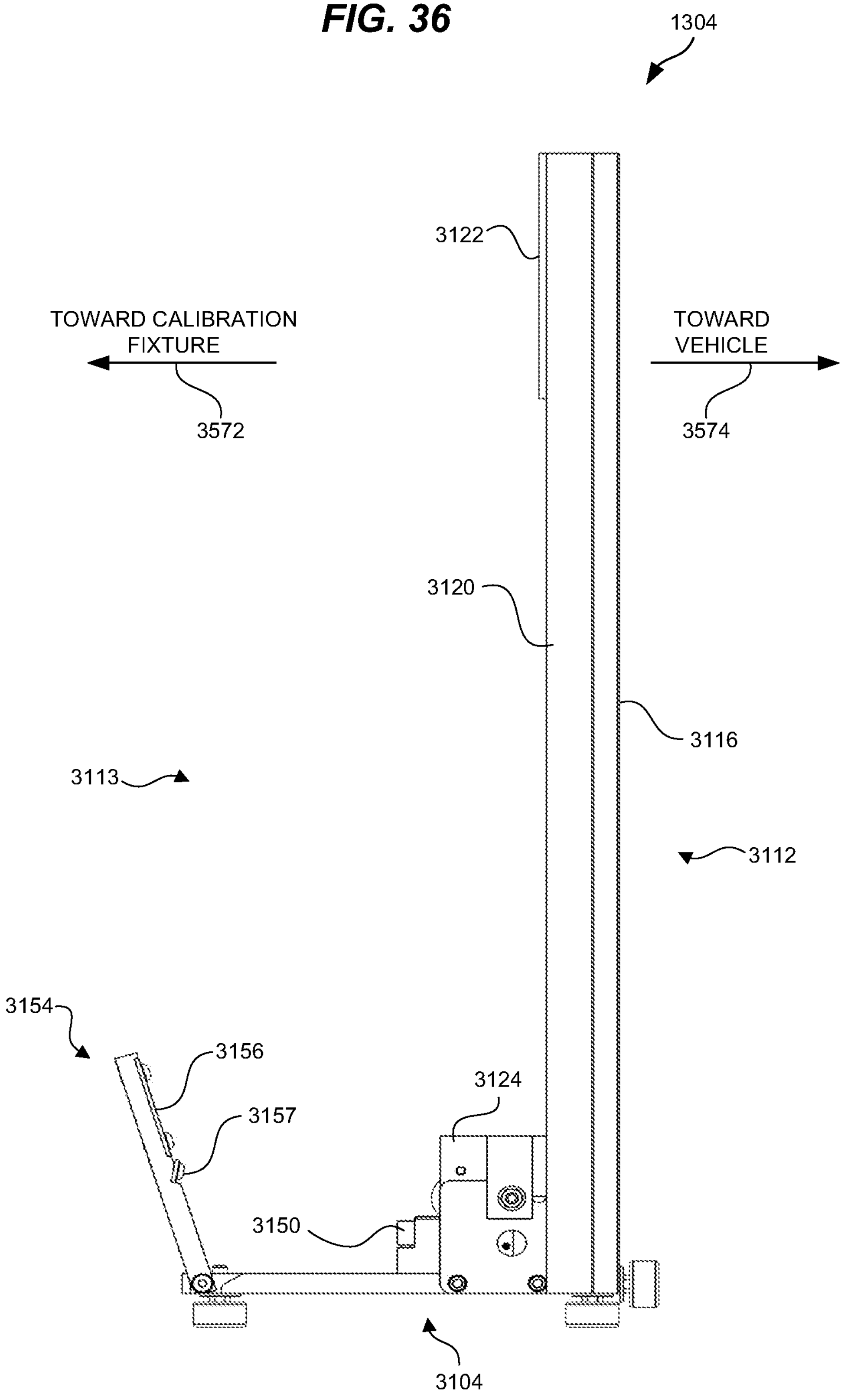

FIGS. 35-36 are side views of the bumper alignment fixture 1304 in an illustrative embodiment. As described above, bumper alignment fixture 1304 has a vehicle side 3112 and a calibration fixture side 3113. The vehicle side 3112 is configured to face in a direction 3574 (also referred to as the vehicle direction) toward the vehicle 602, and the calibration fixture side 3113 is configured to face in a direction 3572 (also referred to as the calibration fixture direction) toward the calibration fixture 1302.

Figure 37:
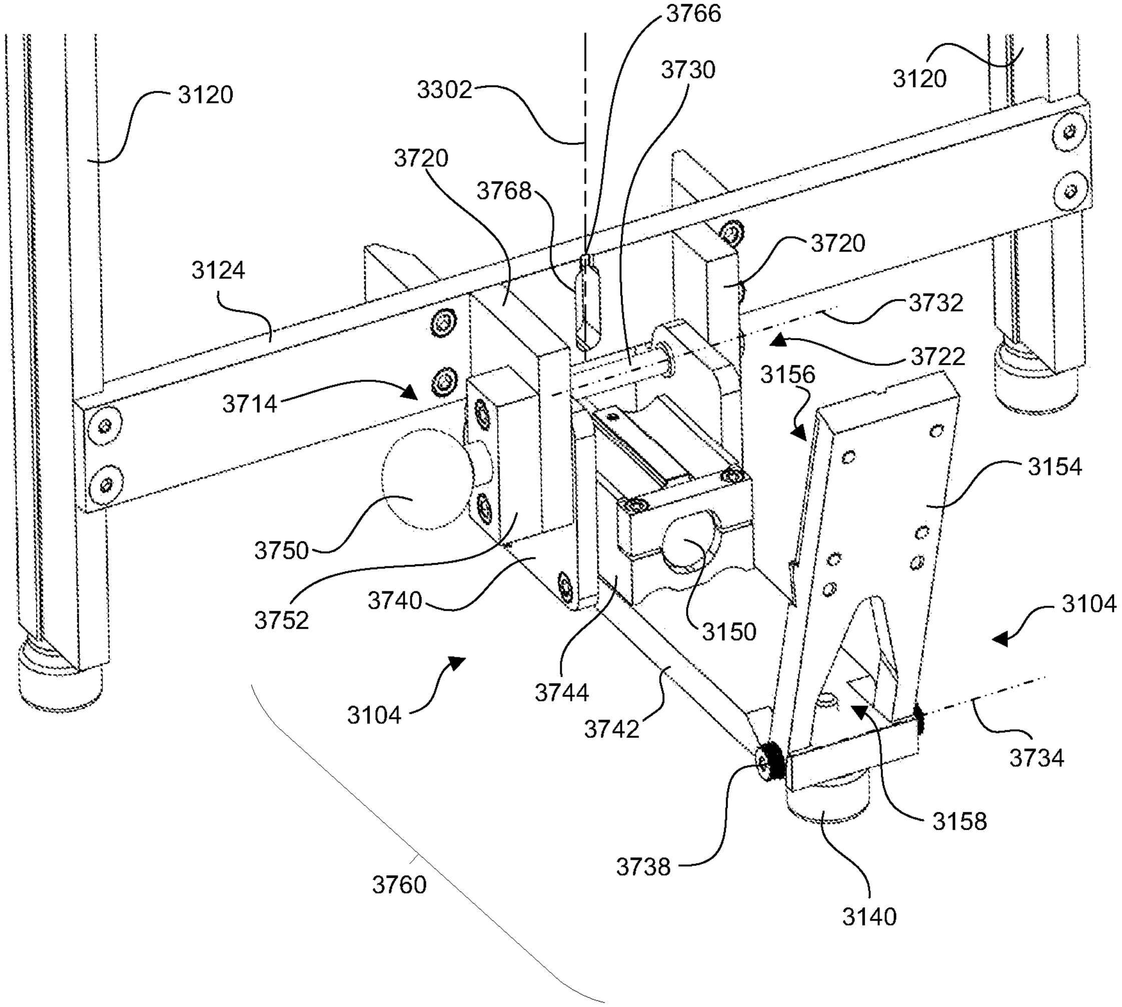
FIG. 37 is a perspective view of a laser assembly in an illustrative embodiment.

In an embodiment, bumper alignment fixture 1304 is collapsible in addition to calibration fixture 1302. FIG. 37 is a perspective view of laser assembly 3104 in an illustrative embodiment. In an embodiment, laser assembly 3104 is pivotally coupled to the main body 3102 of bumper alignment fixture 1304. Hanger bracket 3124 includes a laser assembly hinge bracket 3720 that is substantially centered about the vertical centerline 3302 of the bumper alignment fixture 1304. Laser assembly hinge bracket 3720 provides the pivotal coupling 3722 for laser assembly 3104. For example, bumper alignment fixture 1304 includes a hinge pin 3730 that pivotally couples laser assembly 3104 to laser assembly hinge bracket 3720. Laser assembly 3104 includes hinge plates 3740, a leg 3742, and a laser clamp 3744. The hinge pin 3730 is disposed through coaxial hinge holes in laser assembly hinge bracket 3720, and hinge holes in hinge plates 3740. This pivotal coupling 3722 allows laser assembly 3104 to pivot in relation to hanger bracket 3124 about a horizontal axis 3732.

Bumper alignment fixture 1304 further provides a lock mechanism 3714 configured to lock laser assembly 3104 in a deployed position 3760 (as shown in FIG. 37) or in a folded position. In an embodiment, the lock mechanism 3714 comprises a pop-pin 3750. A pop-pin base 3752 is attached to laser assembly hinge bracket 3720, and the pop-pin 3750 is configured to engage with a lock hole in hinge plate 3740 to lock the laser assembly 3104 in the deployed position 3760 or folded position. Although one configuration of a lock mechanism 3714 is shown in FIG. 37, other configurations are considered herein.

In an embodiment, reflector 3154 is pivotally coupled to leg 3742 via a hinge pin 3738, and is configured to pivot about a horizontal axis 3734 in relation to leg 3742. Horizontal axis 3734 may be substantially parallel to horizontal axis 3732. Also, leg 3742 may include a leveling foot 3140, to create a tri-pod base for bumper alignment fixture 1304 when laser assembly 3104 is in the deployed position 3760.

Figure 38:
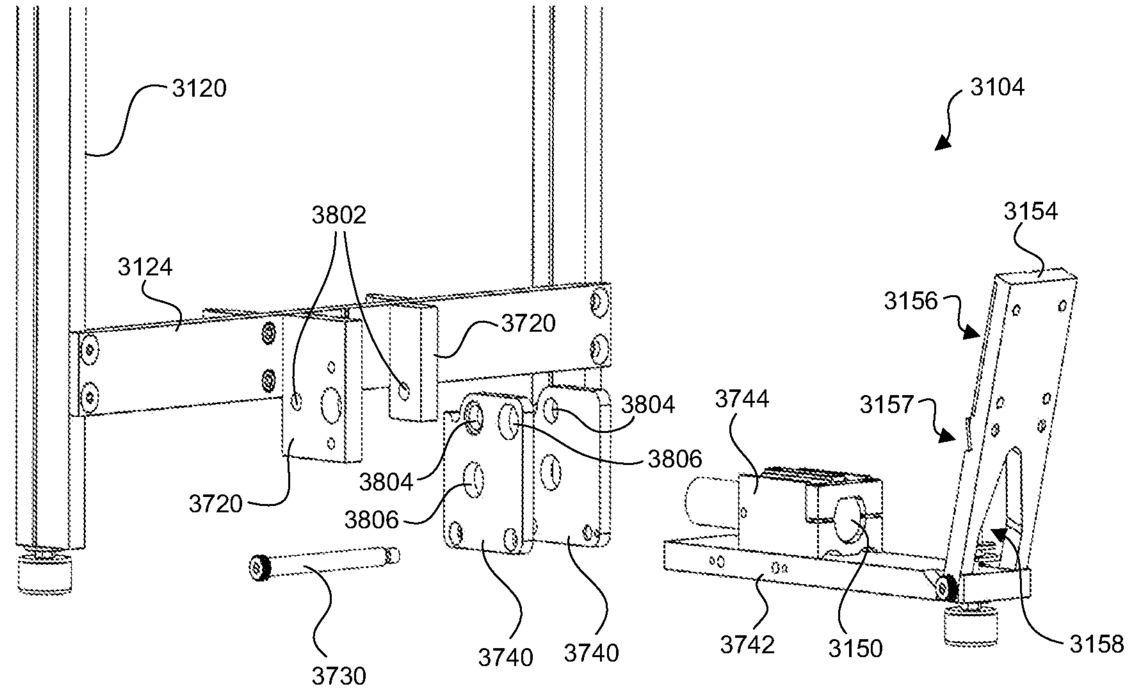
FIG. 38 is a partially exploded view of a laser assembly in an illustrative embodiment.

FIG. 38 is a partially exploded view of laser assembly 3104 in an illustrative embodiment. Laser assembly hinge bracket 3720 includes coaxial hinge holes 3802, and hinge plates 3740 include hinge holes 3804. Hinge pin 3730 is disposed through hinge holes 3802 and hinge holes 3804 so that laser assembly 3104 is able to pivot in relation to hanger bracket 3124. Hinge plates 3740 further include lock holes 3806 that engage with pop-pin 3750. The top-most lock hole 3806 represents the position where laser assembly 3104 is in the deployed position 3760, and the left-most lock hole 3806 represents the position where laser assembly 3104 is in the folded position.

When in the deployed position 3760, laser assembly 3104 is configured to project a laser line 502 in the vehicle direction 3574 from the vehicle side 3112 of bumper alignment fixture 1304, and is also configured to project a laser line 502 in the calibration fixture direction 3572 from the calibration fixture side 3113 of bumper alignment fixture 1304. In an embodiment, the laser line 502 reflected by mirror 3156 and projected in the vehicle direction 3574 is used to align the bumper alignment fixture 1304 with the centerline 606 of the vehicle 602, and the laser line 502 reflected by mirror 3157 and projected in the vehicle direction 3574 is used to align the (front) bumper alignment fixture 1304 with a rear bumper alignment fixture (not shown). For example, the laser line 502 reflected by mirror 3157 may pass through an opening, hole, slot, or aperture 3768 in hanger bracket 3124, and generally under vehicle 602. Hanger bracket 3124 may also include a laser indicator 3766 disposed along vertical centerline 3302 of bumper alignment fixture 1304, which is configured to align mirror 3157 with bumper alignment fixture 1304. The laser line 502 projected in the calibration fixture direction 3572 is used to align the calibration fixture 1302 with the bumper alignment fixture 1304 (and consequently, with the centerline 606 of the vehicle 602).

Figure 39:
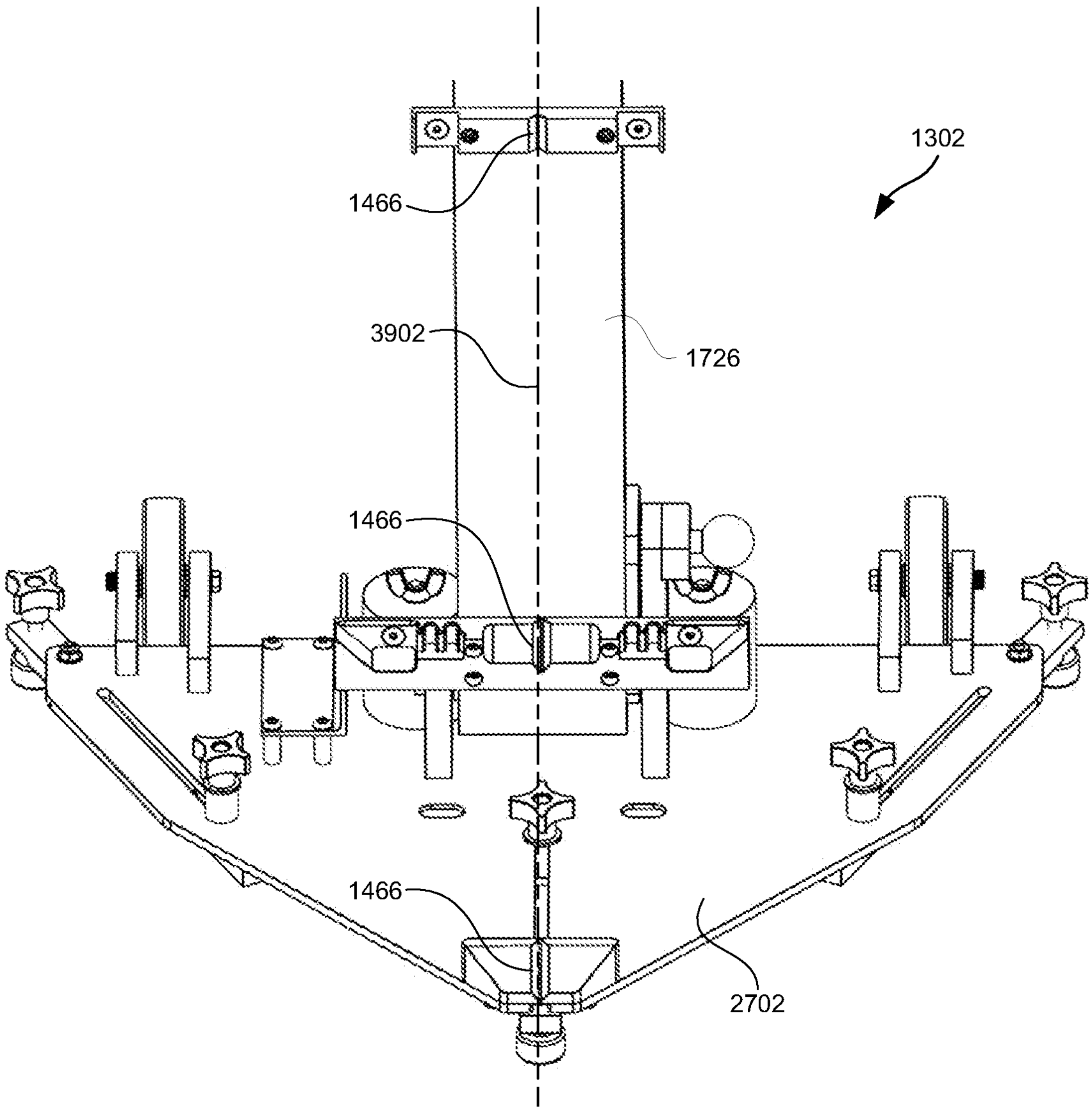
FIG. 39 is a partial front perspective view of a calibration fixture in an illustrative embodiment.

As described above, calibration fixture 1302 includes one or more laser indicators 1466. FIG. 39 is a partial front perspective view of calibration fixture 1302 in an illustrative embodiment. In an embodiment, laser indicators 1466 are mounted on mast tube 1726 and a laser indicator 1466 is mounted on base plate 2702. Laser indicators 1466 are aligned along a vertical centerline 3902 of calibration fixture 1302. Thus, when a laser line 502 is projected toward calibration fixture 1302 from bumper alignment fixture 1304, the position or orientation of calibration fixture 1302 may be adjusted until the laser indicators 1466 are aligned with the laser line 502 projected from bumper alignment fixture 1304. When the laser indicators 1466 are aligned with the laser line 502, the calibration fixture 1302 is aligned with the bumper alignment fixture 1304 and the vehicle 602.

Figure 40:
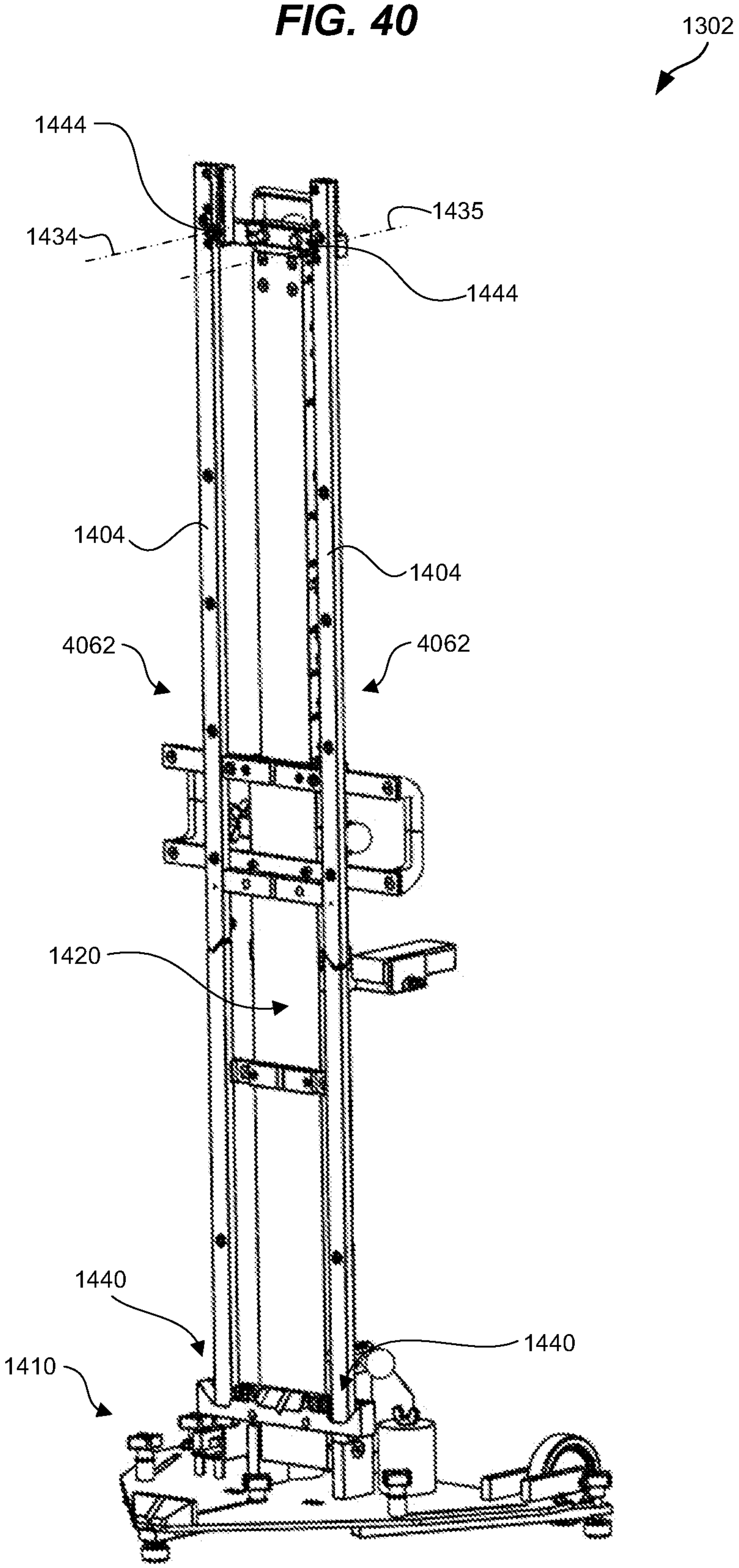
FIG. 40 is a perspective view of a calibration fixture in an illustrative embodiment.
Figure 41:
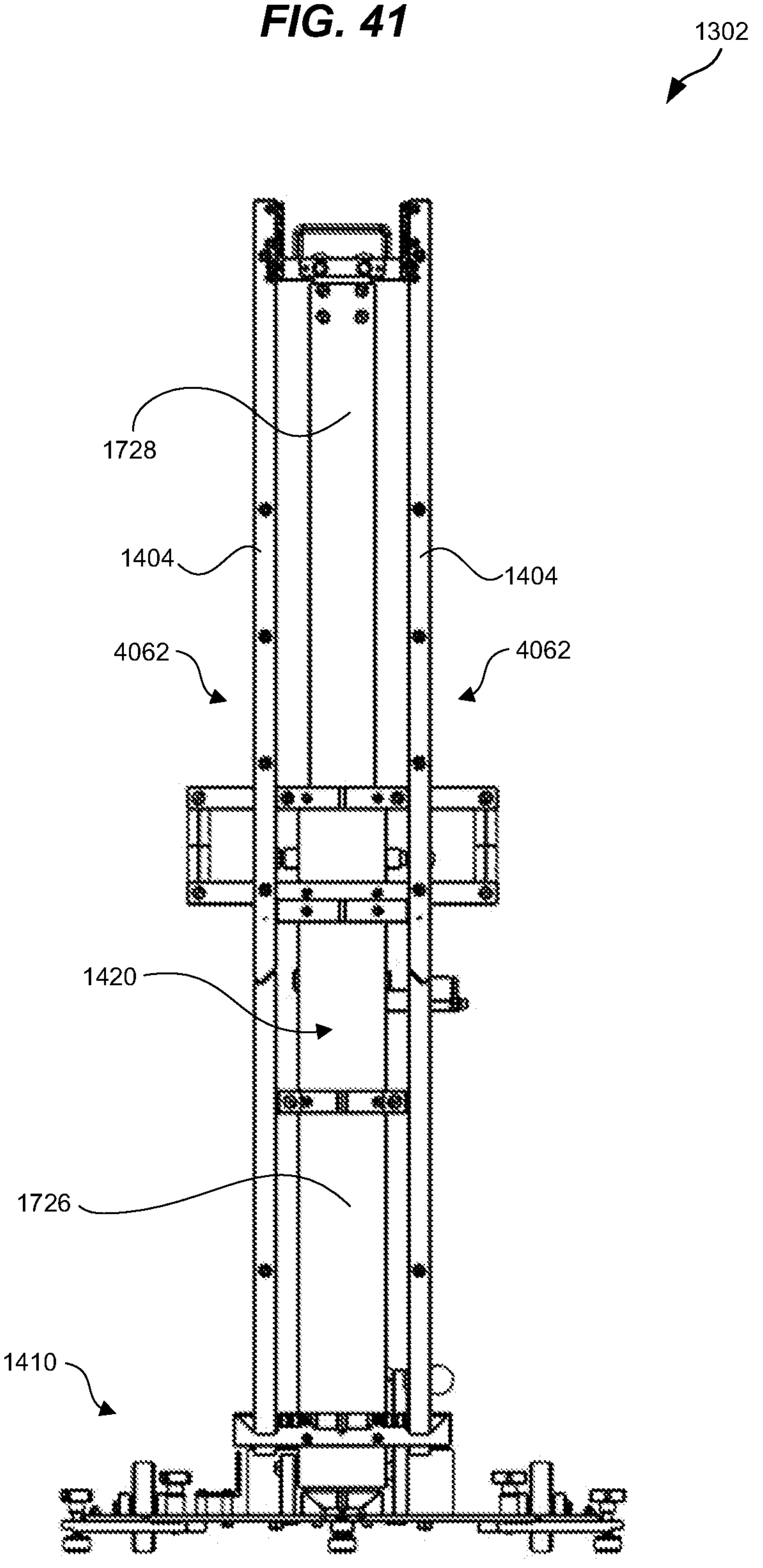
FIG. 41 is a front view of a calibration fixture in an illustrative embodiment.
Figure 42:
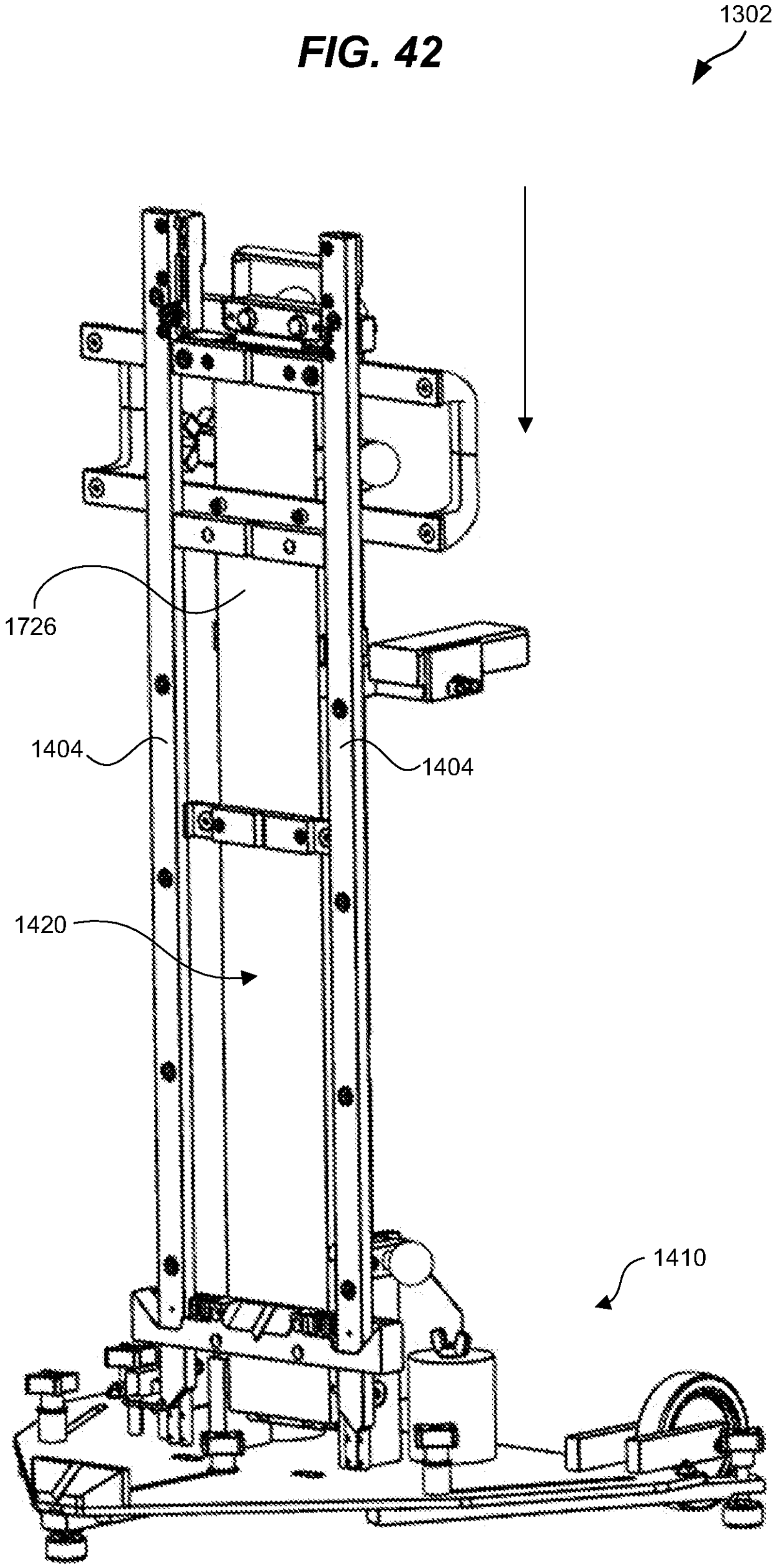
FIG. 42 is a perspective view of a calibration fixture in an illustrative embodiment.
Figure 43:
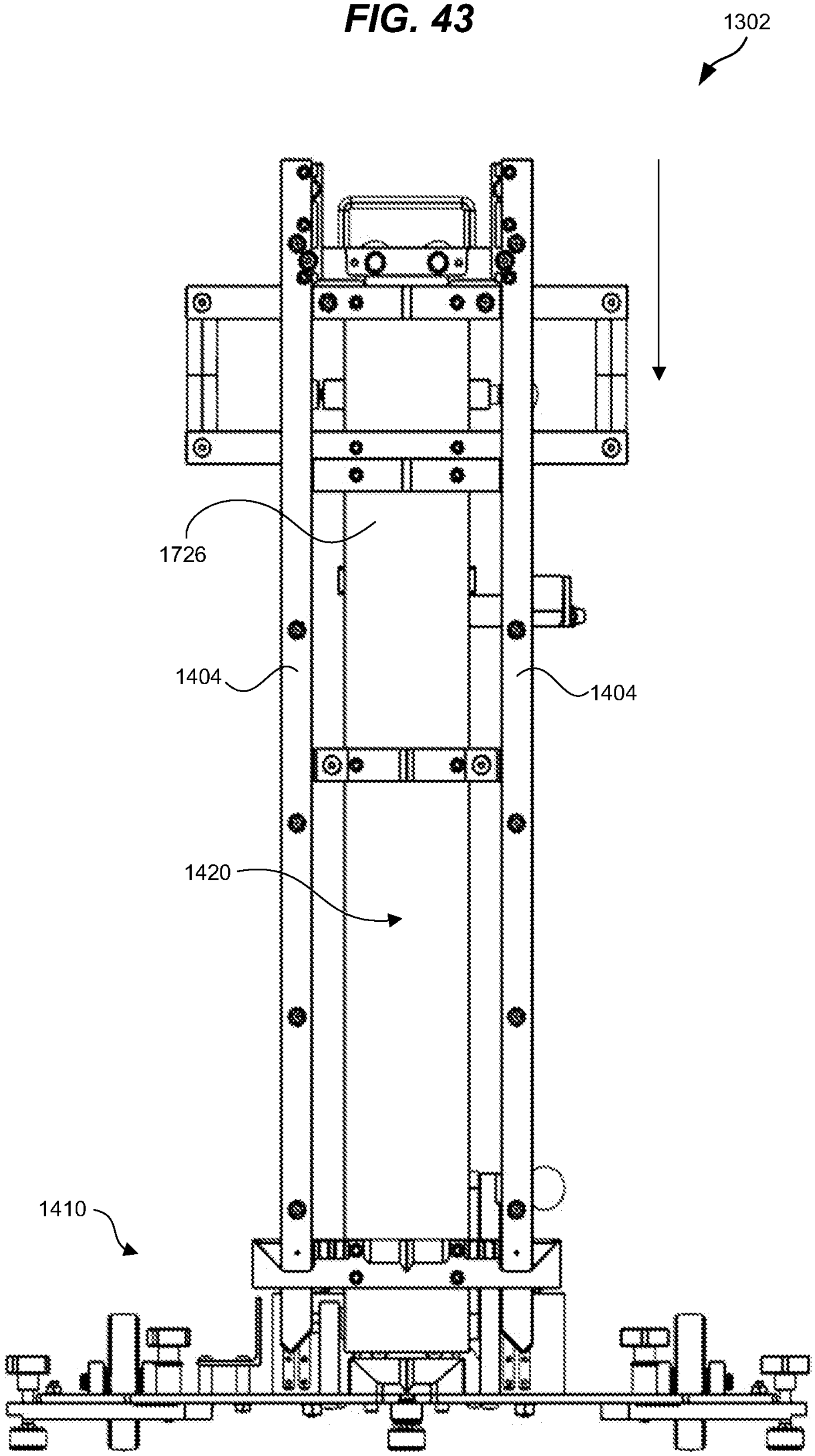
FIG. 43 is a front view of a calibration fixture in an illustrative embodiment.
Figure 44:
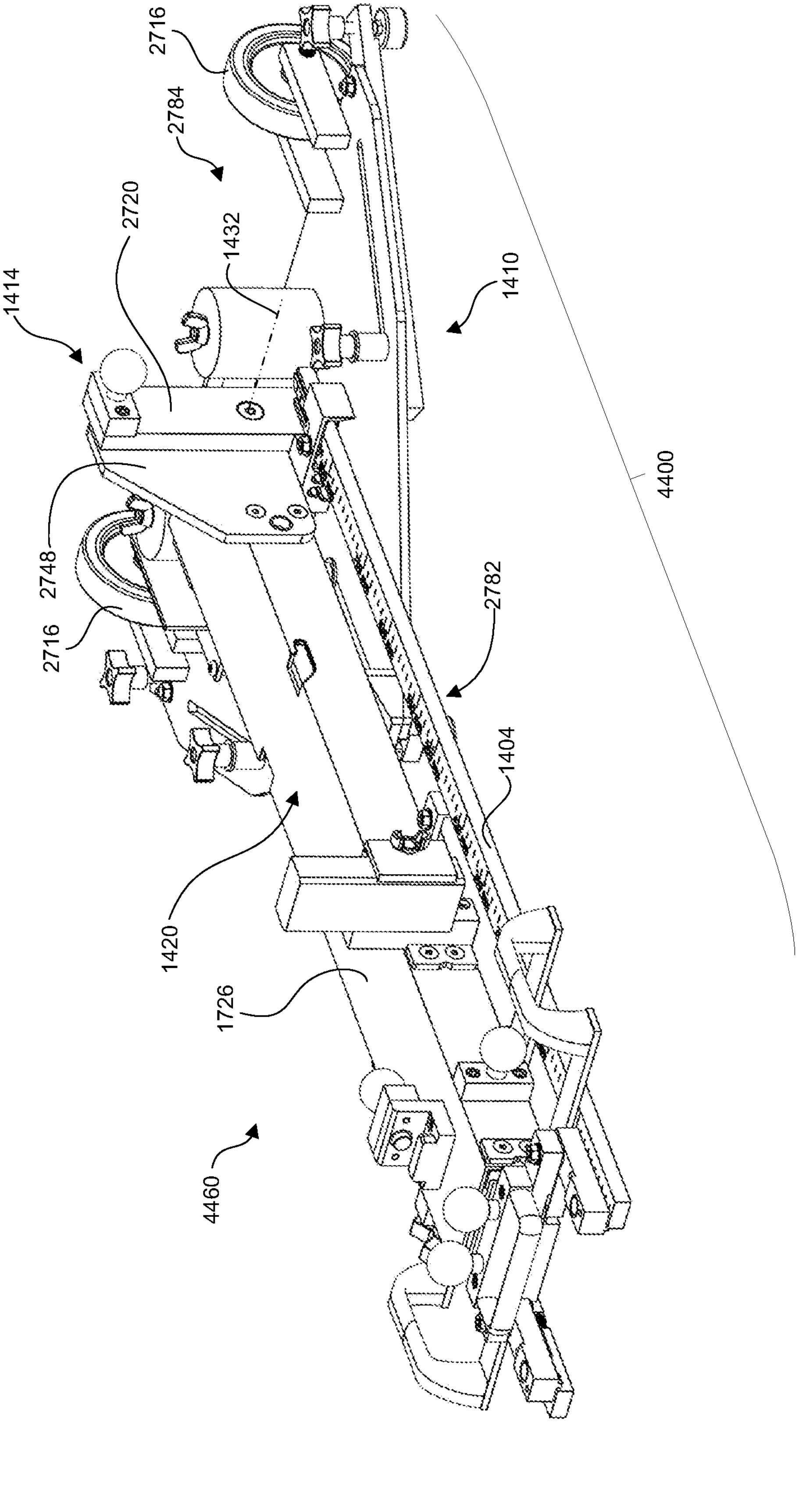
FIG. 44 is a perspective view of a calibration fixture in an illustrative embodiment.

FIGS. 40-45 illustrate calibration fixture 1302 transitioning from the unfolded configuration 1400 (see FIG. 14) to a folded configuration 4400 (see FIG. 44). FIG. 40 is a perspective view of calibration fixture 1302, and FIG. 41 is a front view of calibration fixture 1302 in an illustrative embodiment, where arms 1404 are in a collapsed position 4062. In FIG. 40, arms 1404 are folded inward toward the pillar member 1420. The left arm 1404 in FIG. 40 is configured to pivot or rotate about horizontal axis 1434 in relation to pillar member 1420 via pivotal coupling 1444 so that the free end 1440 rotates downward. Similarly, the right arm 1404 is configured to pivot about horizontal axis 1435 in relation to pillar member 1420 via pivotal coupling 1444 so that the free end 1440 rotates downward. In the collapsed position 4062, arms 1404 may hang substantially parallel to one another, and parallel to pillar member 1420.

FIG. 42 is a perspective view of calibration fixture 1302, and FIG. 43 is a front view of calibration fixture 1302 in an illustrative embodiment, where the length of pillar member 1420 is contracted. Slide tube 1728 may be slid into mast tube 1726 to reduce the length 1770 of pillar member 1420.

Figure 45:
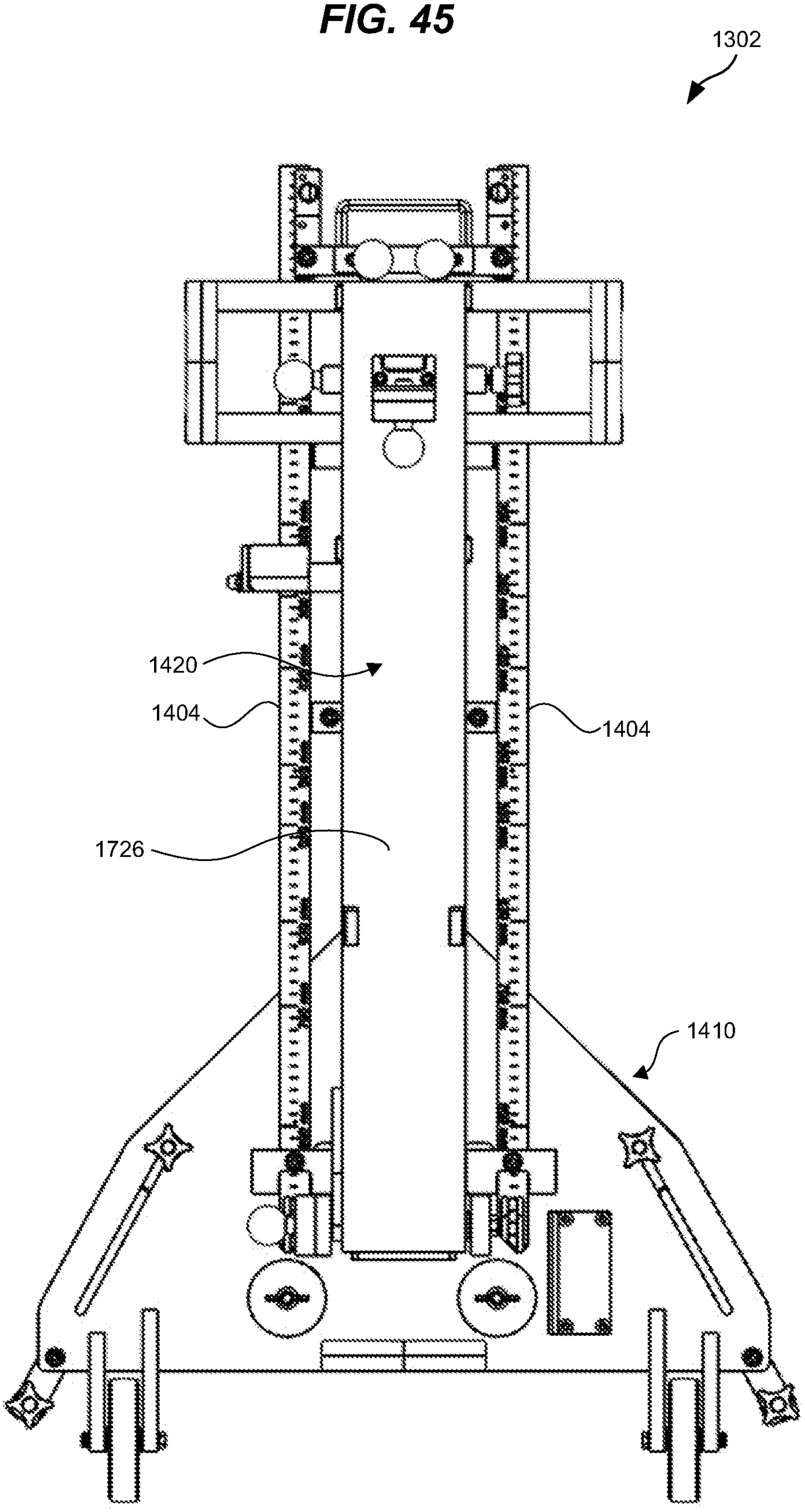
FIG. 45 is a front view of a calibration fixture in an illustrative embodiment.

FIG. 44 is a perspective view of calibration fixture 1302, and FIG. 45 is a front view of calibration fixture 1302 in an illustrative embodiment, where pillar member 1420 is in the folded position 4460. Pillar member 1420 is configured to fold toward the front side 2782 of base member 1410. When in the folded position 4460, pillar member 1420 is disposed substantially horizontal instead of substantially vertical with base member 1410 resting on supporting surface 230. Lock mechanism 1414 may lock or secure pillar member 1420 in the folded position 4460. When pillar member 1420 is folded toward the front side 2782 of base member 1410 as in FIG. 44, the wheels 2716 on the rear side 2784 of base member 1410 may be used to move calibration fixture 1302.

Figure 46:
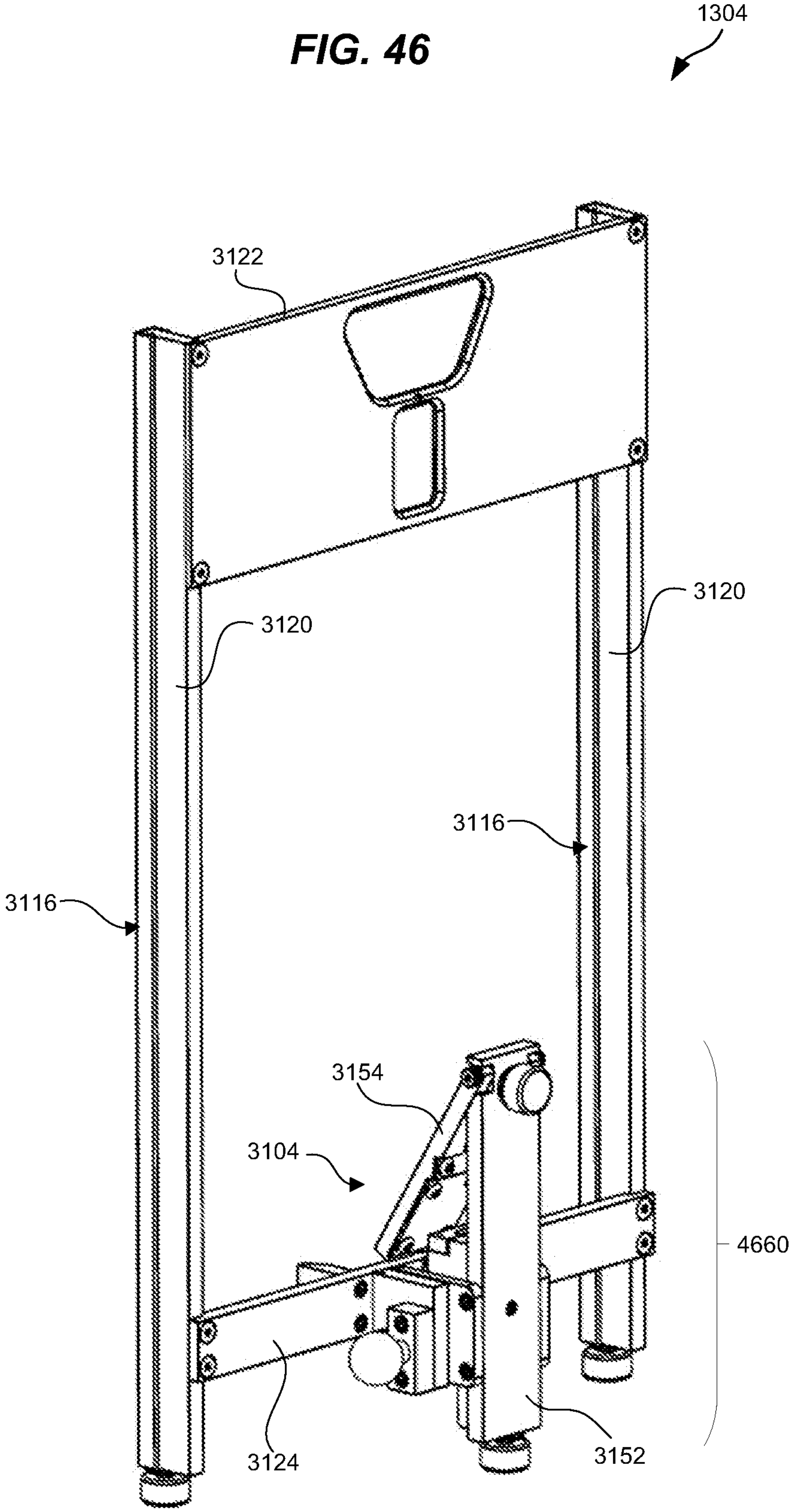
FIG. 46 is a perspective view of a (front) bumper alignment fixture with laser assembly in a folded position in an illustrative embodiment.

FIG. 46 is a perspective view of bumper alignment fixture 1304 with laser assembly 3104 in a folded position 4660 in an illustrative embodiment. Laser assembly 3104 is configured to pivot in relation to hanger bracket 3124. Likewise, reflector 3154 is configured to pivot in relation to laser mount bracket 3152 to transition laser assembly 3104 between a deployed position 3760 and the folded position 4660.

Figure 47:
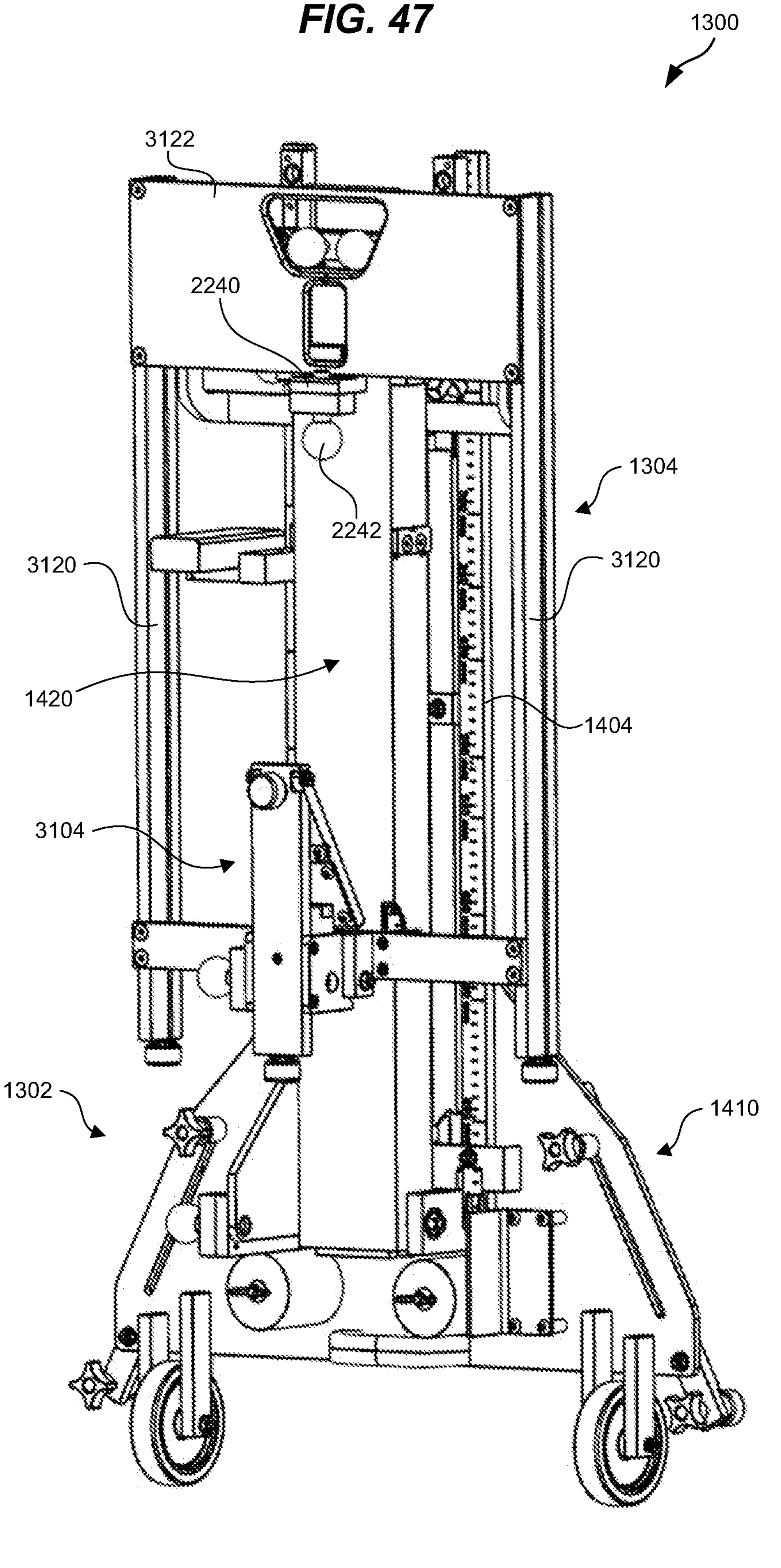
FIG. 47 is a perspective view of a (front) bumper alignment fixture mounted on a calibration fixture in an illustrative embodiment.
Figure 48:
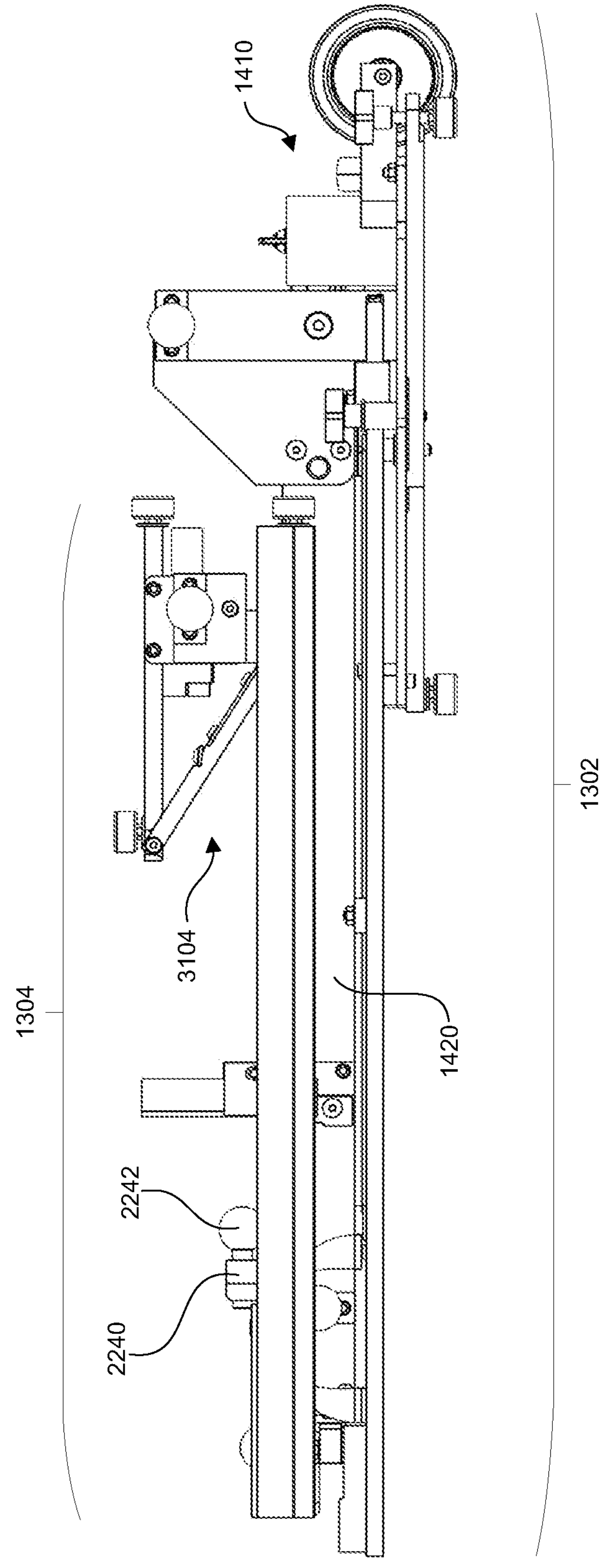
FIG. 48 is a side view of a (front) bumper alignment fixture mounted on a calibration fixture in an illustrative embodiment.

FIG. 47 is a perspective view of bumper alignment fixture 1304 mounted on calibration fixture 1302, and FIG. 48 is a side view of bumper alignment fixture 1304 mounted on calibration fixture 1302 in an illustrative embodiment. As described above, pillar member 1420 may include a bumper alignment fixture mount bracket 2240. Bumper alignment fixture mount bracket 2240 is configured to engage a portion of the bumper alignment fixture 1304 (e.g., connecting member 3122), to secure the bumper alignment fixture 1304 to calibration fixture 1302, such as with pop-pin 2242. When mounted in this manner, bumper alignment fixture 1304 and calibration fixture 1302 may be moved as a single unit.

Figure 49:
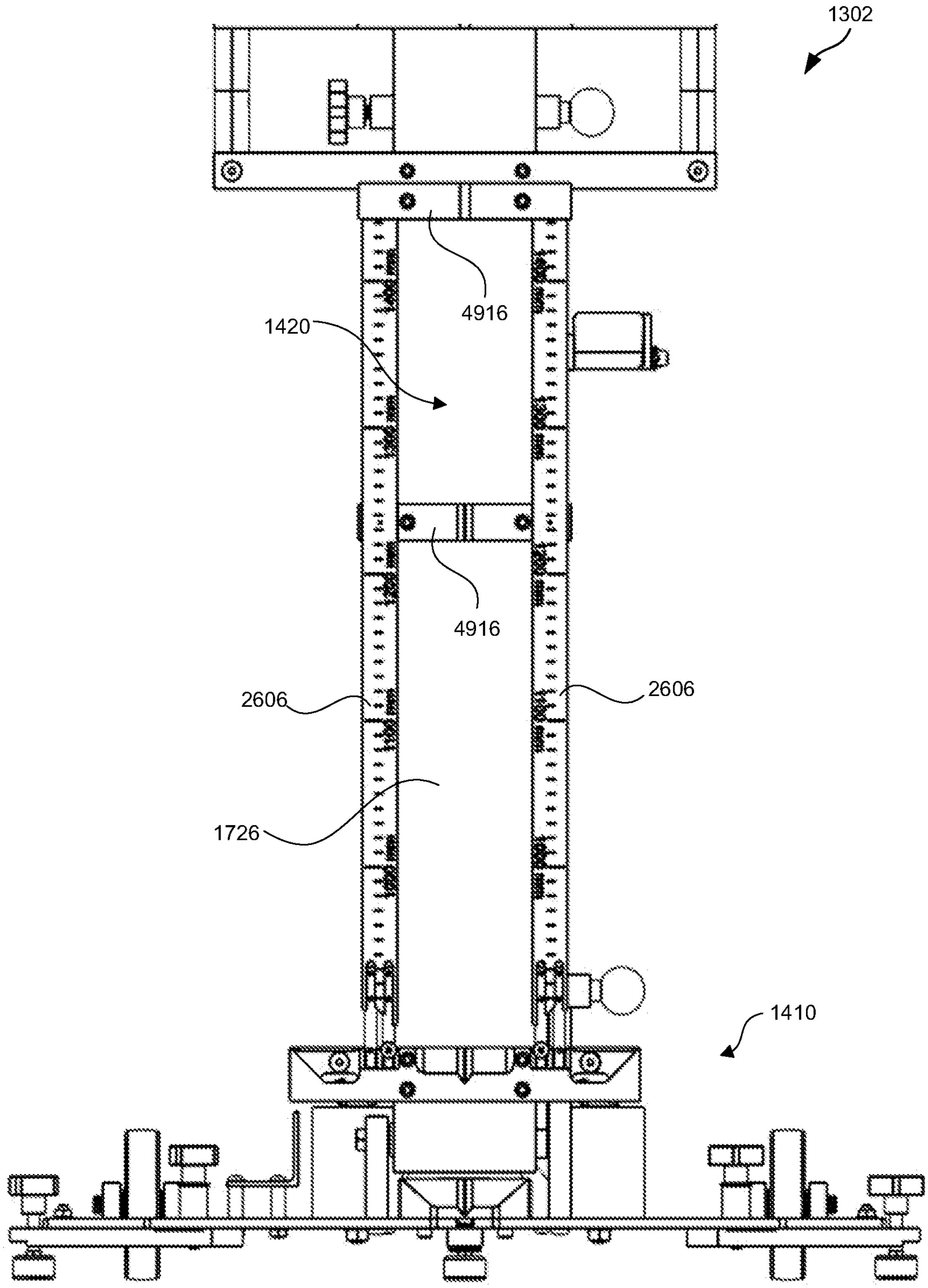
FIG. 49 is a partial front view of a calibration fixture in an illustrative embodiment.

FIG. 49 is a partial front view of calibration fixture 1302 in an illustrative embodiment. One or more arm extension storage brackets 4916 may be attached to mast tube 1726. Arm extension storage brackets 4916 are configured to store the arm extensions 2606 when detached from main arms 2604 (see FIG. 26).

Although specific embodiments were described herein, the scope of the invention is not limited to those specific embodiments. The scope of the invention is defined by the following claims and any equivalents thereof.

What is claimed is:

1. A portable calibration assembly, comprising:

a calibration fixture configured to hold one or more calibration targets for a vehicle;

the calibration fixture comprising:

a main frame comprising:

a base member configured to rest on a supporting surface; and a pillar member having a first end portion pivotally coupled to the base member via a first pivotal coupling to pivot in relation to the base member about a first horizontal axis; and a plurality of arms, wherein each of the arms has a free end, and a connected end opposite the free end that is pivotally coupled to a second end portion of the pillar member;

a first arm of the arms is pivotally coupled to the pillar member via a second pivotal coupling to pivot in relation to the pillar member about a second horizontal axis;

a second arm of the arms is pivotally coupled to the pillar member via a third pivotal coupling to pivot in relation to the pillar member about a third horizontal axis substantially parallel to the second horizontal axis; and the second horizontal axis and the third horizontal axis are substantially perpendicular to the first horizontal axis.

2. The portable calibration assembly of claim 1, wherein:

a length of the pillar member is adjustable.

3. The portable calibration assembly of claim 2, wherein:

the pillar member comprises:

a mast tube; and a slide tube telescopically slidable within a hollow portion of the mast tube.

4. The portable calibration assembly of claim 1, wherein:

the pillar member is configured to pivot in relation to the base member about the first horizontal axis via the first pivotal coupling between an upright position where the pillar member is substantially vertical and a folded position where the pillar member is substantially horizontal.

5. The portable calibration assembly of claim 1, wherein:

the first arm is configured to pivot in relation to the pillar member about the second horizontal axis between an expanded position where the first arm is substantially horizontal and a collapsed position where the first arm is substantially vertical; and the second arm is configured to pivot in relation to the pillar member about the third horizontal axis between an expanded position where the second arm is substantially horizontal and a collapsed position where the second arm is substantially vertical.

6. The portable calibration assembly of claim 4, wherein:

the base member comprises a front side and a rear side;

the pillar member is configured to fold to the folded position toward the front side of the base member; and the base member comprises one or more wheels disposed toward the rear side.

7. The portable calibration assembly of claim 1, further comprising:

a bumper alignment fixture configured to align with a front bumper of the vehicle;

the bumper alignment fixture comprising:

a main body; and a laser assembly mounted on the main body, wherein the laser assembly is configured to project a laser line in opposing directions.

8. The portable calibration assembly of claim 7, wherein:

the laser assembly comprises:

a reflector comprising at least one mirror and an aperture; and a line laser device spaced apart from the reflector;

the line laser device is configured to project the laser line in a first direction onto the reflector; and the at least one mirror is configured to reflect a portion of the laser line in a second direction opposite the first direction, and the aperture is configured to allow another portion of the laser line to pass through the reflector in the first direction.

9. The portable calibration assembly of claim 7, wherein:

the calibration fixture further comprises:

one or more laser indicators disposed on at least one of the pillar member and the base member, and configured to align with the laser line.

10. A portable calibration assembly, comprising:

a calibration fixture configured to hold one or more calibration targets for a vehicle;

the calibration fixture comprising:

a main frame comprising:

a base member configured to rest on a supporting surface; and a pillar member having a first end portion and a second end portion, wherein the first end portion is pivotally coupled to the base member via a first pivotal coupling;

a first arm having a first free end, and a first connected end opposite the first free end that is pivotally coupled to the second end portion of the pillar member via a second pivotal coupling; and a second arm having a second free end, and a second connected end opposite the second free end that is pivotally coupled to the second end portion of the pillar member via a third pivotal coupling;

wherein the pillar member is configured to pivot in relation to the base member about a first horizontal axis via the first pivotal coupling between an upright position where the pillar member is substantially vertical and a folded position where the pillar member is substantially horizontal;

wherein the first arm is configured to pivot in relation to the pillar member about a second horizontal axis via the second pivotal coupling between an expanded position where the first arm is substantially perpendicular to the pillar member and a collapsed position where the first arm is substantially parallel to the pillar member;

wherein the second arm is configured to pivot in relation to the pillar member about a third horizontal axis via the third pivotal coupling between an expanded position where the second arm is substantially perpendicular to the pillar member and a collapsed position where the second arm is substantially parallel to the pillar member;

wherein the second horizontal axis and the third horizontal axis are substantially parallel; and wherein the second horizontal axis and the third horizontal axis are substantially perpendicular to the first horizontal axis.

11. The portable calibration assembly of claim 10, wherein:

the base member comprises a front side and a rear side;

the pillar member is configured to fold to the folded position toward the front side of the base member; and the base member comprises one or more wheels disposed toward the rear side.

12. The portable calibration assembly of claim 10, wherein:

the first arm and the second arm are collinear in the expanded position.

13. The portable calibration assembly of claim 10, wherein:

the pillar member comprises:

a mast tube; and a slide tube telescopically slidable within a hollow portion of the mast tube.

14. The portable calibration assembly of claim 13, wherein:

the pillar member further comprises a lock mechanism comprising:

a plurality of index holes disposed along a length of the slide tube; and a pop-pin attached to the mast tube, and configured to engage an index hole of the index holes; and the index holes are set at predetermined target heights for different types of vehicles.

15. The portable calibration assembly of claim 10, wherein:

the first pivotal coupling comprises a hinge pin disposed through a first hinge hole in the first end portion of the pillar member, and second hinge holes in a hinge bracket of the base member; and the main frame further comprises a lock mechanism comprising:

a lock plate mounted to the first end portion of the pillar member, and comprising a third hinge hole for the hinge pin, a first lock hole, and a second lock hole; and a pop-pin configured to engage with one of the first lock hole and the second lock hole;

wherein the first lock hole, the hinge hole, and the second lock hole form an angle with the third hinge hole as a vertex;

wherein the angle is in the range of 80-100 degrees.

16. The portable calibration assembly of claim 10, further comprising:

a bumper alignment fixture configured to align with a front bumper of the vehicle;

the bumper alignment fixture comprising:

a main body; and a laser assembly mounted on the main body, wherein the laser assembly is configured to project a laser line in opposing directions.

17. The portable calibration assembly of claim 16, wherein:

the laser assembly comprises:

a reflector comprising at least one mirror and an aperture; and a line laser device spaced apart from the reflector;

the line laser device is configured to project the laser line in a first direction onto the reflector; and the at least one mirror is configured to reflect a portion of the laser line in a second direction opposite the first direction, and the aperture is configured to allow another portion of the laser line to pass through the reflector in the first direction.

18. The portable calibration assembly of claim 16, wherein:

the calibration fixture further comprises:

one or more laser indicators disposed on at least one of the pillar member and the base member, and configured to align with the laser line.

19. A method comprising:

placing a calibration fixture of a portable calibration assembly in front of a vehicle, wherein the calibration fixture comprises a base member, a pillar member having a first end portion pivotally coupled to the base member via a first pivotal coupling to pivot in relation to the base member about a first horizontal axis, and a plurality of arms;

wherein each of the arms has a free end, and a connected end opposite the free end that is pivotally coupled to a second end portion of the pillar member;

wherein a first arm of the arms is pivotally coupled to the pillar member via a second pivotal coupling to pivot in relation to the pillar member about a second horizontal axis;

wherein a second arm of the arms is pivotally coupled to the pillar member via a third pivotal coupling to pivot in relation to the pillar member about a third horizontal axis substantially parallel to the second horizontal axis;

wherein the second horizontal axis and the third horizontal axis are substantially perpendicular to the first horizontal axis;

wherein the placing comprises placing the calibration fixture with the base member resting on a supporting surface and the pillar member disposed substantially horizontal to the supporting surface;

unfolding the calibration fixture by:

pivoting the pillar member upward in relation to the base member to an upright position;

extending a length of the pillar member to a predetermined length based on a type of the vehicle; and pivoting the arms in relation to the pillar member to an expanded position where the arms extend substantially horizontal from the pillar member;

positioning the calibration fixture a predetermined distance from the vehicle;

installing one or more calibration targets on the arms;

placing a bumper alignment fixture of the portable calibration assembly against a front bumper of the vehicle;

aligning the bumper alignment fixture with a centerline of the vehicle via a laser line projecting in a first direction from the bumper alignment fixture; and aligning the calibration fixture with the vehicle by aligning one or more laser indicators on the calibration fixture with the laser line projecting in a second direction from the bumper alignment fixture opposite the first direction.

20. The method of claim 19, further comprising:

removing the calibration targets from the arms; and folding the calibration fixture by:

pivoting the arms in relation to the pillar member to a collapsed position where the arms are substantially parallel to the pillar member;

contracting the length of the pillar member; and pivoting the pillar member downward in relation to the base member to a folded position.

* * * * *